(12) United States Patent
Terashita et al.

(10) Patent No.: US 12,292,654 B2
(45) Date of Patent: May 6, 2025

(54) LIQUID CRYSTAL DISPLAY DEVICE

(71) Applicant: Sharp Display Technology Corporation, Kameyama (JP)

(72) Inventors: Shinichi Terashita, Kameyama (JP); Kouichi Watanabe, Kameyama (JP); Fumikazu Shimoshikiryoh, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 9 days.

(21) Appl. No.: 18/133,981

(22) Filed: Apr. 12, 2023

(65) Prior Publication Data

US 2023/0333428 A1    Oct. 19, 2023

(30) Foreign Application Priority Data

Apr. 14, 2022   (JP) .................................. 2022-066905

(51) Int. Cl.
*G02F 1/1335* (2006.01)
*G02F 1/1337* (2006.01)
(Continued)

(52) U.S. Cl.
CPC .. *G02F 1/133622* (2021.01); *G02F 1/133742* (2021.01); *G02F 1/133746* (2021.01); *G02F 1/134336* (2013.01); *G02F 1/1396* (2013.01); *G09G 3/3413* (2013.01); *G02F 2201/52* (2013.01); *G02F 2202/40* (2013.01); *G02F 2203/01* (2013.01); *G02F 2203/64* (2013.01); *G09G 2300/0491* (2013.01); *G09G 2310/0235* (2013.01)

(58) Field of Classification Search
CPC ......... G02F 1/133622; G02F 1/133742; G02F 1/133746; G02F 1/134336; G02F 1/1396
USPC .......................................................... 349/129
See application file for complete search history.

(56) References Cited

U.S. PATENT DOCUMENTS

| 5,642,214 | A | * | 6/1997 | Ishii | ................ | G02F 1/13473 |
|---|---|---|---|---|---|---|
| | | | | | | 349/96 |
| 2011/0007254 | A1 | * | 1/2011 | Terashita | ........... | C08G 73/1042 |
| | | | | | | 524/592 |

(Continued)

FOREIGN PATENT DOCUMENTS

JP           2021-015154 A       2/2021

*Primary Examiner* — Dung T Nguyen
*Assistant Examiner* — David Y Chung
(74) *Attorney, Agent, or Firm* — ScienBiziP, P.C.

(57) ABSTRACT

Provided is a liquid crystal display device that can achieve high-speed response in both rise time and fall time and has a high transmittance, a high contrast ratio, and excellent viewing angle characteristics. The liquid crystal display device provides color display using a field sequential driving system where each frame period includes subframe periods and includes: a liquid crystal display panel; a light source that irradiates the liquid crystal display panel with lights of multiple colors; and a controller that drives the light source to time-divisionally irradiate the liquid crystal display panel with the lights of multiple colors. The liquid crystal display panel includes, sequentially in the following order: a first substrate including pixel electrodes; a first alignment film; a liquid crystal layer; a second alignment film; and a second substrate including a common electrode.

16 Claims, 40 Drawing Sheets

(51) Int. Cl.
*G02F 1/1343* (2006.01)
*G02F 1/139* (2006.01)
*G09G 3/34* (2006.01)

(56) References Cited

U.S. PATENT DOCUMENTS

| | | | |
|---|---|---|---|
| 2013/0208216 A1* | 8/2013 | Hayano | G02F 1/133753 |
| | | | 349/96 |
| 2015/0205149 A1* | 7/2015 | Kida | G03B 21/60 |
| | | | 349/5 |
| 2016/0372043 A1* | 12/2016 | Yamanaka | G09G 3/3233 |
| 2017/0004794 A1* | 1/2017 | Huang | G09G 3/3648 |
| 2017/0103716 A1* | 4/2017 | Kita | G09G 3/2003 |
| 2018/0314114 A1* | 11/2018 | Shimoshikiryoh | ............ |
| | | | G02F 1/133707 |
| 2021/0012725 A1* | 1/2021 | Ozaki | G09G 3/3413 |
| 2022/0373839 A1* | 11/2022 | Watanabe | G02F 1/133753 |

* cited by examiner

Solid-color display luminance (relative to white display)

FIG. 5

| | | (c) | | | (b) | | |
|---|---|---|---|---|---|---|---|
| | | No.1 | No.2 | Average | No.1 | No.2 | Average |
| White luminance | | 291.35 cd/m² | 292.75 cd/m² | 292.05 cd/m² | 289.24 cd/m² | 289.17 cd/m² | 289.20 cd/m² |
| Black luminance | | 0.03605 cd/m² | 0.01863 cd/m² | 0.02734 cd/m² | 0.17305 cd/m² | 0.21720 cd/m² | 0.19512 cd/m² |
| Contrast ratio | | 8083 | 15712 | 10682 | 1671 | 1331 | 1482 |
| Chromaticity | | Y / x / y | Y / x / y | Y / x / y | Y / x / y | Y / x / y | Y / x / y |
| W | Y | 291.4 | 292.8 | 292.1 | 289.2 | 289.2 | 289.2 |
| W | x | 0.340 | 0.337 | 0.338 | 0.339 | 0.342 | 0.340 |
| W | y | 0.361 | 0.361 | 0.361 | 0.357 | 0.358 | 0.357 |
| R | Y | 79.9 | 80.4 | 80.1 | 44.8 | 43.9 | 44.3 |
| R | x | 0.583 | 0.588 | 0.586 | 0.661 | 0.660 | 0.661 |
| R | y | 0.291 | 0.295 | 0.293 | 0.331 | 0.331 | 0.331 |
| G | Y | 215.8 | 179.0 | 197.4 | 106.4 | 108.3 | 107.4 |
| G | x | 0.266 | 0.278 | 0.272 | 0.225 | 0.226 | 0.226 |
| G | y | 0.634 | 0.623 | 0.628 | 0.665 | 0.664 | 0.665 |
| B | Y | 51.7 | 48.5 | 50.1 | 10.0 | 9.3 | 9.6 |
| B | x | 0.164 | 0.164 | 0.164 | 0.150 | 0.150 | 0.150 |
| B | y | 0.150 | 0.147 | 0.149 | 0.045 | 0.045 | 0.045 |
| NTSC ratio | | 59.6 % | 58.6 % | 59.1 % | 93.3 % | 92.9 % | 93.1 % |

FIG.9

| | Color mixing ratio | | Colors in solid-color display | | | | | | | |
|---|---|---|---|---|---|---|---|---|---|---|
| | | | R→B→G | | | | R→G→B | | | |
| (b) | BL1 | 100.0% | Input color | R | G | R | Input color | R | G | R |
| | BL2 | 0.8% | R value | 255 | 29 | 29 | R value | 255 | 29 | 29 |
| | BL3 | 0.8% | G value | 29 | 255 | 29 | G value | 29 | 255 | 29 |
| | | | B value | 29 | 29 | 255 | B value | 29 | 29 | 255 |
| | | | Displayed color | | | | Displayed color | | | |
| (c) | BL1 | 100.0% | Input color | R | G | R | Input color | R | G | R |
| | BL2 | 38% | R value | 255 | 164 | 61 | R value | 255 | 61 | 164 |
| | BL3 | 4% | G value | 61 | 255 | 164 | G value | 164 | 255 | 61 |
| | | | B value | 164 | 61 | 255 | B value | 61 | 164 | 255 |
| | | | Displayed color | | | | Displayed color | | | |
| (a) | BL1 | 100.0% | Input color | R | G | R | Input color | R | G | R |
| | BL2 | 3% | R value | 255 | 48 | 32 | R value | 255 | 32 | 48 |
| | BL3 | 1% | G value | 32 | 255 | 48 | G value | 48 | 255 | 32 |
| | | | B value | 48 | 32 | 255 | B value | 32 | 48 | 255 |
| | | | Displayed color | | | | Displayed color | | | |

|  | (c) | (b) |
|---|---|---|
| R luminance (ref) | 100% | 100% |
| G color mixing ratio | 33% | 0% |
| B color mixing ratio | 3% | 0% |

FIG. 25

| | | | Example 1-1 | | | | | | | | | Comparative Example 1-1 |
|---|---|---|---|---|---|---|---|---|---|---|---|---|
| | | | No.1 | | No.2 | | No.3 | | Average | | | |
| B/L (Back surface liquid crystal white lighting) | | | 755.32 cd/m² | | 758.23 cd/m² | | 758.17 cd/m² | | 757.24 cd/m² | | | 631.23 cd/m² |
| White luminance | | | 348.96 cd/m² | | 350.11 cd/m² | | 352.77 cd/m² | | 350.61 cd/m² | | | 289.20 cd/m² |
| Black luminance | | | 0.02320 cd/m² | | 0.02140 cd/m² | | 0.02030 cd/m² | | 0.02163 cd/m² | | | 0.19512 cd/m² |
| Transmittance (front/back polarization axes being aligned) | | | 46.2 % | | 46.2 % | | 46.5 % | | 46.3 % | | | 45.8 % |
| Transmittance (panel alone) | | | 25.1 % | | 25.1 % | | 25.2 % | | 25.1 % | | | 24.9 % |
| Mode efficiency | | | 96.8 % | | 96.8 % | | 97.5 % | | 97.1 % | | | 93.5 % |
| Contrast ratio | | | 16360 | | 16360 | | 17378 | | 16207 | | | 1482 |
| Chromaticity | | | Y | x | y | Y | x | y | Y | x | y | Y | x | y |
| | W | | 349.0 | 0.304 | 0.335 | 350.1 | 0.302 | 0.335 | 352.8 | 0.302 | 0.332 | 350.6 | 0.302 | 0.334 | 289.2 | 0.3 | 0.4 |
| | R | | 75.1 | 0.657 | 0.326 | 75.7 | 0.658 | 0.327 | 76.3 | 0.657 | 0.326 | 75.7 | 0.657 | 0.326 | 44.3 | 0.7 | 0.3 |
| | G | | 232.7 | 0.231 | 0.670 | 237.5 | 0.230 | 0.671 | 236.1 | 0.231 | 0.671 | 235.4 | 0.231 | 0.671 | 107.4 | 0.2 | 0.7 |
| | B | | 17.2 | 0.152 | 0.041 | 17.2 | 0.152 | 0.041 | 17.4 | 0.152 | 0.041 | 17.2 | 0.152 | 0.041 | 9.6 | 0.2 | 0.0 |
| | NTSC ratio | | 93.3 % | | | 93.7 % | | | 93.5 % | | | 93.5 % | | | 93.1 % | | |

Solid-color display luminance (relative to white display)

FIG.30
Example 1-3
Comparative Example 1-3
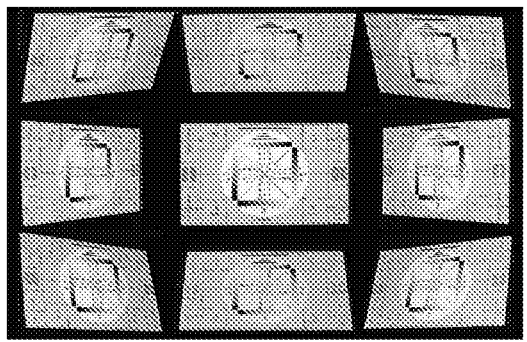
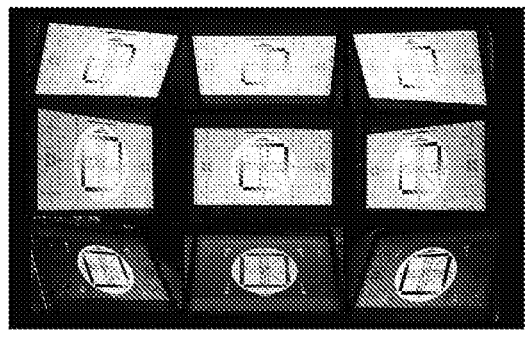

FIG.31A
Example 1-3
Comparative Example 1-3

FIG.31B
Example 1-3        Comparative Example 1-3
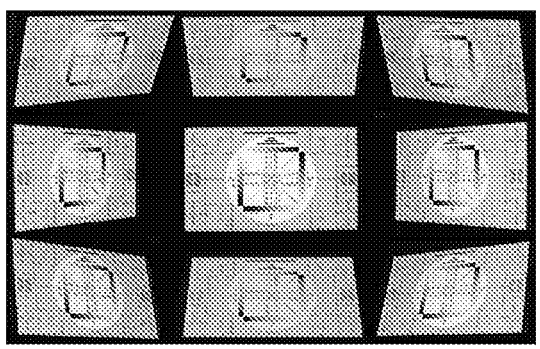 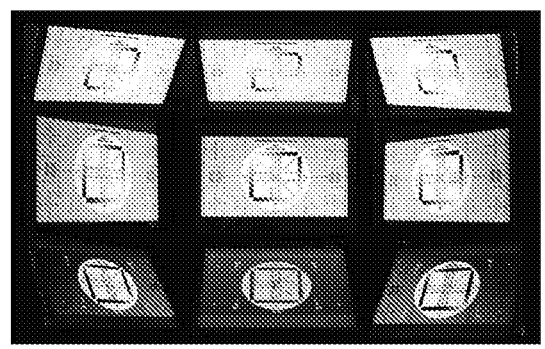
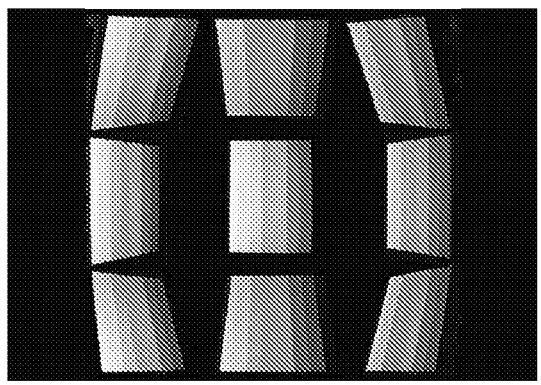 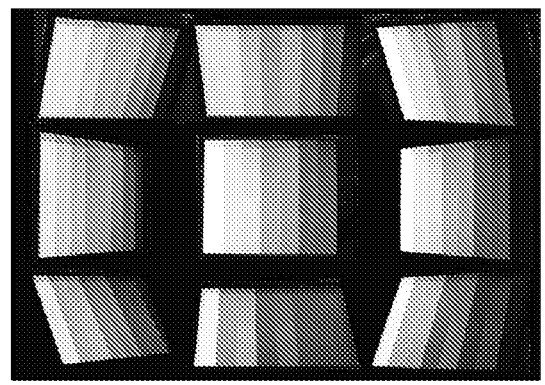

FIG. 31D

FIG.31F
Example 1-3
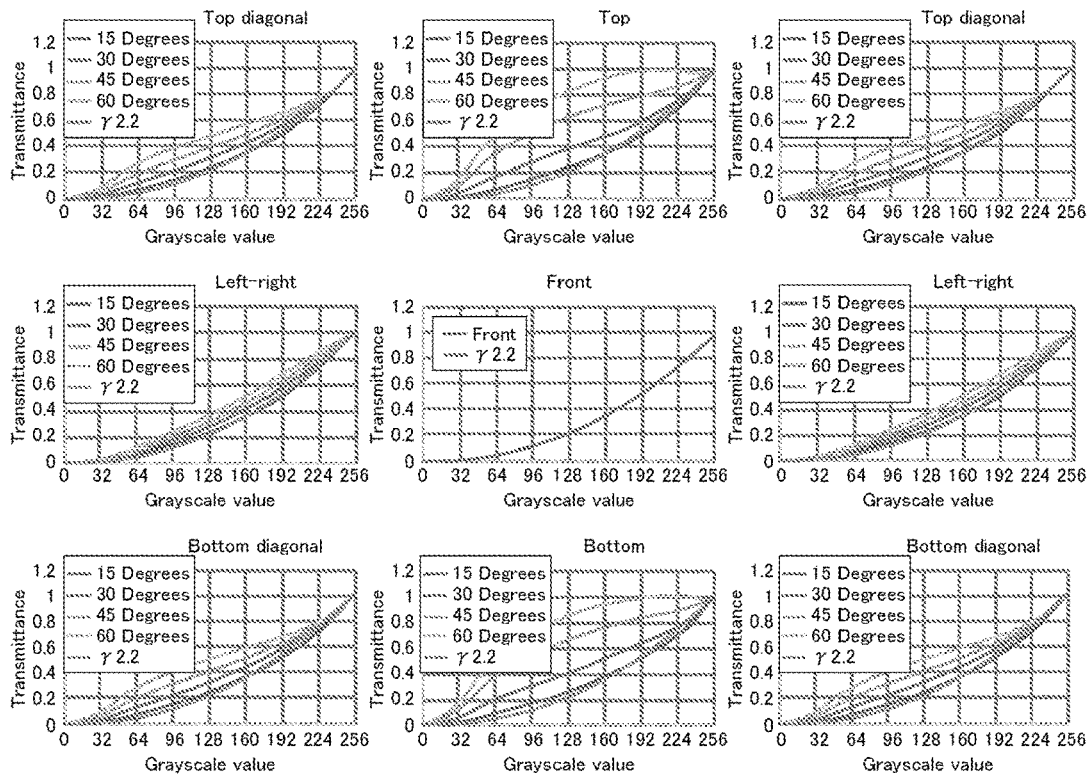
Comparative Example 1-3
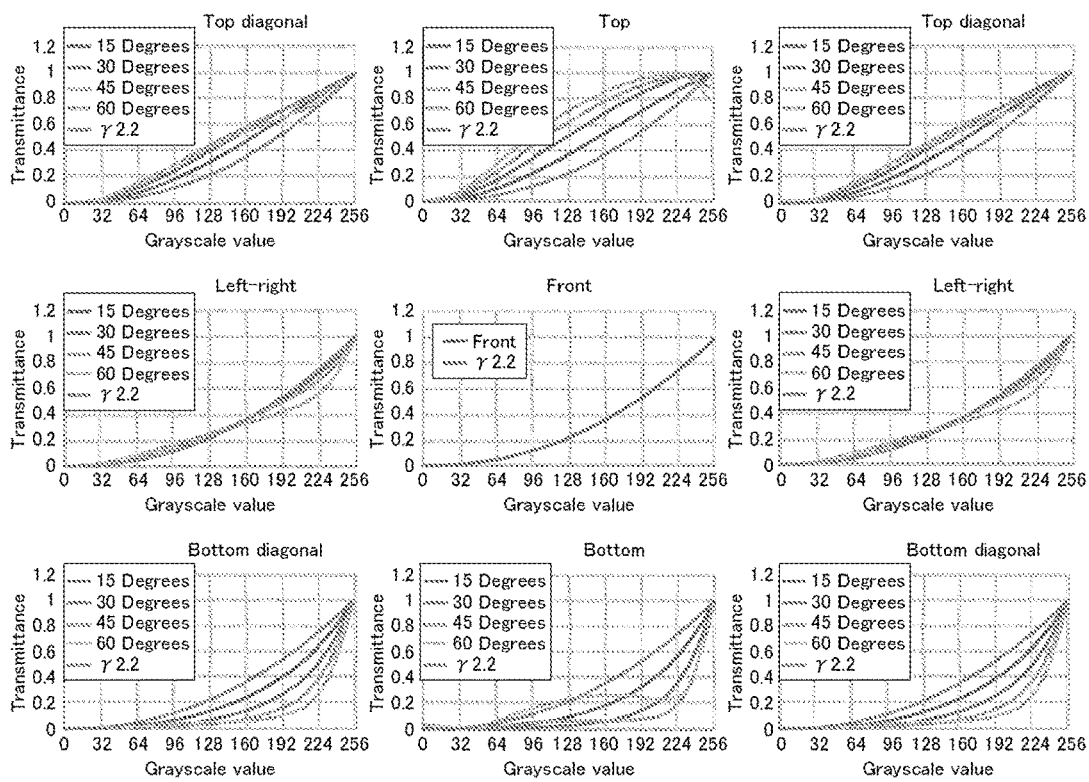

| Black voltage | Normal tilt | | Small tilt |
|---|---|---|---|
| | Weak | Strong | |
| 0.5V | × | × | (○) |
| 1.0V | × | ○ | (○) |
| 1.2V | ○ | ○ | (○) |

LIQUID CRYSTAL DISPLAY DEVICE

CROSS-REFERENCE TO RELATED APPLICATIONS

The present application claims priority under 35 U.S.C. § 119 to Japanese Patent Application No. 2022-066905 filed on Apr. 14, 2022, the contents of which are incorporated herein by reference in their entirety.

BACKGROUND OF THE INVENTION

Field of the Invention

The following disclosure relates to liquid crystal display devices.

Description of Related Art

Liquid crystal display devices are display devices utilizing a liquid crystal material to display images. Typical display methods thereof include applying light from a backlight to a liquid crystal display panel containing a liquid crystal material between paired substrates, and applying voltage to the liquid crystal material to change the alignment of liquid crystal molecules, thus controlling the amount of light passing through the liquid crystal display panel. Such liquid crystal display devices are used in a variety of fields owing to their features including their thin profile, light weight, and low power consumption.

Driving systems for liquid crystal display devices that display color images have been developed. One of the systems is a field-sequential color (FSC) system. A common FSC system divides a display period of each screen (each frame period) into three subframes, and time-divisionally switches among red (R), green (G), and blue (B) light emitting diodes (LEDs) which serve as light sources of backlight illumination. Synchronously with the switching, the system sequentially inputs image signals of the colors corresponding to the color lights from the respective LEDs to the liquid crystal display panel to control the transmission state of the panel, thus enabling additive color mixing on the retinas of the viewer's eyes.

The FSC system enables color display without formation of subpixels in a pixel. This eliminates the need for color filters and achieves a high resolution. Also, the FSC system directly uses light from LEDs. This eliminates the need for formation of color filters with a high degree of absorptivity in each pixel, and thus achieves a high degree of use efficiency of light from each LED.

Devices have been developed that provide transparent display (see-through display) where the background can be seen through, for use as display devices for information display or digital signage. Such display devices are also called see-through displays. Allowing the background, i.e., the back surface side of the display panel, to be seen through, a see-through display can superimpose information displayed on the display panel on the background. This provides new display that has been unachievable with conventional display devices.

Techniques related to FSC-system see-through displays have been developed. For example, JP 2021-15154 A discloses a technique of controlling subframe periods to reduce a phenomenon called color breakup which is an unintentional change in color. This document states that the control of subframe periods is applicable to see-through display devices utilizing polymer dispersed liquid crystal.

BRIEF SUMMARY OF THE INVENTION

FSC-system liquid crystal display devices have been known as described above. Some recently developed devices employ the FSC system as the driving system and include as their liquid crystal display panel a twisted nematic (TN) mode panel having a structure in which the direction of the long axes of liquid crystal molecules is twisted by 90 degrees between the element substrate and the counter substrate. The present inventors examined the physical properties of such devices as described below (see also the later-described Comparative Example 1).

In FIG. 1, the response waveform (b) indicates the result (waveform) of examining the response characteristics of a liquid crystal display device including a TN-mode liquid crystal display panel. In FIG. 1, the horizontal axis shows time (ms) and the vertical axis shows normalized luminance (normalized transmittance) when On-Off-Off waveform signals are input (solid-color display). The lighting order of the light sources was red (R), blue (B), and green (G). As can be seen from FIG. 1, the TN mode demonstrated a high response speed in transition (fall time) from the white display state (bright state) to the black display state (dark state), suggesting an advantage in terms of color gamut (NTSC ratio). The TN mode, however, demonstrated a low response speed in transition (rise time) from the black display state (dark state) to the white display state (bright state), suggesting a disadvantage in terms of luminance in solid-color display.

FIG. 2A and FIG. 2B show the results of examining the luminance (normalized luminance) in solid-color display of a liquid crystal display device including a TN-mode liquid crystal display panel. FIG. 2A is a graph of luminance in solid-color display relative to the luminance in white display (white luminance) taken as a reference. When the white luminance is taken as 100%, the total luminance of each color component in percentage was 57% (=32%+13%+12%) for red (R), 56% (=15%+37%+3%) for green (G), and 78% (=0%+7%+70%) for blue (B). Each luminance value in parentheses is obtained by removing decimals from a measured value, while the total luminance was calculated using the measured values without the removal. The indicated total luminance may thus be different from the sum of the corresponding luminance values.

FIG. 2B shows an image displayed on this device. As shown in FIG. 2A, this device has low luminance values in solid-color display, so that the colors of the hibiscus flower and leaves in FIG. 2B are displayed dark and dull. In contrast, the white color of the clouds and the white portion of the flower show no decrease in luminance. The TN mode thus provides an image with different lightness (brightness) values depending on the colors of the image, with colors closer to the RGB primary colors displayed darker. This may result in unnatural display with unbalanced brightness.

FIG. 3A and FIG. 3B show the results of evaluating the viewing angle characteristics of a liquid crystal display device including a TN-mode liquid crystal display panel. Color raw images were displayed on the device and the displayed images were captured with a camera at different azimuths. The details are described in the later-described Comparative Example 1-3. In the case where a priority was placed on the top viewing angle (i.e., for usage as a desktop device, including usage in which a viewer may look down at the display), images with black and white inverted were observed in the bottom direction. Also, the images observed at azimuthal angles of −135 degrees (the bottom left image in each of FIG. 3A and FIG. 3B), −90 degrees (the bottom central image in each of FIG. 3A and FIG. 3B), and −45 degrees (the bottom right image in each of FIG. 3A and FIG. 3B) had blocked-up shadows (areas with a loss of shadow details causing dark areas indistinguishable from black) and grayscale inverted areas (areas in which the brightness levels during grayscale display are inverted). The TN mode therefore leaves room for improvement in terms of viewing angle characteristics as well.

FIG. 4A, FIG. 4B, FIG. 4C, and FIG. 5 show the results of examining the properties including the transmittance and color gamut of both liquid crystal display devices (b) and (c) and the liquid crystal alignment during the examination, for example. The liquid crystal display device (b) included a TN-mode liquid crystal display panel and provided color display using the FSC driving system. The liquid crystal display (c) included a liquid crystal display panel in a mode using a liquid crystal layer containing a liquid crystal material for TVs requiring no alignment division (the mode is also referred to as the 1D-VA mode) and provided color display using the FSC driving system. For these devices, the conditions (e.g., FSC driving system conditions) were set the same, except for the use of liquid crystal display panels in different display modes (liquid crystal alignment modes).

FIG. 4A is a schematic view of the alignment of liquid crystal molecules during light transmission in a portion having a median thickness (cell thickness) of the liquid crystal layer in one pixel. For ease of understanding the azimuth at which liquid crystal molecules 210 are tilted, the liquid crystal molecules 210 are depicted as pins (circular cones). The bottom surface of each circular cone indicates the viewer side, while the vertex of each circular cone indicates the back surface side. The 1D-VA mode provides the alignment as shown in FIG. 4A during voltage application. The TN mode provides the alignment as shown in FIG. 4A during no voltage application. The dashed line p in FIG. 4A indicates the edge of the pixel electrode. The edge portion does not sufficiently transmit light and may thus generate a portion perceived as a linear dark portion (referred to as a dark line). The dark line may be exposed or may be covered with a black matrix (BM). In either case, the linear dark portion does not affect the comparison between the TN mode (b) and the 1D-VA mode (c) shown in FIG. 5. The BM may be replaced with a light-shielding metal structure for covering a dark line in a TN-mode liquid crystal display panel. FIG. 4B is a schematic view showing the arrangement of conductive lines connected to a thin film transistor (TFT) in the pixel. FIG. 4C is a schematic view showing the arrangement of the BM or light-shielding metal structure.

In FIG. 5, the column heading (c) indicates the results of evaluating a device including a 1D-VA-mode liquid crystal display panel, and the column heading (b) indicates the results of evaluating a device including a TN-mode liquid crystal display panel. For each physical property, the measurement was performed twice (No. 1, No. 2) and the average thereof is at the right of the measured values. The white luminance is used as the reference value for transmittance (mode efficiency). The white luminance in the 1D-VA mode (c) is higher than the white luminance in the TN mode (b). The contrast ratio in the 1D-VA mode (c) is also significantly higher than that in the TN mode (b). Meanwhile, the NTSC ratio, which is the reference value for color gamut, in the 1D-VA mode (c) is much lower than that in the TN mode (b). Thus, when the display mode (liquid crystal alignment mode) of a liquid crystal display panel is changed from the TN mode to the 1D-VA mode, the liquid crystal display panel may have room for improvement in terms of transmittance and color gamut.

As described above, even a liquid crystal display device providing color display using the FSC driving system has room for improvement in terms of the physical properties in the modes described above. The display device disclosed in JP 2021-15154 A also has room for improvement as it seemingly has an insufficient transmittance (insufficient mode efficiency), cannot reduce the power consumption, and also has an insufficient contrast ratio and insufficient viewing angle characteristics.

In response to the above issues, an object of the present invention is to provide a liquid crystal display device that can achieve high-speed response in both rise time and fall time and has a high transmittance, a high contrast ratio, and excellent viewing angle characteristics.

(1) One embodiment of the present invention is directed to a liquid crystal display device that provides color display using a field sequential driving system where each frame period includes subframe periods, the liquid crystal display device including: a liquid crystal display panel; a light source configured to irradiate the liquid crystal display panel with lights of multiple colors; and a controller configured to drive the light source to time-divisionally irradiate the liquid crystal display panel with the lights of multiple colors, the liquid crystal display panel including, sequentially in the following order: a first substrate including pixel electrodes arranged in a row direction and a column direction in a matrix pattern; a first alignment film; a liquid crystal layer formed from a liquid crystal material containing liquid crystal molecules; a second alignment film; and a second substrate including a common electrode, the liquid crystal layer during no voltage application including a first domain and a second domain with different alignment vectors from each other, wherein an alignment vector is defined to start at an initial point corresponding to first substrate side long axis ends of liquid crystal molecules and end at a terminal point corresponding to second substrate side long axis ends of the liquid crystal molecules.

(2) In an embodiment of the present invention, the liquid crystal display device includes the structure (1), and in a plan view of the first domain and the second domain, the alignment vector of the first domain and the alignment vector of the second domain are parallel to each other.

(3) In an embodiment of the present invention, the liquid crystal display device includes the structure (1), and in a plan view of the first domain and the second domain, a terminal point for liquid crystal molecules in the first domain is closer to the second domain than an initial point for the liquid crystal molecules in the first domain is, and a terminal point for liquid crystal molecules in the second domain is closer to the first domain than an initial point for the liquid crystal molecules in the second domain is.

(4) In an embodiment of the present invention, the liquid crystal display device includes the structure (1), (2), or (3), and the liquid crystal display device is configured to provide transparent display allowing a background to be seen through and is in a normally black mode.

(5) In an embodiment of the present invention, the liquid crystal display device includes the structure (1), (2), (3), or (4), and a birefringence $\Delta n$ of the liquid crystal material is 0.12 or higher.

(6) In an embodiment of the present invention, the liquid crystal display device includes the structure (1), (2), (3), (4), or (5), and a rotational viscosity coefficient $\gamma_1$ of the liquid crystal material is less than 100 mPa·s.

(7) In an embodiment of the present invention, the liquid crystal display device includes the structure (1), (2), (3), (4), (5), or (6), and an RP value of the liquid crystal display panel is 3.66 or less, the RP value represented by the following formula (1):

$$RP \text{ value} = (\gamma_1/K_{33}) \times \{(d_d)^2/(d_b)^2\} \quad (1)$$

wherein $\gamma_1$ represents a rotational viscosity coefficient (mPa·s) of the liquid crystal material; $K_{33}$ represents a bend elastic constant of the liquid crystal molecules; $d_d$ represents a thickness (μm) of the liquid crystal layer; and $d_b$ is 3 (μm).

(8) In an embodiment of the present invention, the liquid crystal display device includes the structure (1), (2), (3), (4), (5), (6), or (7), and the liquid crystal material contains an alkenyl group-containing compound.

(9) In an embodiment of the present invention, the liquid crystal display device includes the structure (1), (2), (3), (4), (5), (6), (7), or (8), and the liquid crystal material contains a phenyl group-containing compound.

(10) In an embodiment of the present invention, the liquid crystal display device includes the structure (1), (2), (3), (4), (5), (6), (7), (8), or (9), and a pre-tilt angle of the liquid crystal molecules is 89° or smaller.

(11) In an embodiment of the present invention, the liquid crystal display device includes the structure (1), (2), (3), (4), (5), (6), (7), (8), (9), or (10), and a fall-time response parameter of the liquid crystal display panel is 2.55 ms or shorter.

(12) In an embodiment of the present invention, the liquid crystal display device includes the structure (1), (2), (3), (4), (5), (6), (7), (8), (9), (10), or (11), and a rise-time response parameter of the liquid crystal display panel is 2.75 ms or shorter.

(13) In an embodiment of the present invention, the liquid crystal display device includes the structure (1), (2), (3), (4), (5), (6), (7), (8), (9), (10), (11), or (12), each frame period includes subframe periods respectively corresponding to red (R), green (G), and blue (B), and a frequency of each of the subframe periods is 180 Hz or higher.

(14) In an embodiment of the present invention, the liquid crystal display device includes the structure (1), (2), (3), (4), (5), (6), (7), (8), (9), (10), (11), (12), or (13), and each of the frame periods includes subframe periods respectively corresponding to red (R), green (G), and blue (B) in the order of red (R), black, blue (B), black, green (G), and black, where black inserted in between indicates a black display period corresponding to a light-off period of the light source.

(15) In an embodiment of the present invention, the liquid crystal display device includes the structure (1), (2), (3), (4), (5), (6), (7), (8), (9), (10), (11), (12), (13), or (14), and the controller is configured to turn off the light source within 1.20 to 2.45 ms from a fall-time starting point on an optical response waveform obtained at a top edge of the liquid crystal display panel in each frame period after a trigger signal is input for the frame period.

(16) In an embodiment of the present invention, the liquid crystal display device includes the structure (1), (2), (3), (4), (5), (6), (7), (8), (9), (10), (11), (12), (13), (14), or (15), and in at least one of the subframe periods, the liquid crystal display panel is scanned at 480 to 720 Hz twice or more.

(17) In an embodiment of the present invention, the liquid crystal display device includes the structure (1), (2), (3), (4), (5), (6), (7), (8), (9), (10), (11), (12), (13), (14), (15), or (16), and an NTSC ratio is 90% or higher.

The present invention can provide a liquid crystal display device that can achieve high-speed response in both rise time and fall time and has a high transmittance, a high contrast ratio, and excellent viewing angle characteristics.

BRIEF DESCRIPTION OF THE DRAWINGS

FIG. 5 shows the results of examining the transmittance, color gamut, and other properties of the liquid crystal display device (b) including a TN-mode liquid crystal display panel and providing color display using the FSC driving system and the liquid crystal display device (c) including a 1D-VA-mode liquid crystal display panel and providing color display using the FSC driving system.

FIG. 9 shows the results of analyzing the liquid crystal display device (a) of Embodiment 1, the liquid crystal display device (b) including a TN-mode liquid crystal display panel and providing color display using the FSC driving system, and the liquid crystal display device (c) including a 1D-VA-mode liquid crystal display panel and providing color display using the FSC driving system.

FIG. 25 is a comparison table showing the evaluation results of the physical properties in Example 1-1 and Comparative Example 1-1.

FIG. 30 shows the evaluation results of the viewing angle characteristics in Example 1-3 and Comparative Example 1-3.

FIG. 31A shows the evaluation results of the viewing angle characteristics in Example 1-3 and Comparative Example 1-3.

FIG. 31B shows the evaluation results of the viewing angle characteristics in Example 1-3 and Comparative Example 1-3.

FIG. 31D shows the evaluation results of the viewing angle characteristics in Example 1-3 and Comparative Example 1-3.

FIG. 31F shows the evaluation results of the viewing angle characteristics in Example 1-3 and Comparative Example 1-3.

DETAILED DESCRIPTION OF THE INVENTION

Figure 1:
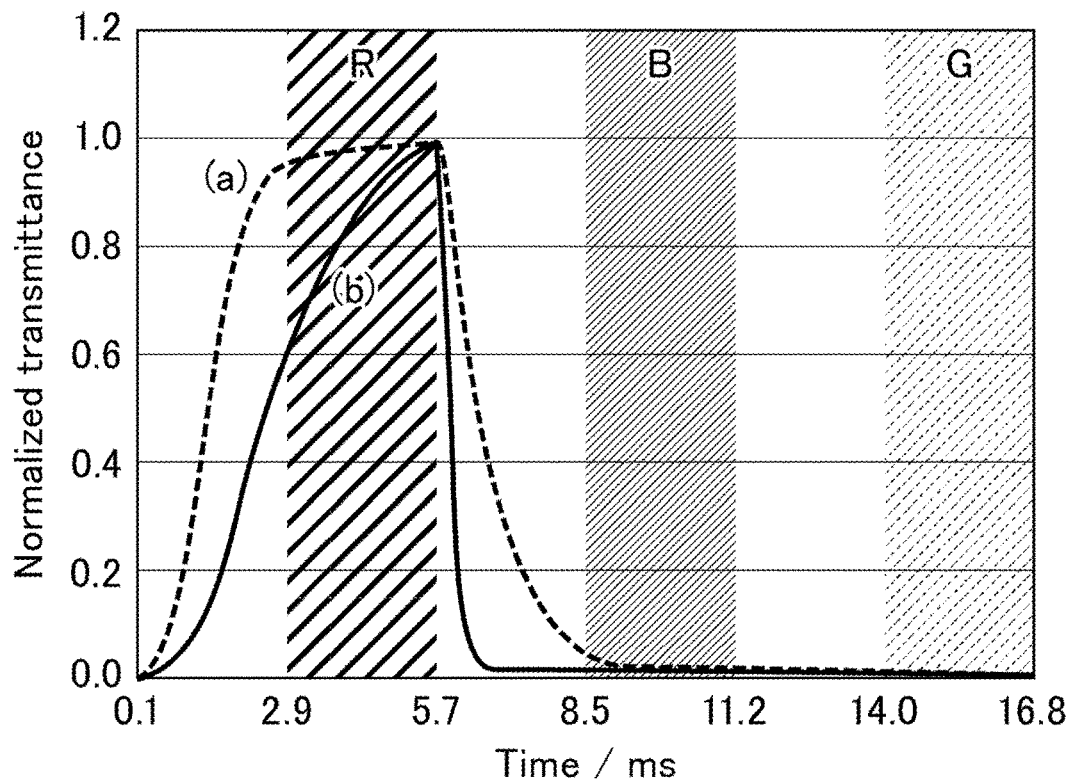
FIG. 1 shows a response waveform (a) of a liquid crystal display device of Example 1 and a response waveform (b) of a liquid crystal display device including a TN-mode liquid crystal display panel (Comparative Example 1).

Hereinafter, liquid crystal display devices of embodiments of the present invention are described. The present invention is not limited to the following embodiments. The design may be modified as appropriate within the range satisfying the configuration of the present invention.

Embodiment 1

A liquid crystal display device of the present embodiment provides color display using the field sequential driving system where each frame period includes subframe periods. Such a liquid crystal display device of the present embodiment at least includes a liquid crystal display panel, a light source, and a controller. The light source irradiates the liquid crystal display panel with lights of multiple colors. The controller drives the light source to time-divisionally irradiate the liquid crystal display panel with the lights of multiple colors.

The light source emits lights by, for example, time-divisionally switching among red (R), green (G), and blue (B) lights. For example, only red light is emitted during an R display period of the liquid crystal display panel, only green light is emitted during a G display period, and only blue light is emitted during a B display period. In this manner, the timings of driving pixels in the liquid crystal display panel and the timings of emitting lights of the corresponding colors from the light source require synchronization with each other. The controller thus preferably drives the light source such that the light source emits lights of colors corresponding to the colors to be displayed during the respective subframe periods. Specifically, the controller suitably includes a control circuit that synchronizes the R display period, the G display period, and the B display period of the liquid crystal display panel respectively with the timings of emitting red light R, green light G, and blue light B from the light source. The state where they "synchronize" typically means that the same color light is emitted during the same display period.

The light source can be, for example, a lighting unit including a light source unit and a light guide plate. The light source unit can emit lights of multiple colors including red light R, green light G, and blue light B. For example, the light source unit includes a red LED, a green LED, and a blue LED. The light guide plate can lead color lights emitted from the light source unit to a liquid crystal display panel 1. The light source, the controller, and the control circuit may be any lighting elements used in conventional FSC-system display devices.

Each frame period includes subframe periods corresponding to the colors emitted by the light source in the light-on state, and subframe periods (also referred to as black display periods) during which the black color is displayed correspondingly to the light-off state of the light source. Specifically, each frame period preferably includes subframe periods respectively corresponding to red (R), green (G), and blue (B) (also referred to as an R display period, a G display period, and a B display period, respectively), and more preferably further includes black display periods.

The subframe periods for colors determined by lighting of the light source are set without an overlap in time. For example, at least three subframe periods including one R display period, one G display period, and one B display period are set within a period for displaying one full-color image (one frame period). In this case, the liquid crystal display panel displays a red component image, a green component image, and a blue component image forming a full-color image time-divisionally and sequentially during each frame period.

Figure 6A:
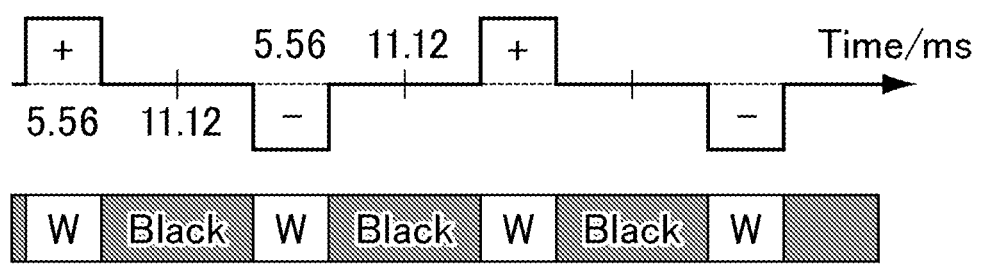
FIG. 6A is a view showing a method of analyzing the color mixing ratios from an optical response waveform.
Figure 6B:
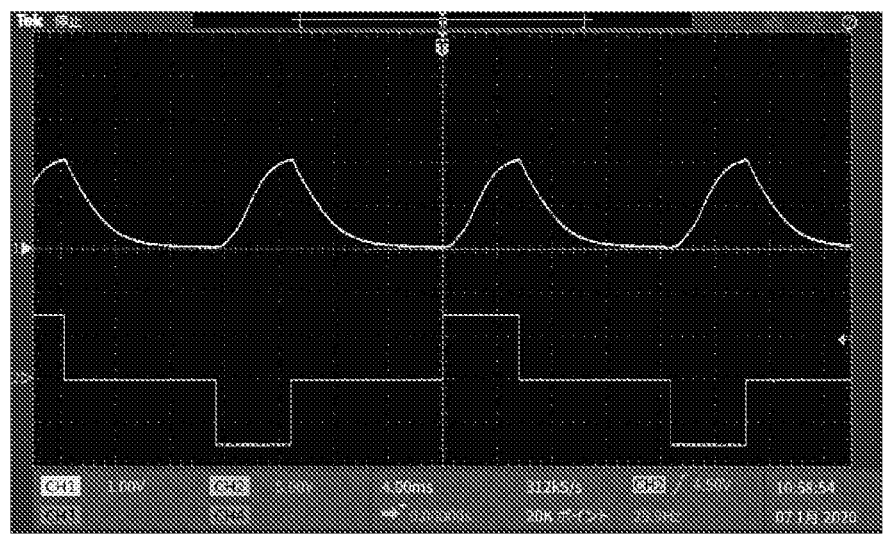
FIG. 6B is another view showing the method of analyzing the color mixing ratios from an optical response waveform.
Figure 6C:
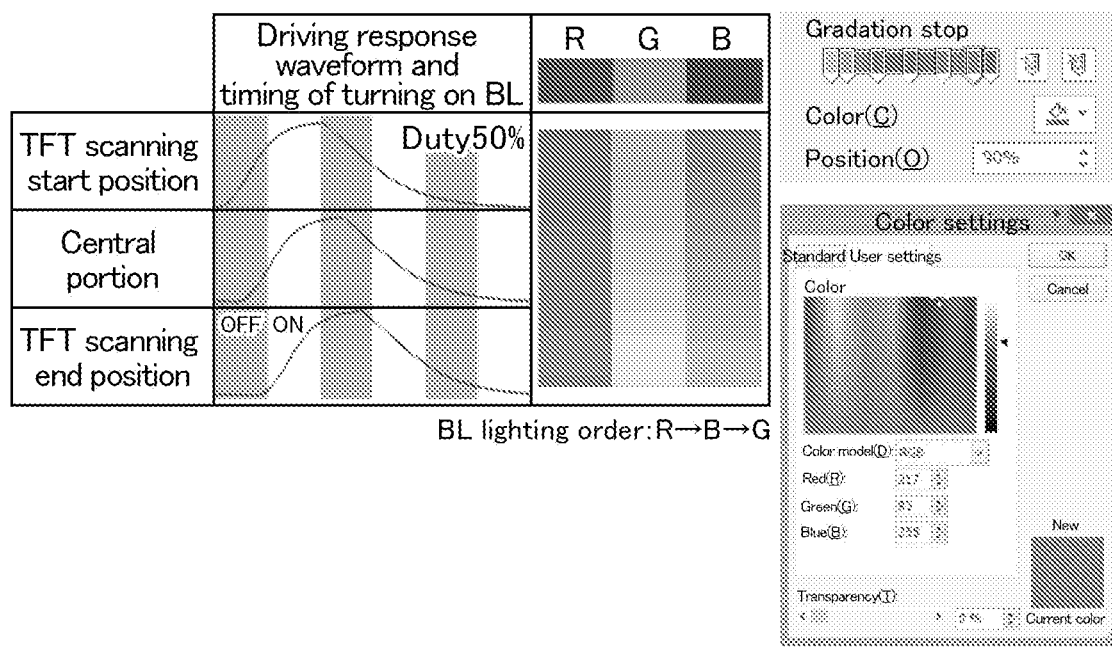
FIG. 6C is yet another view showing the method of analyzing the color mixing ratios from an optical response waveform.
Figure 7:
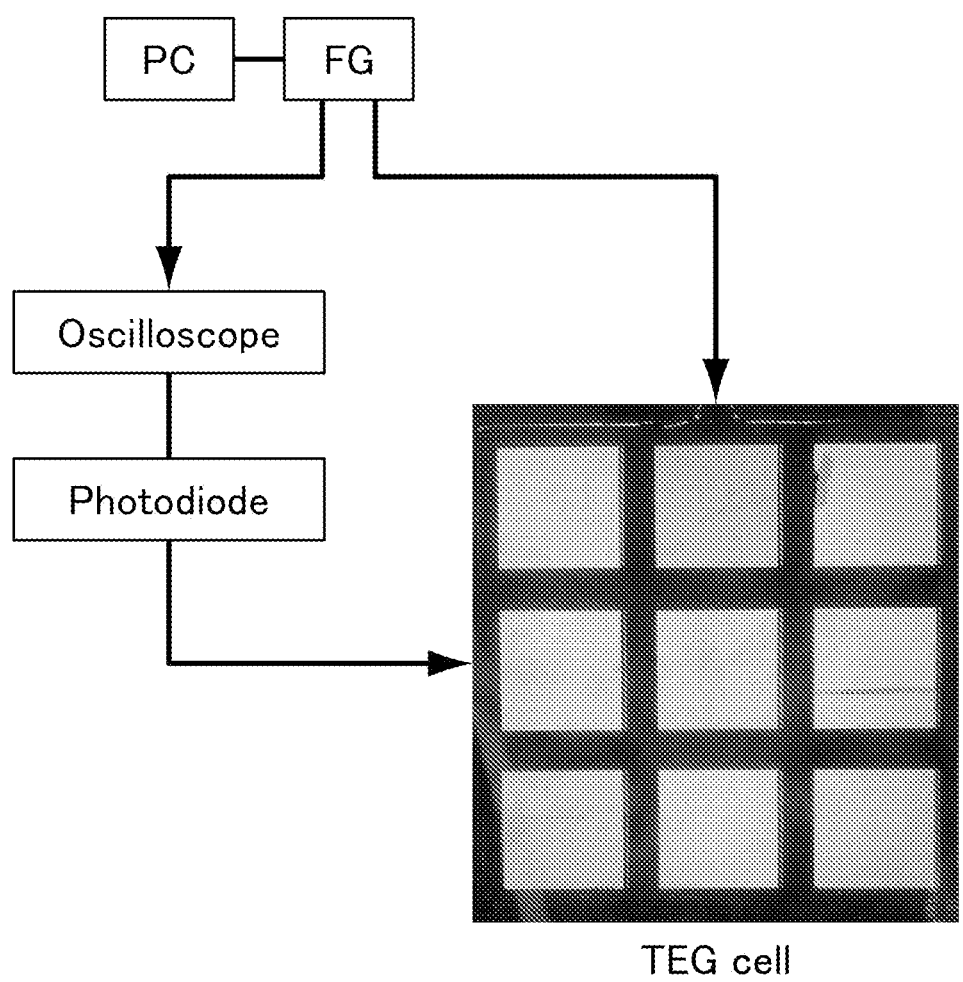
FIG. 7 is yet another view showing the method of analyzing the color mixing ratios from an optical response waveform.

FIG. 6A, FIG. 6B, FIG. 6C, and FIG. 7 each are a view showing a method of analyzing the color mixing ratios from an optical response waveform (also simply referred to as a response waveform or response waveform line). A trigger signal is input via the function generator (FG) connected to the control computer (PC) shown in FIG. 7 to produce a voltage waveform in the FSC driving system (see FIG. 6A). In FIG. 6A, the horizontal axis shows time (ms), Black indicates a black display state (no voltage application; OFF), and W indicates a white display state (voltage application; ON). The duration of W was 5.56 ms and the duration of Black was 11.12 ms. The thus-obtained response waveform is in the upper part of FIG. 6B. The response waveform can be obtained with an oscilloscope as shown in FIG. 7. The lower part of FIG. 6B shows the voltage waveform. The vertical axis for the response waveform shows normalized luminance (the unit is arbitrary unit: a.u.), and the horizontal axis shows time (ms). As shown in FIG. 7, a photodiode that detects the intensity of light emitted from a test elementary group (TEG) cell through a polarizing plate (not shown) is connected to the oscilloscope. The backlight (not shown) is preferably a continuous white light backlight (product name: FUJICOLOR Light Box Color Illuminator Pro A4).

The color mixing ratios are calculated from the response waveform shown in the upper part of FIG. 6B, and is then converted to grayscale values as shown in FIG. 6C. Specifically, first, for example, the response waveform is measured in the central portion ($\varphi 2$ mm) of the central segment of the TEG cell shown in FIG. 7. Next, the waveform is parallelly moved to obtain waveforms at assumed timings (delay times from the start position) during scanning of the predetermined three points (i.e., the start position for scanning, the central portion, and the end position for scanning) within an actual liquid crystal display panel (liquid crystal module). The voltage during no voltage application (OFF period; black display state) is 0 V, and the voltage during voltage application (ON period; white display state) is 7.0 V. A light source defined by light sources respectively emitting red (R), blue (B), and green (G) lights is used and the light sources are driven using the FSC system in the lighting order of R, B, and G. The values of the solid black portions are subtracted from each response waveform. The light-on period of each light source is integrated. The maximum integrated value is set to 100%, relative to which the crosstalk percentages in the light-on period of each color are determined. The obtained crosstalk percentages are converted to grayscale values, which are then distributed to the RGB color components according to the lighting order of the light sources. The color components to be displayed are set in the "Color settings" dialog box for the desired part. If necessary, the displayed color at each scanning position is reproduced in gradation. The "Duty 50%" means that the light-on period of each light source is set to half the corresponding subframe period.

Herein, the rise-time response means the transition from the black display state (dark state) to the white display state (bright state). The rise-time response speed can be evaluated based on the rise-time response parameter as described later. In other words, when a state where the normalized luminance of the response waveform is 10% is the black display state and a state where the normalized luminance of the response waveform is 90% is the white display state (the maximum integrated value is set to 100%), the rise-time response speed can be evaluated based on the time of optical changes from the black display state to the white display state. The fall-time response means transition from the white display state (bright state) to the black display state (dark state). The fall-time response speed can be evaluated based on the fall-time response parameter as described later. In other words, when a state where the normalized luminance of the response waveform is 10% is the black display state and a state where the normalized luminance of the response waveform is 90% is the white display state (the maximum integrated value is set to 100%), the fall-time response speed can be evaluated based on the time of optical changes from the white display state to the black display state.

Figure 8:
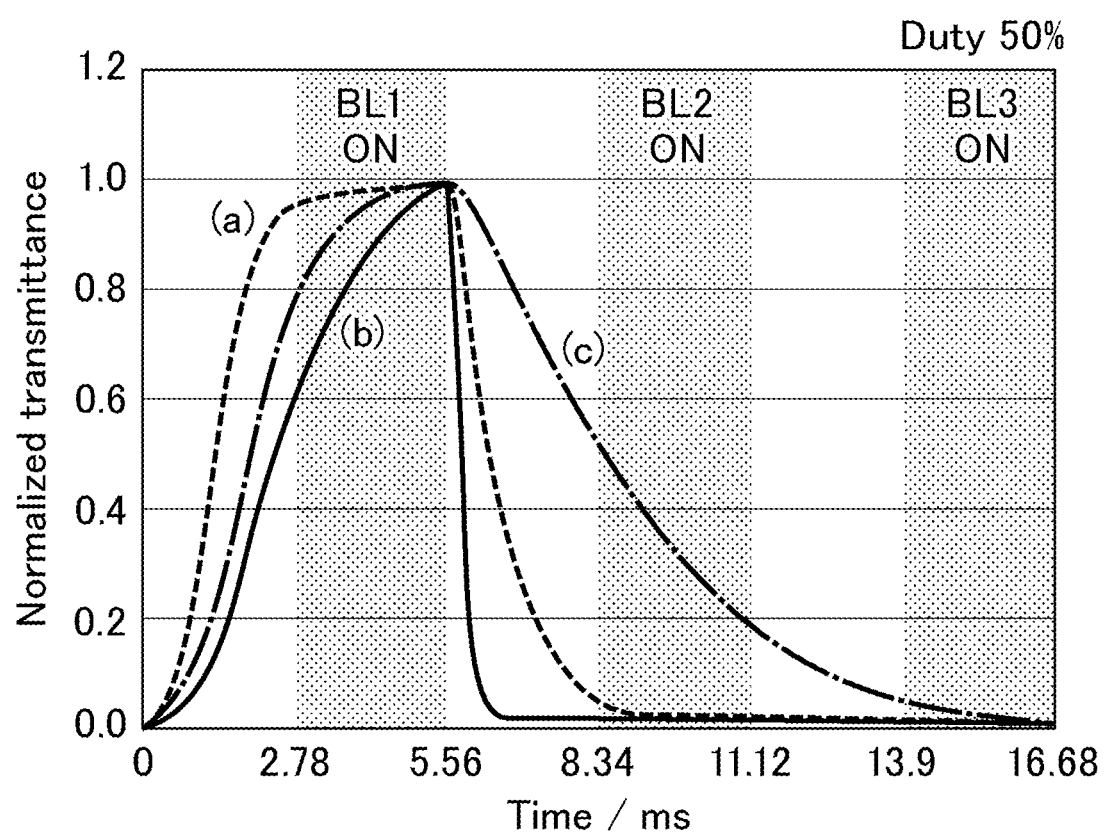
FIG. 8 shows the results of analyzing a liquid crystal display device (a) of Embodiment 1, the liquid crystal display device (b) including a TN-mode liquid crystal display panel and providing color display using the FSC driving system, and the liquid crystal display device (c) including a 1D-VA-mode liquid crystal display panel and providing color display using the FSC driving system.

In FIG. 8 and FIG. 9, the color mixing ratios were examined according to the analysis method described above. Specifically, the color mixing ratios were calculated from the response waveform obtained when the On-Off-Off waveform signals were input (solid-color display). These color mixing ratios, taken as the transmittance values, were converted to grayscale values with γ=2.2. Then, the displayed colors in the case with the lighting order of the light sources of R, B, and G (see the "R→B→G" column in FIG. 9) and the displayed colors in the case with the lighting order of the light sources of R, G, and B (see the "R→G→B" column in FIG. 9) were reproduced. In this analysis, the luminance information on the color lights from the light sources was not taken into consideration.

The method of calculating the color mixing ratios from a response waveform starts with obtaining the response waveform, followed by determination of a luminance integrated value L1 during lighting of a first light source (BL1). Next, after the first light source (BL1) is turned off, a luminance integrated value L2 during lighting of a second light source (BL2) is determined. Then, after the second light source (BL2) is turned off, a luminance integrated value L3 during lighting of a third light source (BL3) is determined. The ratio of L2 to L1 is referred to as the "color mixing ratio (%) of BL2", and the ratio of L3 to L1 is referred to as the "color mixing ratio (%) of BL3" (see FIG. 9). For the sake of expediency, the ratio of L1 to L1 is referred to as the "color mixing ratio (%) of BL1" (i.e., 100.0%).

In FIG. 8 and FIG. 9, the result (a) is the analysis result of the liquid crystal display device of the present embodiment. For comparison, the analysis result (b) of a device including a TN-mode liquid crystal display panel and providing color display using the FSC driving system and the analysis result (c) of a device including a 1D-VA-mode liquid crystal display panel and providing color display using the FSC driving system are also shown.

As shown in FIG. 9, the color mixing ratio of BL2 in the 1D-VA mode (c) is 38%, which is high, and the displayed colors in solid-color display are pale. Also in the 1D-VA mode (c), when the lighting order of the light sources is R, G, and B, the displayed colors (input colors) are not accurate. Specifically, as shown in the "R→G→B" column under the heading "Colors in solid-color display" in FIG. 9, the displayed color is perceived as yellow (or orange) when the input color (the color of the light source) is R, and the displayed color is perceived as purple (or bluish purple) when the input color is B. The display with the lighting order of the light sources of R, B, and G is comparatively better than the display with the lighting order of the light sources of R, G, and B. Yet, the displayed colors are pale and inaccurate (see the "R→B→G" column under the heading "Colors in solid-color display" in FIG. 9). In contrast, the liquid crystal display device (a) of the present embodiment and the TN mode (b) respectively exhibit the color mixing ratios of BL2 of 3% and 0.8% and high levels of display color reproduction, and they display the colors almost accurately. Also, there was no difference due to the lighting order of the light sources between the devices (a) and (b).

The lighting order of the light sources is preferably red (R), blue (B), and green (G) or red (R), green (G), and blue (B). In consideration of the results of the device (c) (see FIG. 9), the color display seems to be more accurate with the lighting order of R, B, and G. Thus, for more accurate display of colors, the suitable lighting order is R, B, and G. Each frame period therefore preferably includes subframe periods corresponding to red (R), blue (B), and green (G) in this order.

More preferred is a mode in which each frame period includes subframe periods respectively corresponding to red (R), green (G), and blue (B) in the order of red (R), black, blue (B), black, green (G), and black, where black inserted in between indicates a black display period corresponding to a light-off period of the light sources. In other words, each frame period preferably includes subframes corresponding to a R display period, a black display period, a B display period, a black display period, a G display period, and a black display period. This mode can further increase the fall-time response speed to further avoid color mixture, thus further increasing the solid-color luminance. The controller controls the timings of turning on and turning off the red light, the blue light, and the green light such that each frame period is in the mode described above.

Figure 10A:
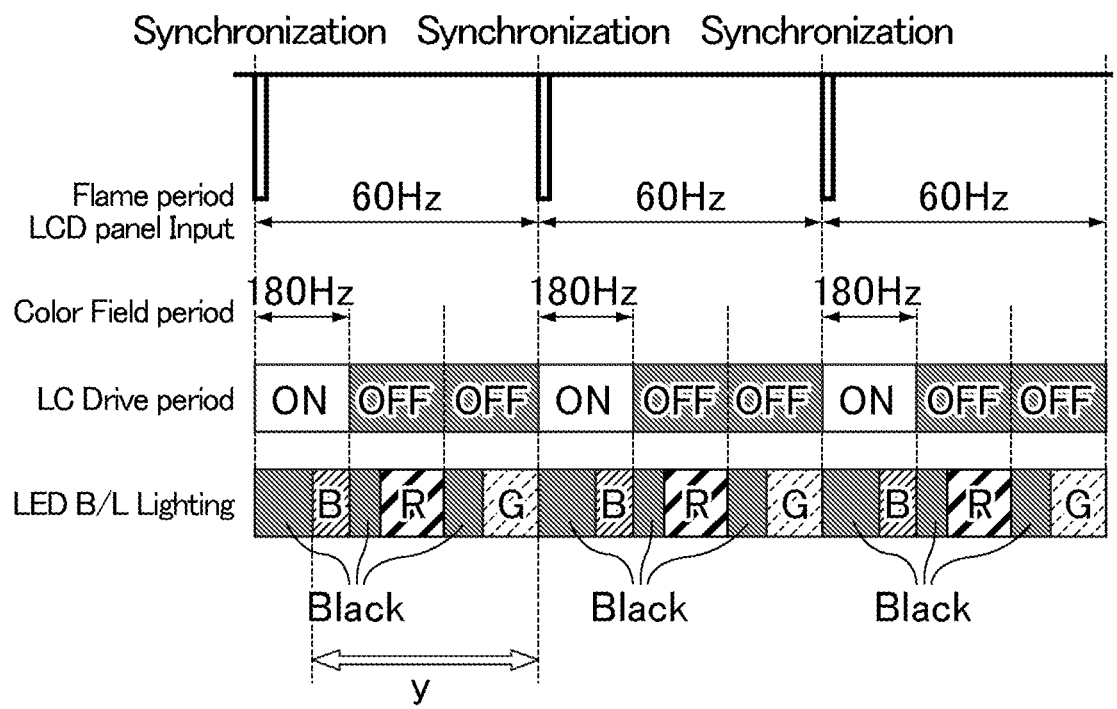
FIG. 10A is a schematic view showing an examination of the relationship between a frame period and the timings of turning on the light sources.
Figure 10B:
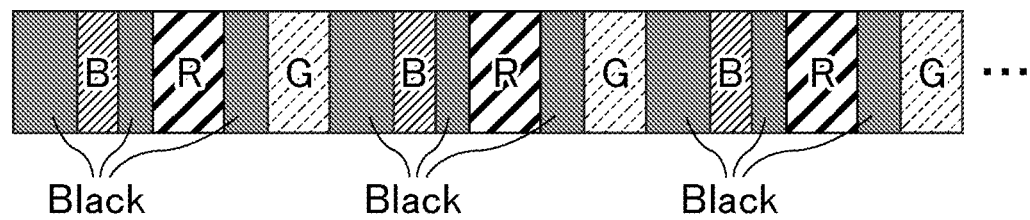
FIG. 10B is a view used in the examination of the relationship between a frame period and the timings of turning on the light sources.

FIG. 10A and FIG. 10B each are a schematic view showing an examination of the relationship between a frame period and the timings of turning on the light sources. The figures show an example in which blue is displayed. As shown in FIG. 10A, in each frame period a trigger signal (timing controller) is input to drive the liquid crystal display device. In this example, the frequency of each subframe period was 180 Hz, and the frequency of each frame period was 60 Hz. In the bar graph of an LC device period (LC drive period), "ON" means the voltage application period, and "OFF" means no voltage application period. In the bar graph of LED light sources (LED B/L Lighting), "Black" means a light-off period of light sources, "B" means a light-on period of blue light, "G" means a light-on period of green light, and "R" means a light-on period of red light. The order of the light sources and the light-on/light-off periods in this case are shown in the schematic view in FIG. 10B. In FIG. 10B, "Black" means a light-off period of light sources, "B" means a light-on period of blue light, "G" means a light-on period of green light, "R" means a light-on period of red light. Each light-on period is adjusted by adjusting the luminance values of LEDs (the number of LEDs) used as the light sources of the corresponding color. In solid-color display, the timings of turning on the light sources (specifically, the position where sequential lighting starts) each are adjusted to before, during, or after the period y in FIG. 10A according to the response waveform. As described above, as a result of examining the timings of turning on the light sources, a mode was found suitable in which each frame period includes display periods in the order of the R display period, the black display period, the B display period, the black display period, and the G display period.

The controller preferably adjusts the timings of turning on the light sources according to the optical response waveform of the liquid crystal display panel. For example, suitably, the controller is configured to turn off the light source within 1.20 to 2.45 ms from a fall-time starting point on an optical response waveform obtained at a top edge of the liquid crystal display panel in each frame period after a trigger signal is input for the frame period. The expression "within 1.20 to 2.45 ms from a fall-time starting point on an optical response waveform obtained at a top edge of the liquid crystal display panel" is the period during which the color gamut in the central portion of the liquid crystal display panel is maximum as described later. Turning off the light sources within this period enables a higher color gamut and a higher solid-color luminance.

The frequency of each subframe period is preferably 180 Hz or higher. This can further increase the response speed in rise time. In particular, the frequency of each subframe period is more preferably from 180 to 480 Hz. The frequency of each frame period is preferably 50 Hz or higher, more preferably 60 Hz or higher. Particularly preferred is a mode in which each subframe period includes an R display period, a G display period, and a B display period, and the frequency of each frame period is 60 Hz or higher. Also, the frequency of each frame period is preferably 120 Hz or lower.

Preferably, in at least one of the subframe periods, the liquid crystal display panel is scanned at 480 to 720 Hz (i.e., 1.38 to 2.08 ms) twice or more. This can further increase the solid-color luminance. In the liquid crystal display device of the present embodiment, scanning the display panel at a rate equivalent to 480 Hz (2.08 ms) twice enables the solid-color luminance to reach the maximum grayscale value (grayscale level of 255) in the case of employing a static driving method.

Figure 11:
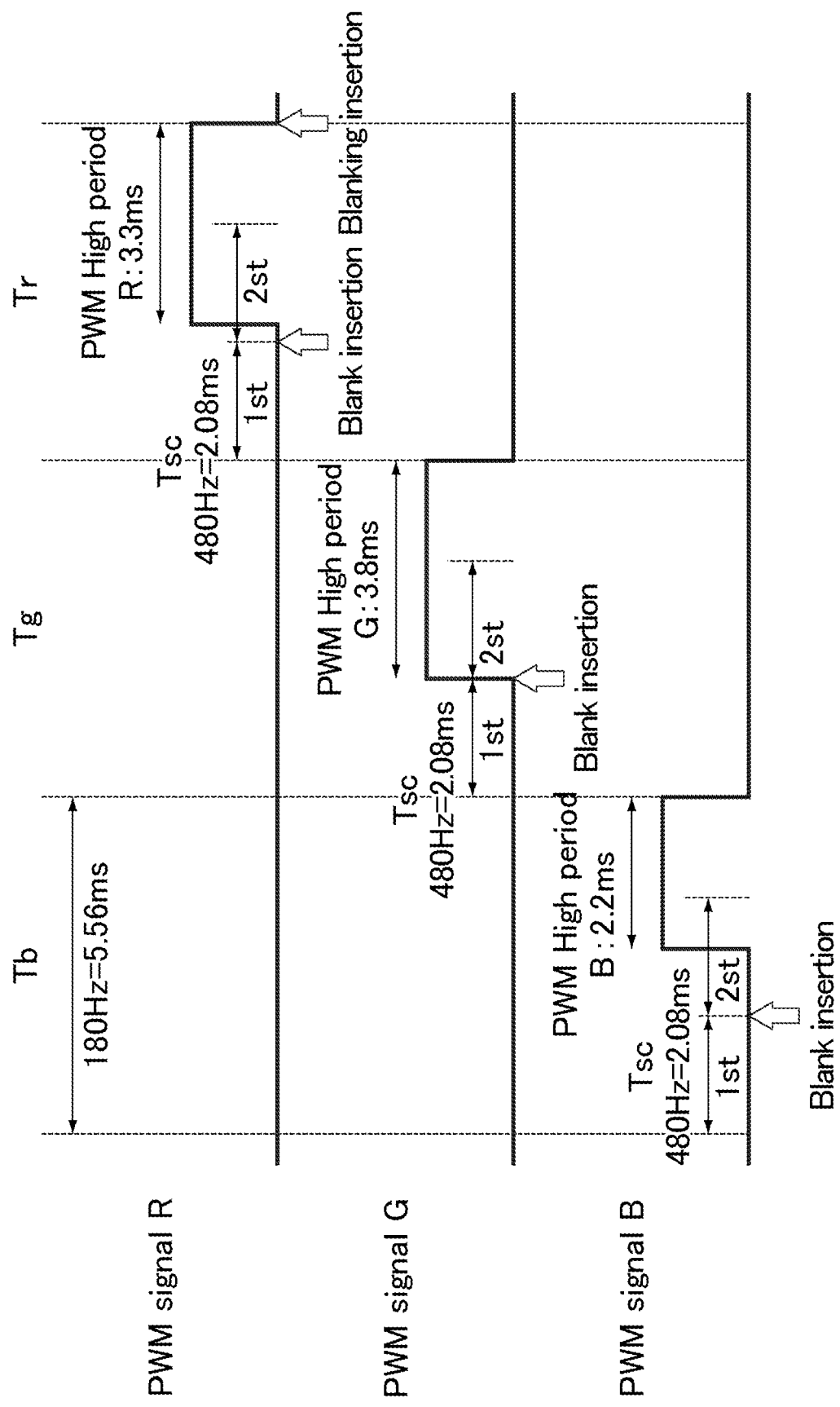
FIG. 11 is a timing chart showing the FSC driving system in the liquid crystal display device of Embodiment 1.

FIG. 11 is a timing chart showing the FSC driving system in the liquid crystal display device of the present embodiment. As shown in FIG. 11, each frame period includes three subframe periods, namely a blue display period Tb, a green display period Tg, and a red display period Tr. The first half of each subframe period (the period before the PWM signal rises) corresponds to a scanning period Tsc. The light-on period of a light source is 2.2 ms for the blue light, 3.8 ms for the green light, and 3.3 ms for the red light, and the lighting order is set to this order. Different light-on periods are set for different colors to adjust the color balance. Each light-on period is adjusted by adjusting the luminance values of LEDs (the number of LEDs) used as the light sources of the corresponding color. PWM means pulse width modulation.

In FIG. 11, the liquid crystal display panel is scanned at 480 Hz (2.08 ms) twice. For each frame period, the total duration of scanning RGB three colors is 12.48 ms (2.08 ms for each x twice x three colors), and the total duration of the break periods after the scanning processes in the subframe periods is 4.20 ms (1.40 ms for each x three colors). In this case, each frame period is 16.68 ms (about 60 Hz). In each subframe period, a blank may be inserted as appropriate between the first scanning (1st) and the second scanning (2nd). The blue display period Tb and the green display period Tg are internally fixed, and insertion of blanking for the red display period Tr is finely adjusted in synchronization with the signal input. In the green display period, the timing of starting the second scanning coincides with the timing of turning on the green light.

The liquid crystal display device of the present embodiment includes components mounted by a TAPE automated bonding (TAB) or chip on film (COF) technique.

Herein, scanning means processing of writing liquid crystal signals from a first side toward a second side of the liquid crystal display panel. The first side is opposite the side where the components are mounted by the TAB or COF technique on the liquid crystal display panel (i.e., the first side corresponds to the bottom edge of the liquid crystal display panel). The second side is where the components are mounted by the TAB or COF technique (i.e., the second side corresponds to the top edge of the liquid crystal display panel).

Figure 12:
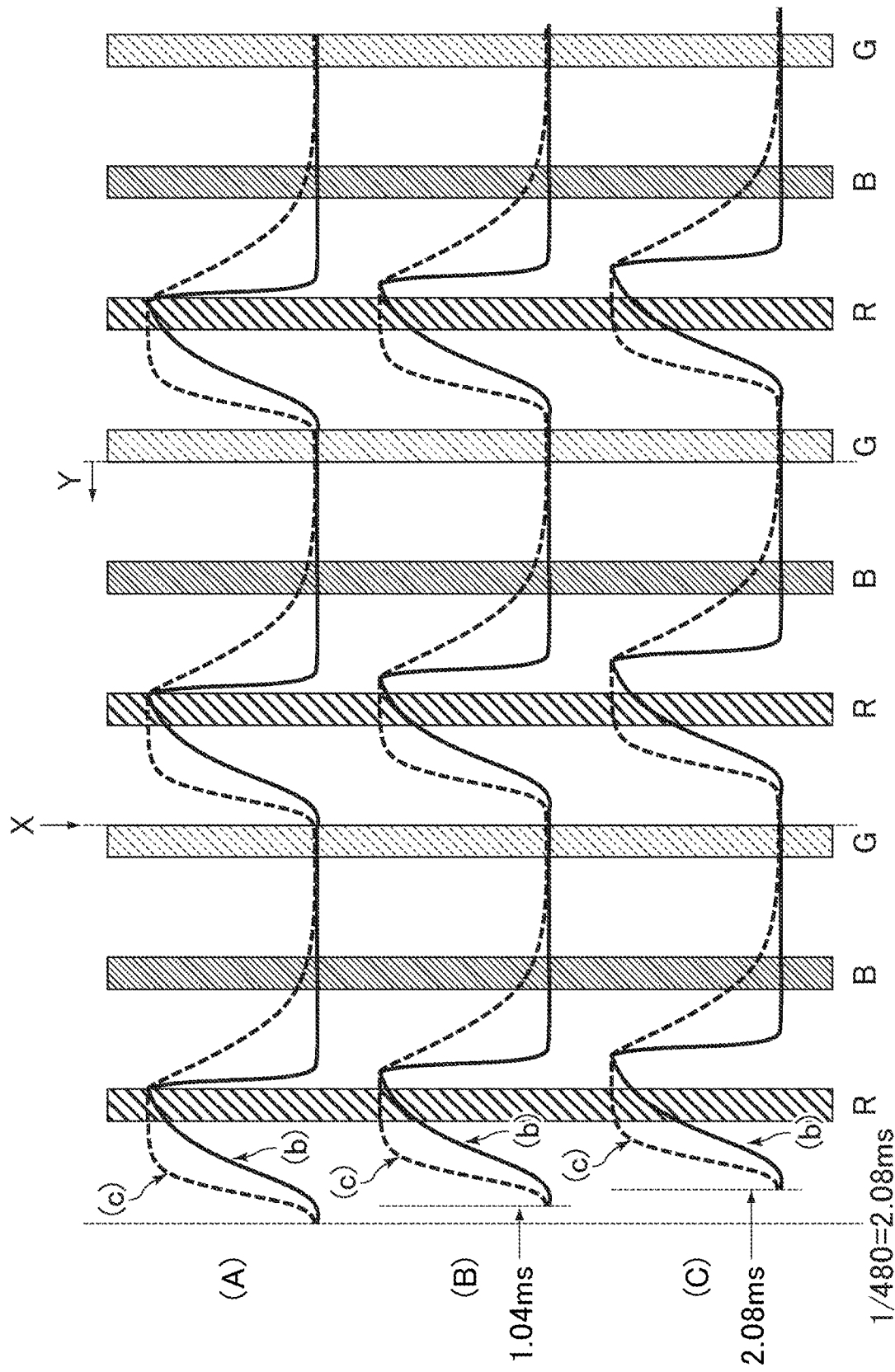
FIG. 12 is a waveform chart showing the timings of turning on the light sources in liquid crystal display devices driven as shown in FIG. 11.

FIG. 12 is a waveform chart showing the timings of turning on the light sources in liquid crystal display devices driven as shown in FIG. 11. In FIG. 12, the horizontal axis shows time (ms) and the vertical axis shows normalized luminance when On-Off-Off waveform signals are input (solid-color display). The waveforms (A) are the response waveforms when a trigger signal is input simultaneously with the start of scanning (scanning start time, or the side opposite the TAB or COP-mounted side of the liquid crystal display panel). The waveforms (B) are the response waveforms when a trigger signal is input after 1.04 ms from the start of scanning (scanning mid-time, or the center of the liquid crystal display panel). The waveforms (C) are the response waveforms when a trigger signal is input after 2.08 ms from the start of scanning (scanning end time, or the TAB or COF-mounted side of the liquid crystal display panel).

In each of the response waveforms (A), (B), and (C) in FIG. 12, the line (c) shows a waveform when a 1D-mode liquid crystal display panel with a single liquid crystal alignment axis is used. The line (b) shows a waveform when a TN-mode liquid crystal display panel is used.

The timings of turning on the light sources are adjusted according to the response waveforms (b) and (c) in FIG. 12. For example, in the case of green light, the light source for green light is turned off at the timing X, at which the scanning in the red display period simultaneously starts. In this case, the light-on period of green light can be adjusted by shifting the timing of turning on the light source in the range of X to Y. The timings of turning on the light sources in the liquid crystal display device of the present embodiment can be adjusted by the same technique.

Figure 13:
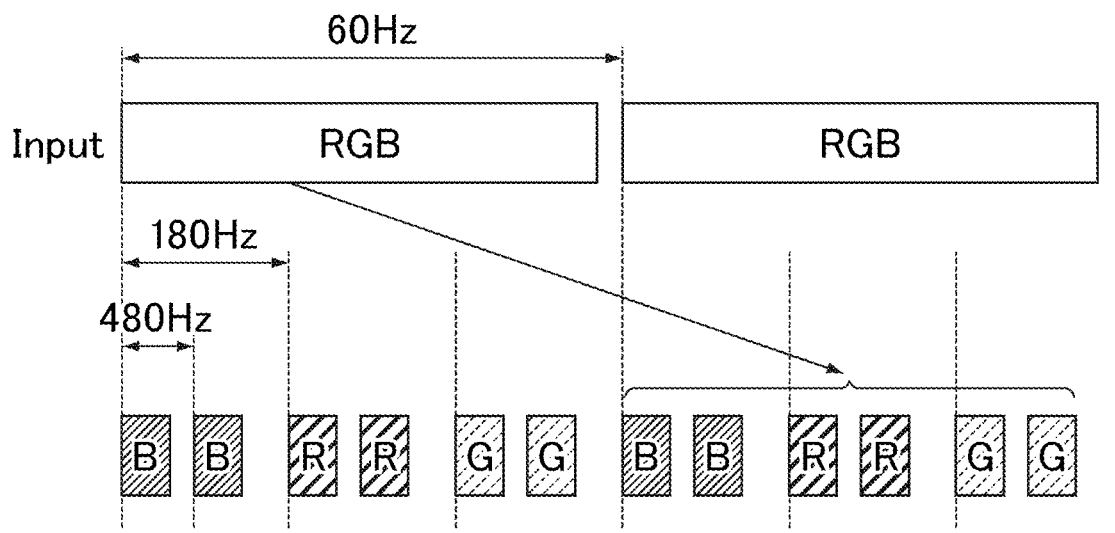
FIG. 13 is a view showing an example of the outline of the FSC driving system.

FIG. 13 is a view showing an example of the outline of the FSC driving system. In this example, the frequency of each frame period was 60 Hz, the frequency of each subframe period was 180 Hz, and the frequency of the period of scanning the liquid crystal display panel was 480 Hz. The lighting order of the light sources was B, R, and G.

In FIG. 13, the oblique arrow (the arrow pointing toward the bottom right) means that for a Tcon input, the outputs to the liquid crystal display panel and the backlight are delayed by one frame period.

Figure 14:
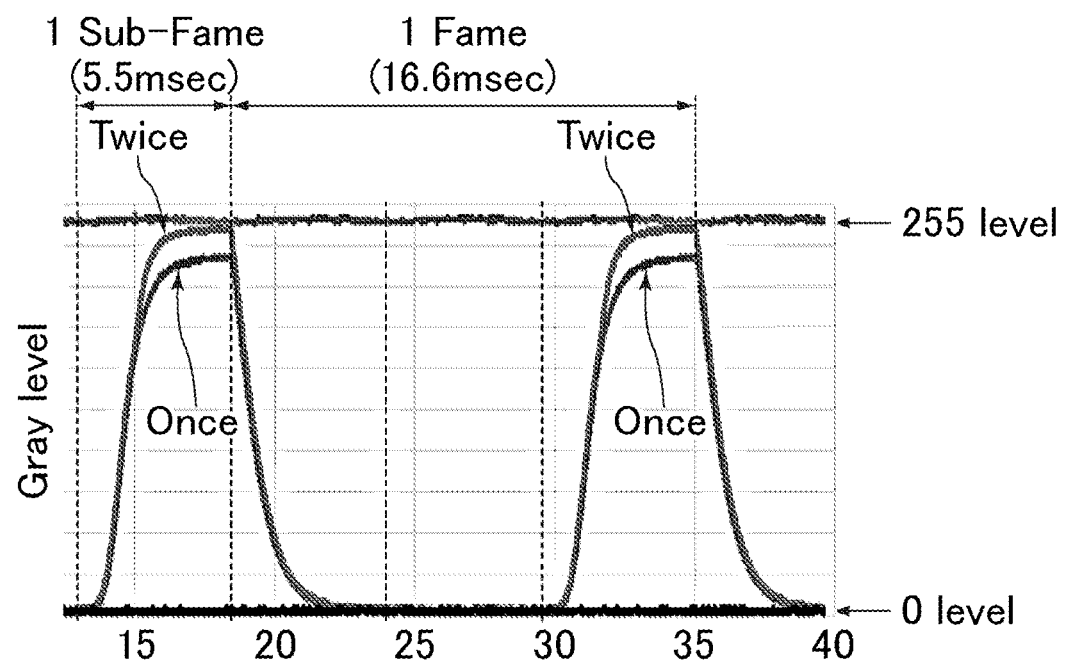
FIG. 14 is a view showing an examination of the relationship between the luminance and the number of scanning processes for a liquid crystal display panel employing the FSC driving system shown in FIG. 13 based on the response waveforms.

FIG. 14 is a view showing an examination of the relationship between the luminance and the number of scanning processes for a liquid crystal display panel employing the FSC driving system shown in FIG. 13 based on the response waveforms. In FIG. 14, each frame period is 16.6 ms and each subframe period is 5.5 ms. The vertical axis shows grayscale level (also referred to as "gray level"), and the "255 level" line indicates the highest grayscale value (grayscale level of 255) when a static driving method is employed.

As shown in FIG. 14, the grayscale level does not reach the 255 level after one-time scanning (Once). This is presumably because when the FSC driving system is employed, the liquid crystal layer of the liquid crystal display panel (e.g., TFT panel) exhibits C-V characteristics dependent on the liquid crystal alignment (also referred to as the capacitance-voltage characteristics with dependency) in the vertical electric field in the cell thickness direction. Yet, two-time scanning (Twice) allows the grayscale level to reach the 255 level. This is presumably because multiple times of scanning improved the C-V characteristics. The capacitance-voltage characteristics with dependency can also be improved by further increasing the auxiliary capacitance of the liquid crystal display panel, which, however, requires a trade-off with the aperture ratio.

Figure 15A:
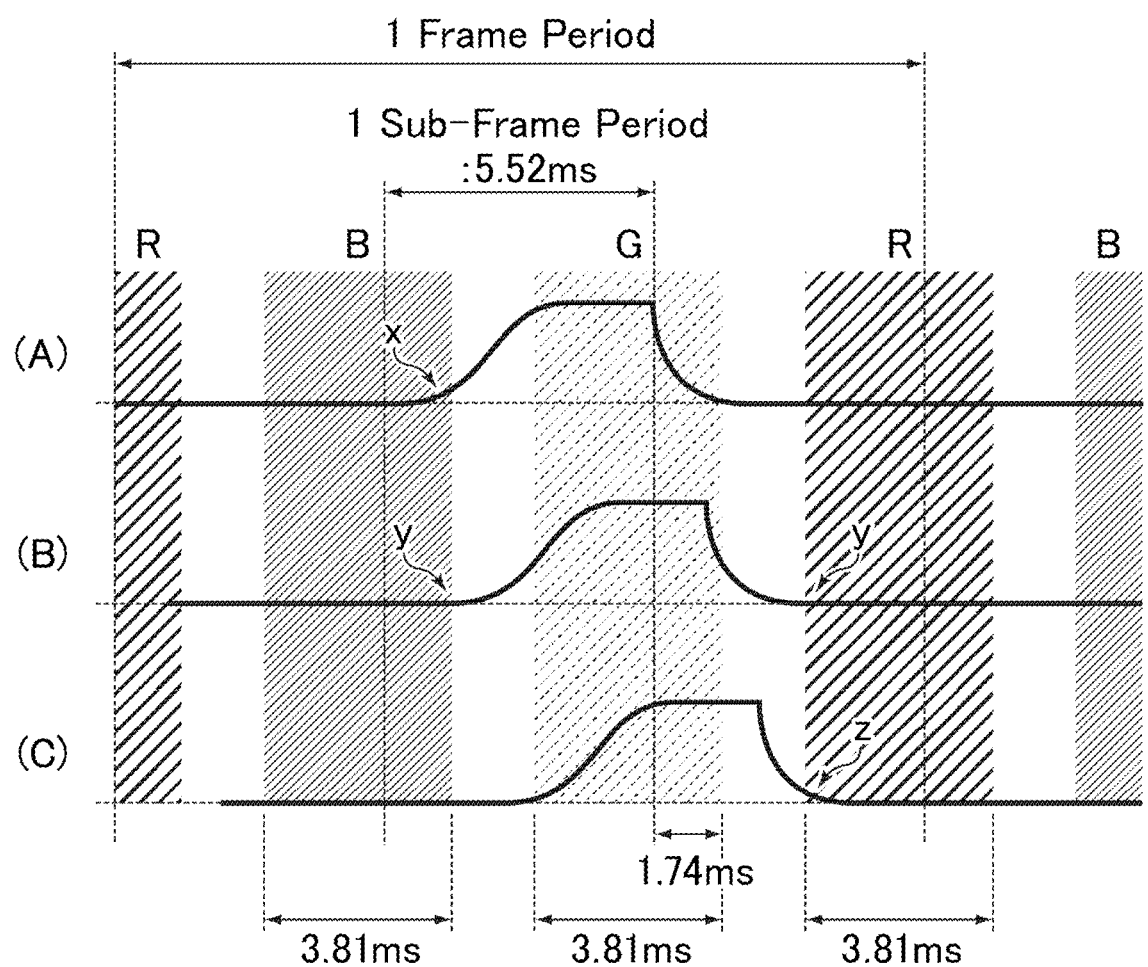
FIG. 15A is a view showing an examination of the timing of turning on the light source to display green on the liquid crystal display panel employing the FSC driving system shown in FIG. 13.
Figure 15B:
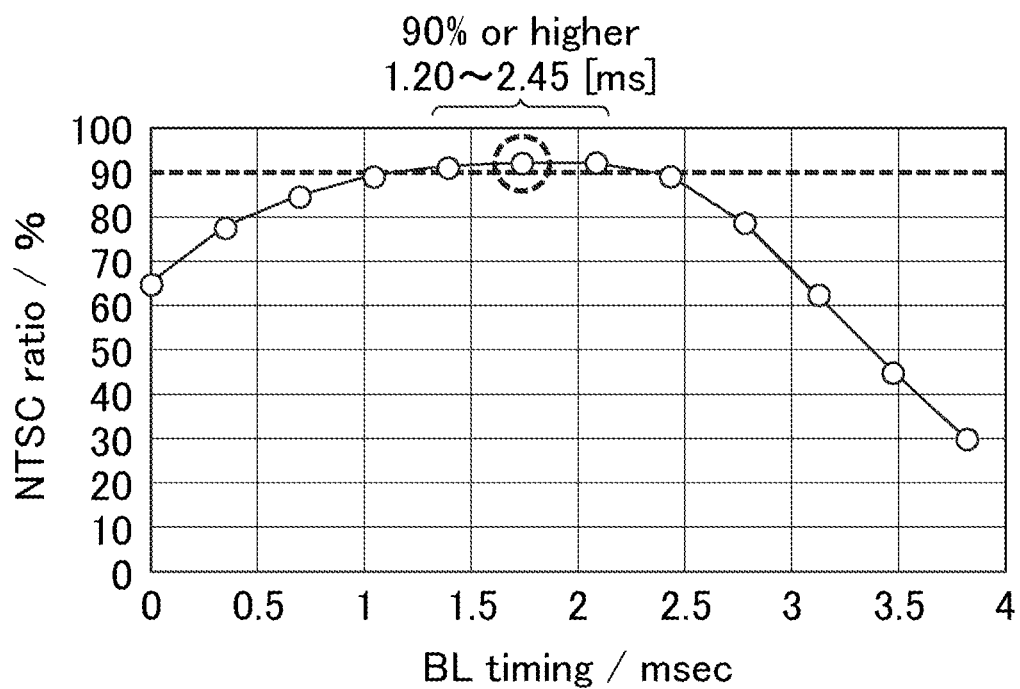
FIG. 15B is a view showing an examination of the timing of turning on the light source to display green on the liquid crystal display panel employing the FSC driving system shown in FIG. 13.

FIG. 15A and FIG. 15B each are a view showing an examination of the timing of turning on the light source to display green on the liquid crystal display panel employing the FSC driving system shown in FIG. 13. In FIG. 15A and FIG. 15B, each subframe period is 5.52 ms. In FIG. 15A, the line (A) shows the response waveform in the top portion of the liquid crystal display panel (i.e., the viewing surface side), the line (B) shows the response waveform in the central portion of the liquid crystal display panel, and the line (C) shows the response waveform in the bottom portion of the liquid crystal display panel (i.e., the back surface side). In green display, blue was slightly mixed in the top portion of the liquid crystal display panel (the x part of the line (A)) and red was slightly mixed in the bottom portion of the liquid crystal display panel (the z portion of the line (C)), while almost no color mixing was observed in the central portion of the liquid crystal display panel (the y parts of the line (B)). The NTSC ratio obtained from the line (A) was 79%, the maximum NTSC ratio obtained from the line (B) was 93%, and the NTSC ratio obtained from the line (C) was 84%.

FIG. 15B is a graph of NTSC ratio (%) in the central portion of the liquid crystal display panel against the horizontal axis (ms) showing time (ms) from turning on of the green light source, taken as 0 (ms), to turning off the light source. In the central portion, the NTSC ratio was 90% or higher in the period within 1.20 to 2.45 ms from the fall-time starting point on the response waveform in the top portion (top edge) of the liquid crystal display panel (the period within "1.74 ms" in FIG. 15A). In other words, this period is a period in which the color gamut in the central portion of the liquid crystal display panel is maximized. The central portion of the liquid crystal display panel most attracts attention of a viewer. Turning on the green light source within the period above can achieve an even higher color gamut and thus further increase the solid-color luminance.

The liquid crystal display device of the present embodiment has an NTSC ratio of preferably 90% or higher, more preferably 91% or higher, still more preferably 92% or higher. In particular, the NTSC ratio in the central portion of the liquid crystal display panel is suitably 90% or higher, more preferably 91% or higher, still more preferably 92% or higher.

Figure 16:
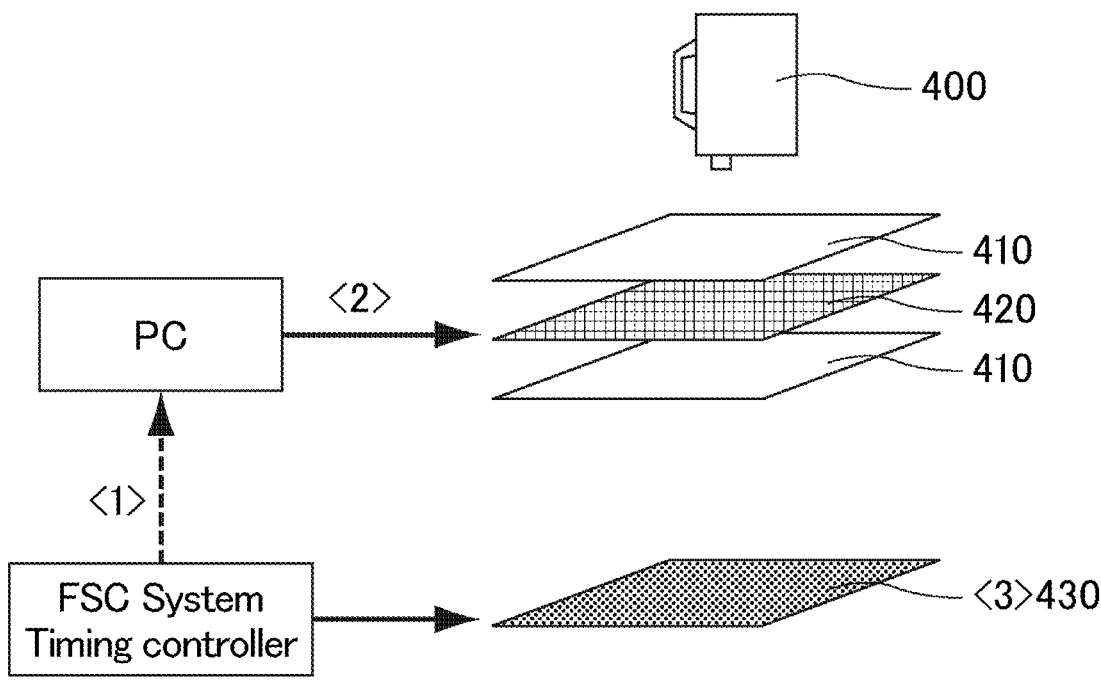
FIG. 16 is a view showing a method of measuring the NTSC of a TFT panel.

FIG. 16 is a view showing a method of measuring the NTSC of a TFT panel. The TFT panel here means a liquid crystal display panel including a TFT substrate as the first substrate. The polarizing plate shown in FIG. 16 is not used when the liquid crystal display panel itself already includes a polarizing plate.

Herein, the NTSC ratio of the liquid crystal display device and the NTSC ratio of the liquid crystal display panel can be determined by the method shown in FIG. 16.

As shown in FIG. 16, when the NTSC of the TFT panel is measured, a TFT panel (test panel) 420 as the measurement target sandwiched between paired polarizing plates 410 is prepared. The displaying system of On-Off-Off signals by the FSC system is used. First, a trigger signal is input to the control computer (<1>) and a panel input signal is input to the test panel (<2>). Then, using the FSC driving system, light sources 430 are driven such that RGB three color lights are time-divisionally emitted (<3>). The luminance ($cd/m^2$) of the test panel is measured with a spectroradiometer 400 from the side opposite the light sources 430. The spectroradiometer may be, for example, "SR-UL1R" available from Irie Corporation. In the above-described FIG. 15B, the NTSC ratio was determined by measuring the NTSC by the method shown in FIG. 16.

Figure 17A:
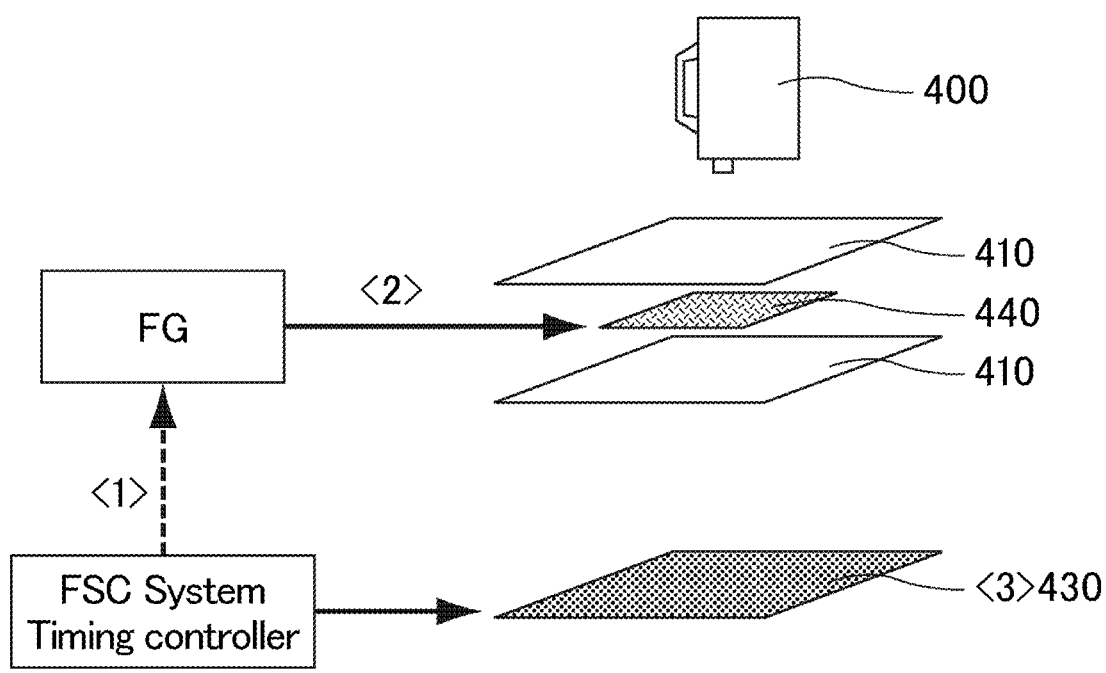
FIG. 17A is a view showing a method of measuring the NTSC of a subject including no TFT substrate.

FIG. 17A is a view showing a method of measuring the NTSC of a subject including no TFT substrate. This method enables measurement of the NTSC of the liquid crystal layer (liquid crystal material) and thus is useful in selecting a liquid crystal material.

As shown in FIG. 17A, a liquid crystal material (test cell) 440 as the measurement target sandwiched between paired polarizing plates 410 is prepared. The test cell sandwiched between paired alignment films may be further sandwiched between paired polarizing plates. The displaying system of On-Off-Off signals by the FSC system is used. First, a trigger signal is input through a function generator (FC) (<1>) and an LC voltage waveform is obtained using the FSC driving system (<2>). Then, using the FSC driving system, light sources 430 are driven such that RGB three color lights are time-divisionally emitted (<3>). The luminance ($cd/m^2$) of the test cell is measured with a spectroradiometer 400 from the side opposite the light sources 430. The spectroradiometer may be, for example, "SR-UL1R" available from Irie Corporation.

Figure 17B:
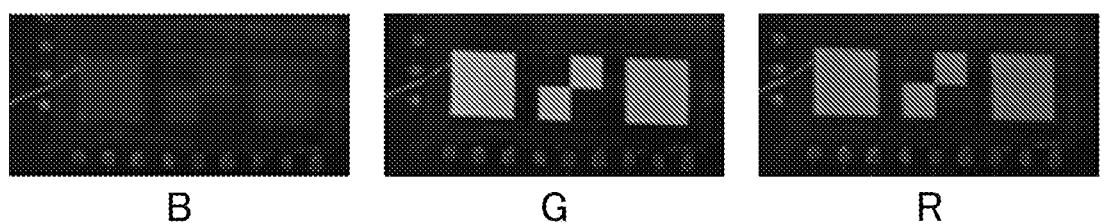
FIG. 17B shows displayed images in solid-color display of blue (B), green (G), and red (R) when the test cell contains a liquid crystal material (c1) (1D-VA mode) and includes a pair of alignment films made of polyimide.
Figure 17C:
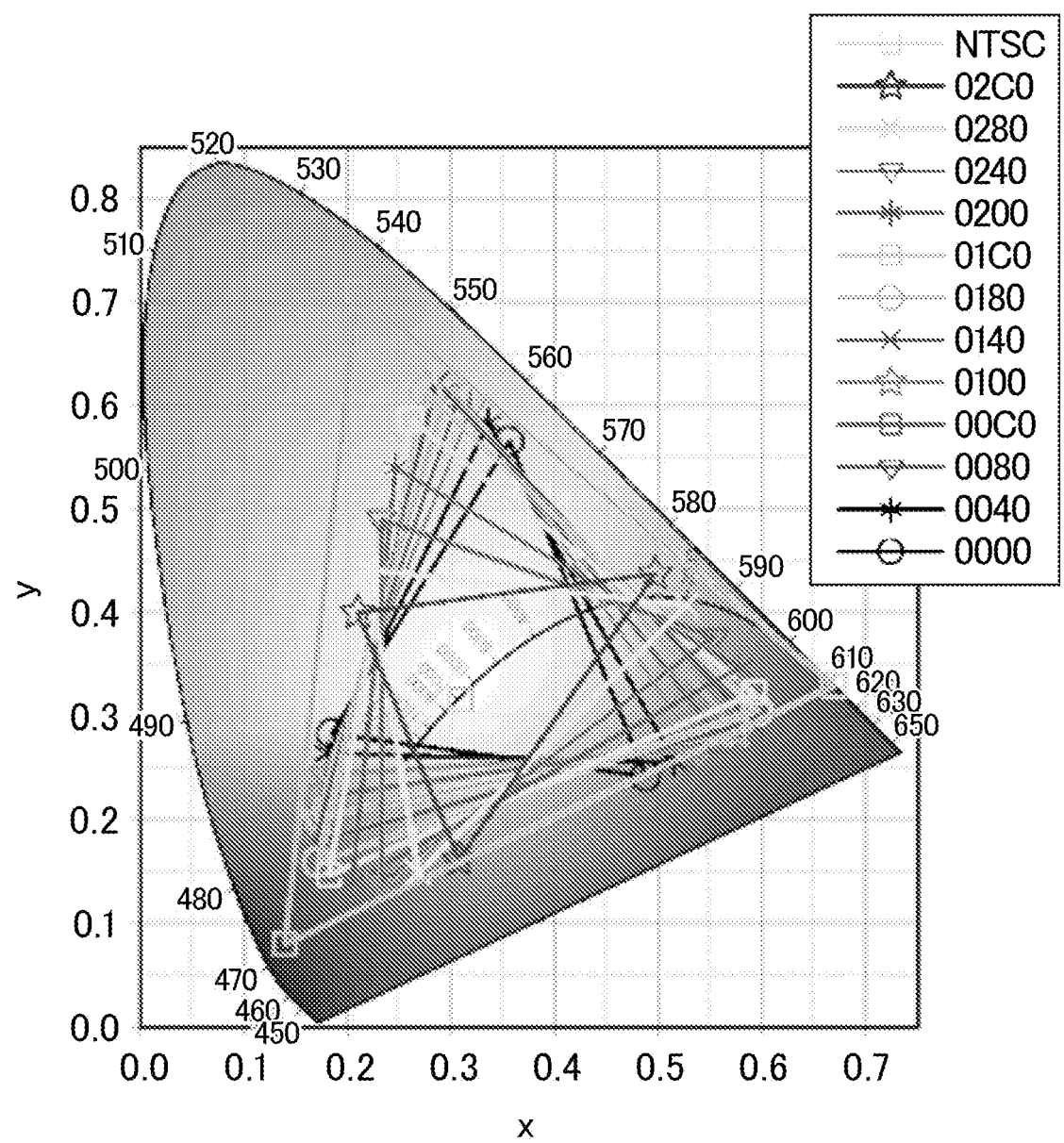
FIG. 17C is a graph showing the results of determining the NTSC ratios by measuring the NTSC of the test cell used in FIG. 17B by the method shown in FIG. 17A.

When the test cell is formed from a liquid crystal material (c1) (1D-VA mode) having the physical properties shown in the later-described Table 1 and Table 2 and the paired alignment films (VA photoalignment films) are polyimide films, the blue (B), green (G), and red (R) colors are displayed in this order as shown in FIG. 17B (solid-color display). The NTSC of this test cell was measured by the method shown in FIG. 17A, with which the NTSC ratio was then determined. FIG. 17C shows the results. The smaller the revolution of a triangle, presumably, the smaller the color mixing ratio and the greater the NTSC ratio (represented by the "NTSC" line in FIG. 17C).

Providing color display using the FSC driving system, the liquid crystal display device of the present embodiment requires no color filters. Thus, the liquid crystal display device of the present embodiment includes no color filters. In other words, unlike a color filter-system liquid crystal display panel, the liquid crystal display panel in the liquid crystal display device of the present embodiment includes no color pixels such as R sub-pixels for displaying red components, G sub-pixels for displaying green components, and B sub-pixels for displaying blue components. The pixels in the liquid crystal display panel 1 each independently function as a pixel providing full-color display.

Figure 18:
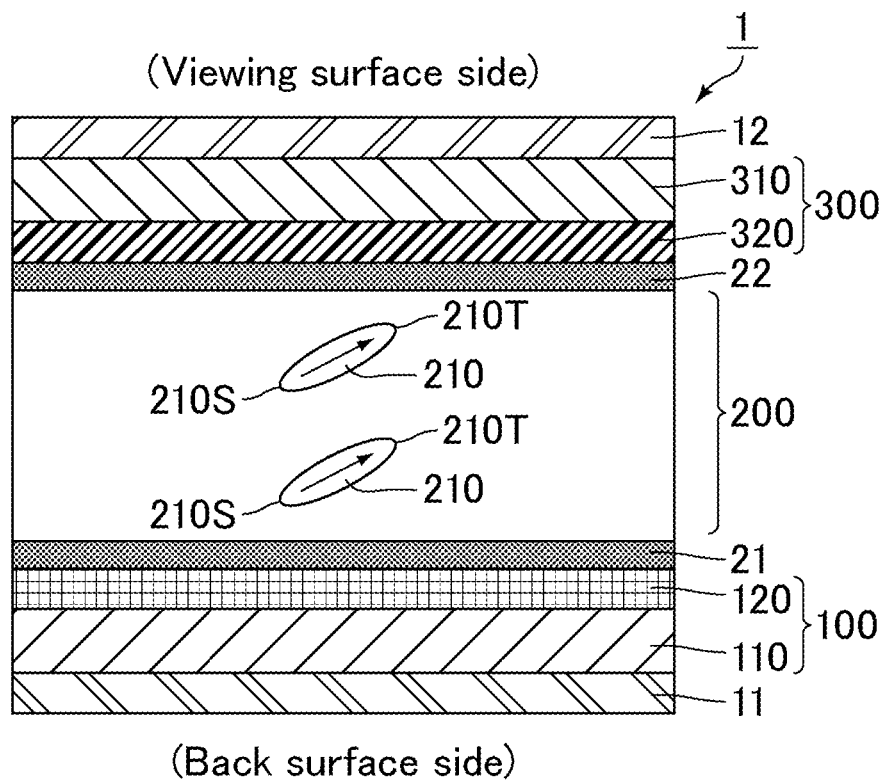
FIG. 18 is a schematic cross-sectional view of an example of a liquid crystal display panel of Embodiment 1.

FIG. 18 is a schematic cross-sectional view of an example of a liquid crystal display panel 1 in the liquid crystal display device of the present embodiment. As shown in FIG. 18, the liquid crystal display panel 1 in the present embodiment includes, in the following order, a first substrate 100, a first alignment film 21, a liquid crystal layer 200 formed from a liquid crystal material containing liquid crystal molecules 210, a second alignment film 22, and a second substrate 300, preferably in this order from the back surface side toward the viewing surface side.

Herein, the "viewing surface side" means the side closer to the screen (display surface) of the liquid crystal display device, and the "back surface side" means the side farther from the screen (display surface) of the liquid crystal display device.

The first substrate 100 includes an insulating substrate 110 and pixel electrodes 120 arranged in the row direction and the column direction in a matrix pattern. The second substrate 300 includes an insulating substrate 310 and a common electrode 320.

The alignment of the liquid crystal molecules 210 is switched by applying voltage to the liquid crystal layer 200 using the pixel electrodes 120 and the common electrode 320. In the state with no voltage applied between the pixel electrodes 120 and the common electrode 320, the first alignment film 21 and the second alignment film 22 control the initial alignment of the liquid crystal molecules 210. The state with no voltage applied between the pixel electrodes 120 and the common electrode 320 refers to a state where the voltage applied to the liquid crystal layer 200 is lower than the threshold, including a state where voltage is not substantially applied between the pixel electrodes 120 and the common electrode 320.

The liquid crystal molecules 210 with no voltage applied may be aligned substantially vertically or substantially horizontally, and are preferably aligned substantially vertically, to the main surfaces of the first substrate 100 and the second substrate 300. Hereinafter, the present embodiment is described with reference to an example where the liquid crystal molecules are aligned substantially vertically to the main surfaces.

The phrase "aligned substantially vertically to the main surfaces of the first substrate 100 and the second substrate 300" means that the pre-tilt angle of the liquid crystal molecules 210 is 75° or greater and smaller than 90° relative to the main surface of the first substrate 100 or the second substrate 300. The phrase "aligned substantially horizontally to the main surfaces of the first substrate 100 and the second substrate 300" means that the pre-tilt angle of the liquid crystal molecules 210 relative to the main surface of the first substrate 100 or the second substrate 300 is 0° or greater and 15° or smaller.

The pre-tilt angle of the liquid crystal molecules means the angle of tilt of the long axis of each liquid crystal molecule from the main surface of a substrate with no voltage applied to the liquid crystal layer. The main surface of a substrate means a substrate surface. The polarization axis may be the absorption axis or the transmission axis of a polarizing plate that may be further included in the liquid crystal display panel.

When voltage is applied between the pixel electrodes 120 and the common electrode 320, a vertical electric field is generated in the liquid crystal layer 200, so that the liquid crystal molecules 210 are further tilted at the same tilt azimuth as in the state with no voltage applied.

Herein, the tilt azimuth of the liquid crystal molecules 210 is described appropriately using an alignment vector which, in a plan view of the liquid crystal display panel 1, starts at an initial point (also referred to as a liquid crystal director tail) 210S corresponding to first substrate 100 side long axis ends of the liquid crystal molecules 210 and ends at a terminal point (also referred to as a liquid crystal director head) 210T corresponding to second substrate 300 side long axis ends of the liquid crystal molecules 210. The alignment vector is oriented in the same direction as the tilt azimuth of the liquid crystal molecules 210 relative to the first alignment film 21 on the first substrate 100, while being oriented in the opposite direction from the tilt azimuth of the liquid crystal molecules 210 relative to the second alignment film 22 on the second substrate 300. Herein, the "azimuth" means the direction in a view projected onto a substrate surface, with no consideration given to the angle (polar angle, pre-tilt angle) of tilt from the normal direction of the substrate surface.

When the liquid crystal molecules 210 are aligned substantially vertically (slightly tilted alignment) with no voltage applied, the liquid crystal molecules 210 with voltage applied are further tilted at the same tilt azimuth as in the state with no voltage applied. Thus, the initial point 210S and the terminal point 210T of the alignment vector may be determined with voltage applied to the liquid crystal layer 200.

The liquid crystal display panel 1 of the present embodiment includes pixels arranged in the row direction and the column direction in a matrix pattern. The row direction intersects with the column direction. The row direction is preferably perpendicular to the column direction. More preferably, the row direction coincides with the horizontal direction of the display portion which is to display an image, while the column direction coincides with the vertical direction of the display portion.

The liquid crystal layer 200 includes a first domain and a second domain with different alignment vectors in each region overlapping a corresponding pixel electrode. In other words, each pixel includes two or more regions (domains) in each of which the liquid crystal molecules align in a certain alignment direction. Such domains are specifically driven in, for example, a vertical alignment (vertical electric field) mode of aligning the liquid crystal molecules vertically (substantially vertically) to the main surfaces of the substrates with no voltage applied, or a horizontal alignment (transverse electric field) mode of aligning the liquid crystal molecules horizontally to the main surfaces of the substrates with no voltage applied. In particular, the vertical alignment mode is preferred for sufficient reduction or prevention of blurriness of a transmission image. In the vertical alignment mode, a mode (also referred to as a 2D-ECB•parallel alignment mode) is preferred in which in a plan view of the first domain and the second domain, the alignment vector for the first domain and the alignment vector for the second domain are parallel to each other. Another suitable mode is a mode (also referred to as a 2D-ECB•mountain-shaped alignment mode) in which in a plan view of the first domain and the second domain, a terminal point for liquid crystal molecules in the first domain is closer to the second domain than an initial point for the liquid crystal molecules in the first domain is, and a terminal point for liquid crystal molecules in the second domain is closer to the first domain than an initial point for the liquid crystal molecules in the second domain is. The "2D-ECB" is the abbreviation for "2-Domain Electrically Controlled Birefringence".

In the liquid crystal display panel in the former mode of the above two modes, i.e., the 2D-ECB•parallel alignment mode, the liquid crystal alignment axis are uniform in both the horizontal direction and the vertical direction, and periodical changes in liquid crystal alignment axis are sufficiently reduced, so that the blurriness of a transmission image can be more sufficiently reduced or prevented. Also, excellent viewing angle characteristics with symmetric left-right viewing angles can be achieved. Thus, the 2D-ECB•parallel alignment mode is more preferred. The 2D-ECB•parallel alignment mode liquid crystal display panel, which is in the normally black mode, can also further increase the contrast ratio.

Figure 19:
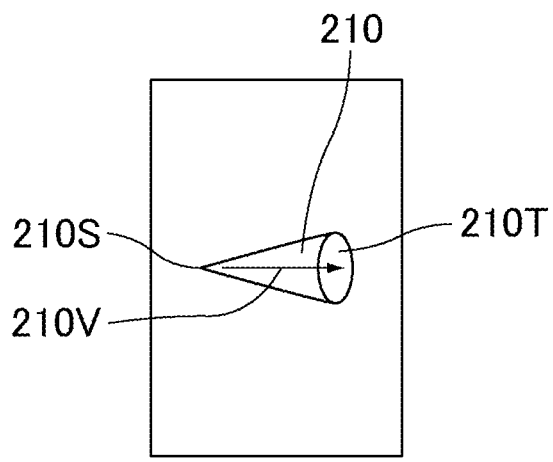
FIG. 19 is a view showing the relationship between the tilt azimuth and the alignment vector of the liquid crystal molecules.

FIG. 19 is a view showing the relationship between the tilt azimuth and the alignment vector of the liquid crystal molecules. For ease of understanding the azimuth at which the liquid crystal molecules 210 are tilted, a liquid crystal molecule 210 is depicted as a pin (circular cone), where the bottom surface of the circular cone indicates the second substrate 300 side (viewer side) while the vertex of the circular cone indicates the first substrate 100 side.

The first alignment film 21 and the second alignment film 22 have been subjected to an alignment treatment such that a first domain 1Pa and a second domains 1Pb with different alignment vectors 210V are arranged side by side in the column direction. This configuration can achieve favorable viewing angle characteristics. Specifically, the first alignment film 21 and the second alignment film 22 have been subjected to an alignment treatment such that in each pixel 1P overlapping a corresponding pixel electrode 120, a first domain 1Pa and a second domain 1Pb with different alignment vectors 210V are arranged side by side in the column direction.

Figure 20:
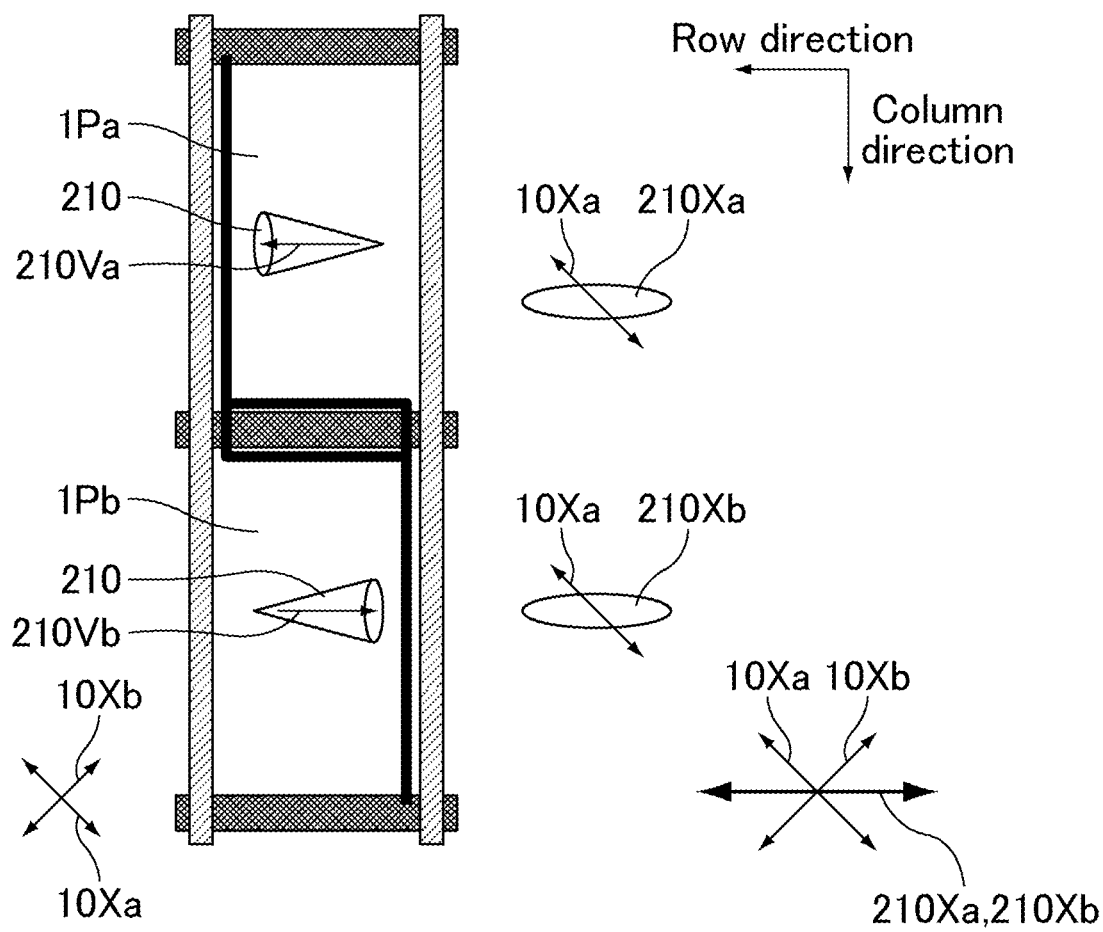
FIG. 20 is a schematic view showing the relationship between the liquid crystal alignment axes and the polarization axes of the liquid crystal display panel of Embodiment 1.

FIG. 20 is a schematic view showing the relationship between the liquid crystal alignment axes and the polarization axes when the liquid crystal display panel of the present embodiment is in the 2D-ECB•parallel alignment mode. A pixel 1P includes a first domain 1Pa and a second domain 1Pb with different alignment vectors arranged side by side in the column direction. These domains can be formed by subjecting the first alignment film 21 and the second alignment film 22 to different alignment treatments. With voltage applied, the liquid crystal molecules 210 in each domain are aligned with a tilt following the alignment vector for the domain. The alignment vector for each domain can be determined based on the orientation of the liquid crystal molecules 210 in the center of the domain in a plan view and in the center of the liquid crystal layer 200 in a cross-sectional view.

As shown in FIG. 20, in a plan view of the first domain 1Pa and the second domain 1Pb, a liquid crystal alignment axis 210Xa in the first domain 1Pa and a liquid crystal alignment axis 210Xb in the second domain 1Pb obliquely cross a polarization axis 10Xa of a first polarizing plate 11 and a polarization axis 10Xb of a second polarizing plate 12 and are parallel to each other. This configuration causes the liquid crystal alignment axis 210Xa in the first domain 1Pa and the liquid crystal alignment axis 210Xb in the second domain 1Pb to cross the polarization axis 10Xa of the first polarizing plate 11 at the same azimuthal angle and to cross the polarization axis 10Xb of the second polarizing plate 12 at the same azimuthal angle. This can reduce or prevent periodical changes in the azimuthal angles of the liquid crystal alignment axes 210Xa and 210Xb relative to the polarization axis 10Xa of the first polarizing plate 11 and the polarization axis 10Xb of the second polarizing plate 12 in each pixel 1P, thus reducing or preventing blurriness of a transmission image.

Herein, the expression that two axes (directions) "obliquely cross" means that the angle (absolute value) formed by them is greater than 3° and smaller than 87°, preferably 15° or greater and 75° or smaller, more preferably 25° or greater and 65° or smaller, particularly preferably 35° or greater and 55° or smaller. Also herein, the expression that two axes (directions) are "parallel to each other" means that the angle (absolute value) formed by them is 0° or greater and 3° or smaller, preferably 0° or greater and 1° or smaller, more preferably 0° or greater and 0.5° or smaller, particularly preferably 0° (perfectly parallel). Herein, the expression that two axes (directions) are "perpendicular to each other" means that the angle (absolute value) formed by them is 87° or greater and 90° or smaller, preferably 89° or greater and 90° or smaller, more preferably 89.5° or greater and 90° or smaller, particularly preferably 90° (perfectly perpendicular). The angle formed by two axes (directions) means the acute angle unless this angle is 90°.

As shown in FIG. 20, the liquid crystal alignment axis 210Xa in the first domain 1Pa and the liquid crystal alignment axis 210Xb in the second domain 1Pb are parallel to the row direction. This configuration enables excellent viewing angle characteristics with symmetric left-right viewing angles.

Described above with reference to FIG. 19 and FIG. 20 is a mode where the liquid crystal display panel in the present embodiment is in the 2D-ECB•parallel alignment mode and the liquid crystal alignment axis 210Xa in the first domain 1Pa and the liquid crystal alignment axis 210Xb in the second domain 1Pb are parallel to the row direction. The liquid crystal alignment axis 210Xa in the first domain 1Pa and the liquid crystal alignment axis 210Xb in the second domain 1Pb may also be oblique to the row direction. This mode enables arrangement where the polarization axis of one of the first polarizing plate 11 and the second polarizing plate 12 is parallel to the row direction while the polarization axis of the other is parallel to the column direction. Such an arrangement can reduce the waste in cutting out a polarizing plate from a large polarizing plate than the arrangement where the polarization axes are oblique to the row direction and the column direction, thus reducing the cost for the liquid crystal display panel.

The liquid crystal display panel 1 of the present embodiment has excellent viewing angle characteristics owing to the pixels each including multiple domains. However, when pixels each including multiple domains are used, there may be a region with discontinuous alignment of the liquid crystal molecules 210 in the boundary between adjacent domains. In such a region, the liquid crystal molecules 210 cannot be aligned in the desired direction. This may lead to insufficient transmission of light in the display state, causing the region to be recognized as a dark portion. A linear dark portion is called a dark line. A dark line decreases the luminance of the pixel, thus decreasing the light use efficiency of the liquid crystal display panel. The position and size of the dark line are apt to vary by pixel. The dark lines therefore make the optical characteristics of the pixels uneven to ultimately decrease the evenness of display in observation of the entire liquid crystal display panel. Various dark lines are generated because the alignment in the boundary between adjacent domains depends on the relationship between the alignment axes in the adjacent domains, for example. Such various dark lines can be prevented by providing a structure to determine (fix) the positions of the dark lines. For example, a slit may be provided in the boundary between the first domain 1Pa and the second domain 1Pb in the pixel electrode 120 to stabilize the shape of the dark line.

In other words, a slit is preferably provided in the boundary between the first domain 1Pa and the second domain 1Pb in the pixel electrode 120. Specifically, the slit preferably has a width of greater than 0 µm and 4.5 µm or smaller. With such a slit provided, electric field distortion due to the slit occurs in the vicinity of the boundary between the first domain 1Pa and the second domain 1Pb. As a result, the continuous alignment change in the boundary between the first domain 1Pa and the second domain 1Pb can be intentionally limited to 90° or smaller to fix the dark line, and thus the luminance of the dark line portion can be increased.

Also suitable is providing a light-shielding member in the boundary between the first domain 1Pa and the second domain 1Pb. Since the liquid crystal alignment continuously varies in the boundary between the first domain 1Pa and the second domain 1Pb, the liquid crystal alignment axis 210Xa in the first domain 1Pa and the liquid crystal alignment axis 210Xb in the second domain 1Pb may not be parallel to each other to cause a dark line. Here, with the light shielding member in the boundary between the first domain 1Pa and the second domain 1Pb, the dark line portion can be shielded from light and blurriness can be further reduced. Examples of the light shielding member include a black matrix.

Next, the liquid crystal display panel 1 is further described.

The first substrate 100 may be, for example, a thin film transistor (TFT) substrate. The TFT substrate can be one commonly used in the field of liquid crystal display panels. The TFT substrate includes an insulating substrate and, on the insulating substrate in the display region, parallel gate lines extending in the row direction and parallel source lines extending in the direction intersecting the gate lines via an insulating film (in the column direction). The gate lines and the source lines as a whole form a grid pattern to define each pixel. At the intersection point of a source line and a gate line is disposed a thin film transistor serving as a switching element.

The second substrate 300 includes the common electrode 320. The common electrode 320 faces the pixel electrodes 120 via the liquid crystal layer 200. A vertical electric field is generated between the common electrode 320 and the pixel electrodes 120 to tilt the liquid crystal molecules 210, so that display is provided.

The pixel electrodes 120 and the common electrode 320 may be transparent electrodes and may be formed from, for example, a transparent conductive material such as indium tin oxide (ITO), indium zinc oxide (IZO), zinc oxide (ZnO), or tin oxide (SnO), or from an alloy of any of these materials.

The liquid crystal layer 200 contains the liquid crystal molecules 210 that align substantially vertically to the main surfaces of the first substrate 100 and the second substrate 300 with no voltage applied. The liquid crystal layer 200 controls the amount of light transmission based on the change in alignment of the liquid crystal molecules 210 in response to the electric field generated inside the liquid crystal layer 200 by voltage applied between the pixel electrodes 120 and the common electrode 320.

The liquid crystal layer 200 is formed from a liquid crystal material containing the liquid crystal molecules 210.

The anisotropy of dielectric constant ($\Delta\varepsilon$) of the liquid crystal molecules 210 defined by the following formula: $\Delta\varepsilon$=(dielectric constant in long axis direction)−(dielectric constant in short axis direction) may be positive or negative. In the present embodiment employing the liquid crystal molecules 210 that align substantially vertically to the main surfaces of the first substrate 100 and the second substrate 300 with no voltage applied, the liquid crystal molecules 210 preferably have a negative anisotropy of dielectric constant. Liquid crystal molecules having a positive anisotropy of dielectric constant are also referred to as a positive liquid crystal, while liquid crystal molecules having a negative anisotropy of dielectric constant are also referred to as a negative liquid crystal. The long axis direction of a liquid crystal molecule is the slow axis direction.

Preferably, the pre-tilt angle of the liquid crystal molecules 210 is 89° or smaller. This can further increase the response speed in rise time and thus further increase the solid-color luminance. Although a dark line may be generated between a first domain and a second domain with different alignment vectors, the pre-tilt angle of the liquid crystal molecules 210 falling within the above range leads to an increase in alignment controlling force for liquid crystal molecules 210 present in the vicinity of the first substrate and the second substrate. This can more easily align the liquid crystal alignment axes of the liquid crystal molecules, thus narrowing down the dark line. As a result, the transmittance can also be increased. The pre-tilt angle is more preferably 88.5° or smaller, still more preferably 88° or smaller, particularly preferably 87.5° or smaller. In consideration of the trade-off relationship between the mode efficiency and the properties including the black luminance and the contrast ratio, the pre-tilt angle is preferably 85° or greater, more preferably 86° or greater, still more preferably 87° or greater.

Preferably, the birefringence $\Delta n$ of the liquid crystal material is 0.12 or higher. This enables a higher transmittance while achieving high-speed response. The birefringence $\Delta n$ is more preferably 0.122 or higher, still more preferably 0.124 or higher. In order to further increase the contrast ratio, the birefringence $\Delta n$ is preferably 0.2 or lower, more preferably 0.18 or lower, still more preferably 0.14 or lower. The birefringence $\Delta n$ is most preferably from 0.1246 to 0.1399. With such a birefringence $\Delta n$, the transmittance and the contrast ratio are still further increased.

The retardation (phase difference) introduced by the liquid crystal layer is from 330 to 340 nm in order to achieve the desired transmittance. In terms of the response property, the smaller the cell thickness (thickness of the liquid crystal layer), the better. However, with a small cell thickness, the liquid crystal material is required to have liquid crystal physical properties of a large birefringence $\Delta n$ and a high anisotropy of dielectric constant $\Delta\varepsilon$. There is a limit to this trade-off between these liquid crystal physical properties and other physical properties. Also, a small cell thickness raises a concern about a decrease in yield due to leakage in the top-bottom direction. Still, in terms of reduction in amount of the liquid crystal material used, the smaller the cell thickness, the better. With consideration given to all these factors, a suitable liquid crystal material and a suitable cell thickness are selected.

The suitable thickness (cell thickness) of the liquid crystal layer 200 is from 1.65 to 2.5 μm. In particular, when the birefringence $\Delta n$ of the liquid crystal material is 0.2, the cell thickness is preferably from 1.65 to 1.7 μm. When the $\Delta n$ is 0.18, the cell thickness is preferably from 1.83 to 1.89 μm.

As described above, increasing the birefringence $\Delta n$, i.e., setting the birefringence $\Delta n$ to 0.12 or higher, enables reduction in cell thickness when the retardation introduced by the liquid crystal layer is constant. The response speed of the liquid crystal molecules is inversely proportional to the cell thickness squared. Thus, increasing the birefringence $\Delta n$ can effectively reduce the time taken to respond (i.e., increase the response speed). The upper limit of the birefringence $\Delta n$ is preferably set in view of the temperature dependency, a drop in yield due to foreign substances, and other factors. Specifically, the birefringence $\Delta n$ is suitably set within the above range. As described above, the present invention can achieve high-speed response without deteriorating the productivity and temperature characteristics.

Preferably, the rotational viscosity coefficient $\gamma_1$ of the liquid crystal material is less than 100 mPa·s. This can increase the response speed in fall time, thus widening the color gamut. The response speed in rise time can also be increased, so that the solid-color luminance can be further increased. The rotational viscosity coefficient $\gamma_1$ is more preferably 90 mPa·s or less, still more preferably 80 mPa·s or less, particularly preferably 75 mPa·s or less, yet more preferably 73 mPa·s or less. The rotational viscosity coefficient $\gamma_1$ is also preferably 50 mPa·s or more, more preferably 60 mPa·s or more, still more preferably 70 mPa·s or more, most preferably from 70 to 73 mPa·s.

Herein, the rotational viscosity coefficient $\gamma_1$ can be determined, for example, with a rotational viscometer in conformity with JIS Z8803:2011 (Methods for viscosity measurement of liquid). The rotational viscosity coefficient $\gamma_1$ can also be determined by the transient current technique of determining the rotational viscosity coefficient by analyzing the transient current characteristics of a parallel alignment cell (MASAHIRO IMAI, Mol. Cryst. Liq. Cryst., Vol. 262, 267 (1995)), the relaxation method of determining the rotational viscosity coefficient from the optical response characteristics of a parallel alignment cell (Shin-Tson, Wu and Chiung-Sheng Wu, Phys. Rev. A42, 2219 (1990)), or the rotating magnetic field method of calculating $\gamma_1$ by measuring the torque acting on a cylindrical liquid crystal in a configuration that can apply a rotating magnetic field to the liquid crystal (V. Tsvetkov, Acta Physicochim (USSR), 10, 557 (1939)), for example. Preferably, the present invention employs the method of determining the rotational viscosity coefficient with a rotational viscometer in conformity with JIS Z8803:2011. Suitably, the value (rotational viscosity coefficient $\gamma_1$) obtainable by this method falls within the above preferred range.

The rotational viscosity coefficient is determined specifically as described below in conformity with JIS Z8803:2011.

Figure 36:
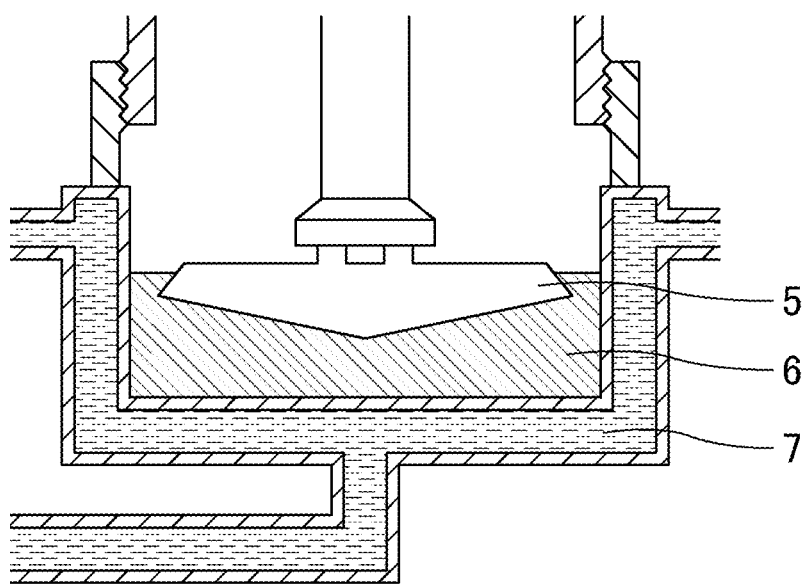
FIG. 36 is a conceptual view showing an example of a method of determining the rotational viscosity coefficient in conformity with JIS Z8803:2011.

First, as shown in FIG. 36, a device including a rotor 5 and a thermostatic chamber or thermostatic bath 7 is used to analyze a sample 6 in a certain quantity collected in a sample cup while the sample is maintained at a certain temperature. A cone-flat plate rotational viscometer, including a circular plate and a cone with a large vertex angle which have the same axis of revolution, is used to rotate with a laminar flow the sample filling the space between the circular plate and the cone to measure the torque or angular velocity by the following method (a) or (b) and determine the viscosity from the following formula (4).

(a) One of the circular plate and the cone is rotated at a certain angular velocity, and the torque acting on the other of the circular plate and the cone is measured.
(b) The circular plate or the cone is rotated at a certain torque, and the angular velocity of the rotated circular plate or cone is measured.

$$\gamma_1 = 100 \times (3\alpha/2\pi R^3) \times (M/\Omega) \qquad (4)$$

In the formula, $\gamma_1$ represents the rotational viscosity coefficient (mPa·s) of the liquid crystal material; a represents the angle (rad) formed by the circular plate and the cone; $\pi$ represents Pi; R represents the radius (cm) of the circular plate; and M represents the torque ($10^{-7}$ N·m) acting on the surface of the circular plate or the cone.

When the structure and the dimensions of the cone-flat plate rotational viscometer are given, a constant Kc can be obtained as shown by the following formula (5):

$$100 \times (3\alpha/2\pi R^3) = Kc \qquad (5)$$

(wherein Kc represents an apparatus constant (rad/cm³)). Thus, the formula (4) can be rewritten to the following formula (6):

$$\gamma_1 = Kc \times (M/\Omega) \qquad (6)$$

(wherein each symbol is the same as in the formula (4) or (5)). Accordingly, Kc is experimentally determined in advance using a standard solution whose viscosity is known, so that the rotational viscosity coefficient of a sample can be determined by measuring the torque by the method (a) or measuring the angular velocity by the method (b).

When having a birefringence Δn of 0.12 or higher and a rotational viscosity coefficient $\gamma_1$ of less than 100 mPa·s, the liquid crystal material can keep exhibiting a higher response speed and a higher transmittance, while being highly reliable and stable. The preferred ranges of these numerical ranges are as described above.

Preferably, the liquid crystal material contains an alkenyl group-containing compound. With the liquid crystal material containing an alkenyl group-containing compound, the rotational viscosity coefficient $\gamma_1$ can be easily controlled to fall within the above preferred range.

The liquid crystal molecules 210 may be of an alkenyl group-containing compound or a component in the liquid crystal material other than the liquid crystal molecules may be an alkenyl group-containing compound. The liquid crystal molecules 210 may be of an alkenyl group-containing compound and the liquid crystal material may further contain another alkenyl group-containing compound.

The amount of the alkenyl group-containing compound is preferably 40 wt % or more, more preferably 50 wt % or more, still more preferably 52 wt % or more, particularly preferably 55 wt % or more, relative to the total amount of the liquid crystal material (i.e., the total amount of the liquid crystal layer), which is 100 wt %.

One or more alkenyl groups are contained in one molecule. The carbon number of the alkenyl group is preferably from 1 to 10, more preferably from 2 to 5. Suitable as the alkenyl group-containing compound are, for example, compounds typically used as alkenyl liquid crystals, dialkenyl liquid crystals, tolane liquid crystals, or azine liquid crystals. Specifically, for example, compounds represented by the following chemical formulas (1-1) to (1-9) and compounds represented by the following chemical formulas (2-1) to (2-4) are preferred. One alkenyl group-containing compound or two or more alkenyl group-containing compounds can be used.

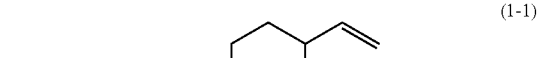

(1-1)

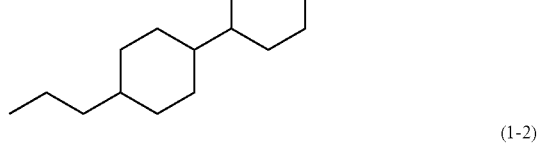

(1-2)

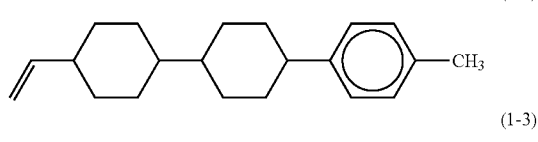

(1-3)

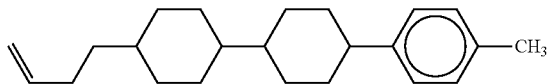

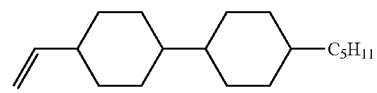 (1-4)

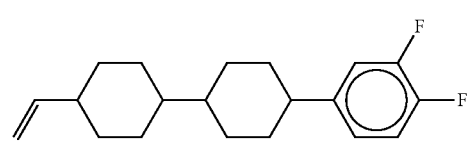 (1-5)

 (1-6)

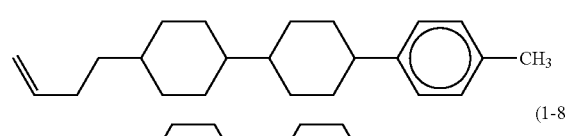 (1-7)

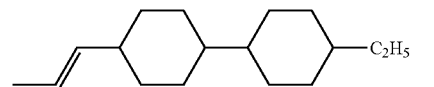 (1-8)

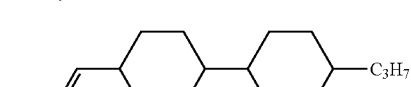 (1-9)

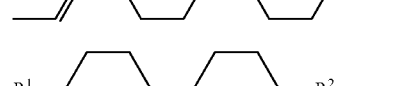 (2-1)

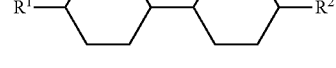 (2-2)

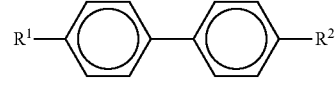 (2-3)

 (2-4)

In the formulas, $R^1$ and $R^2$ are the same as or different from each other and each represent a C1 to C5 alkyl group or a C2 to C5 alkenyl group, and $R^1$ or $R^2$ is a C2 to C5 alkenyl group.

The liquid crystal material also preferably contains a phenyl group-containing compound. With the liquid crystal material containing a phenyl group-containing compound, the birefringence Δn can be more easily controlled to fall within the above preferred range. In particular, the liquid crystal material more suitably contains a compound with two or more phenyl groups in a molecule as described later.

The liquid crystal molecules 210 may be of a phenyl group-containing compound or a component in the liquid crystal material other than the liquid crystal molecules may be a phenyl group-containing compound. The liquid crystal molecules 210 may be of a phenyl group-containing compound and the liquid crystal material may further contain another phenyl group-containing compound. Also, the liquid crystal molecules 210 may be of a compound containing both an alkenyl group and a phenyl group, or a component in the liquid crystal material other than the liquid crystal molecules may be a compound containing both an alkenyl group and a phenyl group.

The amount of the compound containing two or more phenyl groups is preferably 40 wt % or more, more preferably 45 wt % or more, still more preferably 47 wt % or more, particularly preferably 61 wt % or more, relative to the total amount of the liquid crystal material (i.e., the total amount of the liquid crystal layer), which is 100 wt %.

Two or more phenyl groups are preferably contained in a molecule. In particular, a biphenyl group and a terphenyl group are preferred. In other words, the liquid crystal material preferably contains a biphenyl group- or terphenyl group-containing compound. Suitable examples of the phenyl group-containing compound include compounds represented by the following chemical formulas (3-1) to (3-11) and compounds represented by the following chemical formulas (4-1) to (4-36). One phenyl group-containing compound or two or more phenyl group-containing compounds can be used.

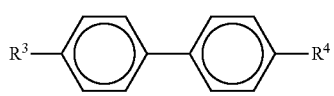 (3-1)

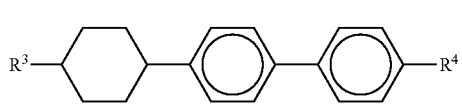 (3-2)

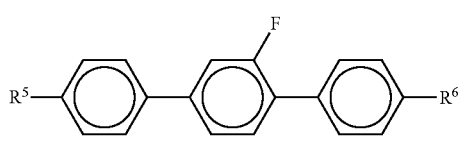 (3-3)

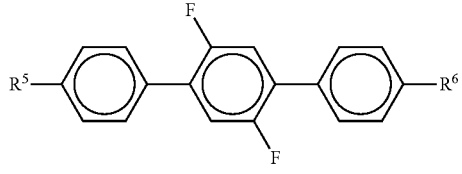 (3-4)

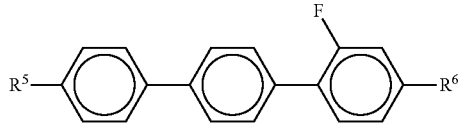 (3-5)

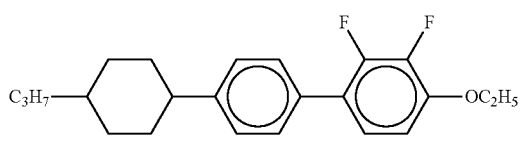 (3-6)

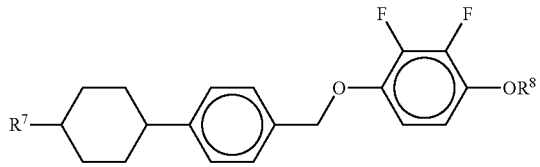 (3-7)

-continued

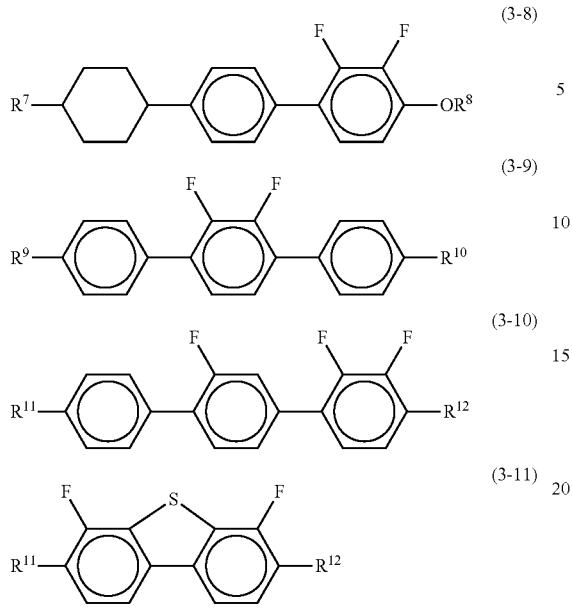

(3-8)
(3-9)
(3-10)
(3-11)

In the formulas, $R^3$ represents a C1 to C5 alkyl group or a C2 to C5 alkenyl group. In particular, a C1 to C5 alkyl group is preferred. $R^3$ and $R^4$ may be the same as or different from each other.

$R^4$ represents a C1 to C5 alkyl group, a C1 to C5 alkoxyl group, a C2 to C5 alkenyl group, or a C2 to C5 alkenyloxy group. In particular, a C1 to C5 alkyl group or a C1 to C5 alkoxyl group are preferred.

$R^5$ and $R^6$ are the same as or different from each other and each represent a C1 to C10 alkyl group or a C2 to C10 alkenyl group. One or more methylene groups (—$CH_2$—) in each of $R^5$ and $R^6$ may be replaced with —O—. One or more hydrogen atoms (H) in each of $R^5$ and $R^6$ may be replaced with a fluorine atom (F).

$R^7$ and $R^8$ are the same as or different from each other and each represent a C1 to C5 alkyl group or a C2 to C5 alkenyl group. One or more hydrogen atoms (H) in each of $R^7$ and $R^8$ may be replaced with a fluorine atom (F).

$R^9$ and $R^{10}$ are the same as or different from each other and each represent a hydrogen atom (H), a C1 to C18 alkyl group, or a C2 to C18 alkenyl group. When $R^9$ and/or $R^{10}$ represent(s) an alkyl group or an alkenyl group, the group is preferably not substituted. One or more methylene groups (—$CH_2$—) in each of $R^9$ and $R^{10}$ may be replaced with at least one group selected from the group consisting of —O—, —S—, and C≡C—.

$R^{11}$ and $R^{12}$ may be the same as or different from each other and each represent a C1 to C6 alkyl group, a C1 to C6 alkoxy group, or a C2 to C6 alkenyl group.

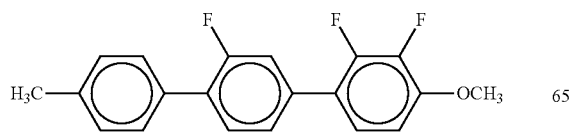

(4-1)

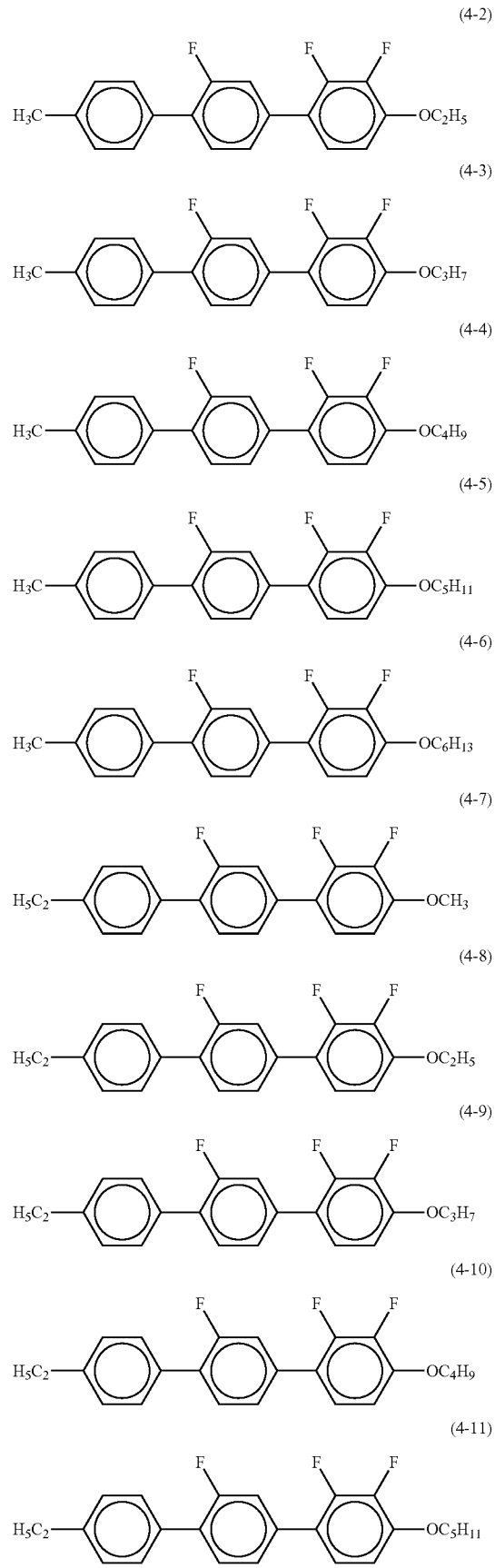

(4-2)
(4-3)
(4-4)
(4-5)
(4-6)
(4-7)
(4-8)
(4-9)
(4-10)
(4-11)

-continued
(4-12)
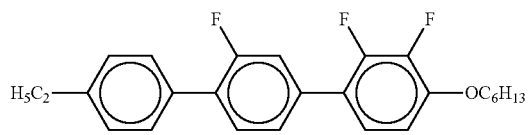
(4-13)
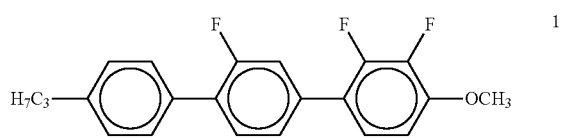
(4-14)
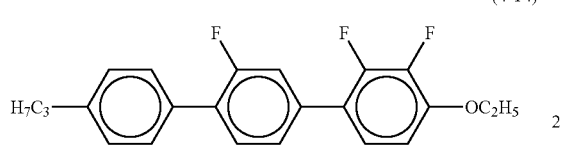
(4-15)
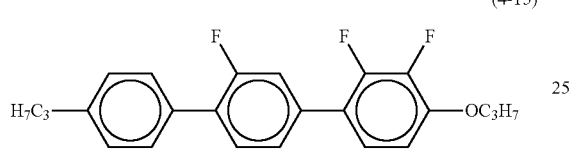
(4-16)
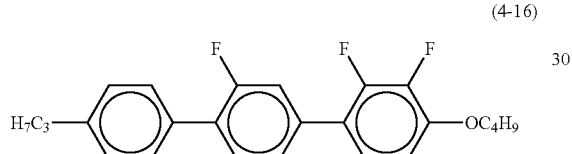
(4-17)
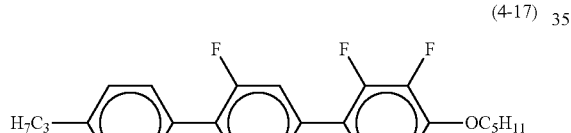
(4-18)
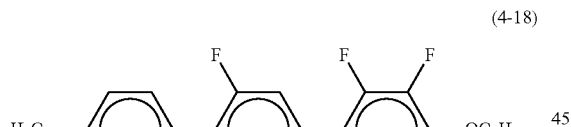
(4-19)
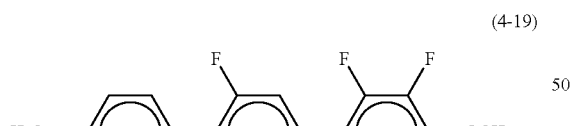
(4-20)
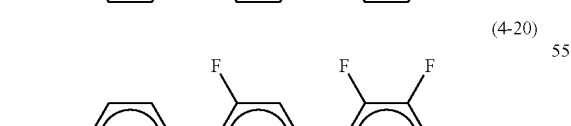
(4-21)
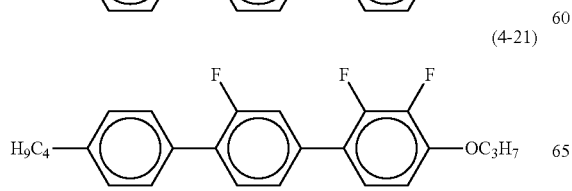
-continued
(4-22)
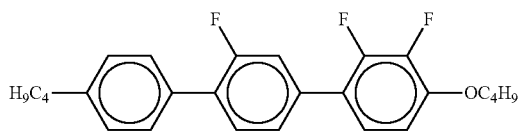
(4-23)
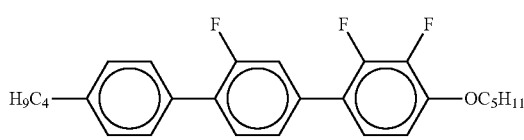
(4-24)
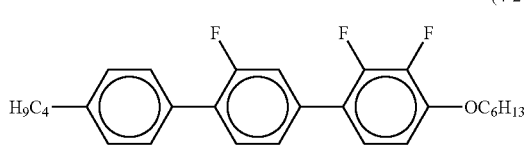
(4-25)
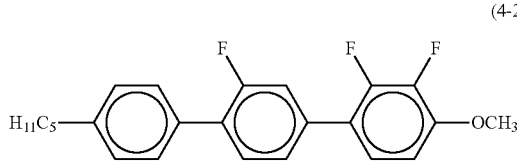
(4-26)
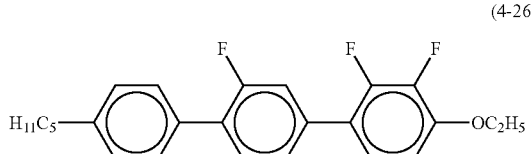
(4-27)
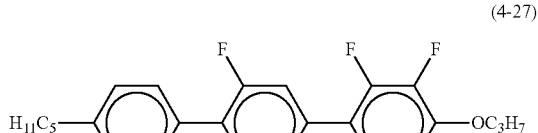
(4-28)
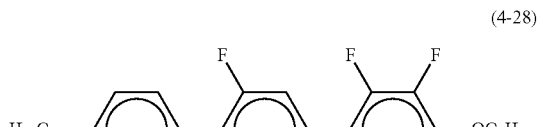
(4-29)
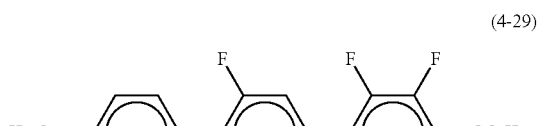
(4-30)
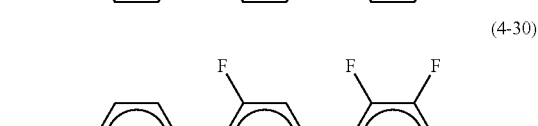
(4-31)
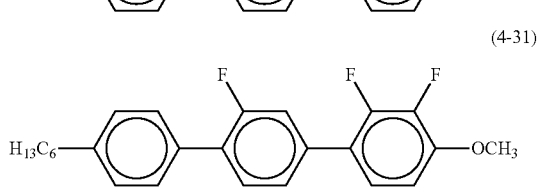

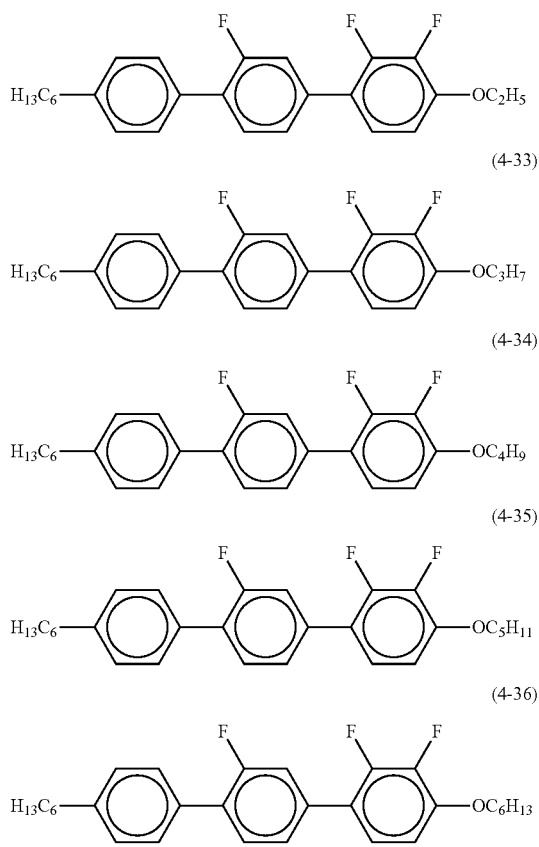

TABLE 1

| | (a) | (c1) | (c3) |
|---|---|---|---|
| Rotational viscosity coefficient $\gamma 1$ (mPa · sec) | 73 | 70 | 108 |
| *1 | 52% | 55% | 0% |
| Birefringence $\Delta n$ | 0.1399 | 0.1246 | 0.108 |
| *2 | 61% | 47% | 27% |

In Table 1, *1 indicates the amount of an alkenyl group-containing compound and *2 indicates the amount of a compound containing two or more phenyl groups in a molecule. The symbol "%" in Table 1 means "wt %". These amounts are values relative to the total amount of the liquid crystal material (i.e., the total amount of the liquid crystal layer), which is 100 wt %. There may be a compound corresponding to both *1 and *2, so that the sum of the *1 and *2 amounts may possibly exceed 100 wt %.

The liquid crystal display panel 1 includes the first alignment film 21 between the first substrate 100 and the liquid crystal layer 200 and the second alignment film 22 between the second substrate 300 and the liquid crystal layer 200. The first alignment film 21 and the second alignment film 22 are preferably photo-alignment films formed from a photo-alignment film material and made to function to align the liquid crystal molecules 210 in a certain direction by a photo-alignment treatment. The photo-alignment film material encompasses general materials that undergo structural change when irradiated with light (electromagnetic waves) such as ultraviolet light or visible light, and thereby exhibit an ability of controlling the alignment of the nearby liquid crystal molecules 210 (alignment controlling force) or change the level and/or direction of the alignment controlling force.

The photo-alignment material contains, for example, a photo-reactive site which undergoes a reaction such as dimerization (formation of dimers), isomerization, photo-Fries rearrangement, or decomposition when irradiated with light. Examples of the photo-reactive site (functional group) which is dimerized and isomerized when irradiated with light include cinnamate, cinnamoyl, 4-chalcone, coumarin, and stilbene. Examples of the photo-reactive site (functional group) which is isomerized when irradiated with light include azobenzene. Examples of the photo-reactive site which is photo-Fries rearranged when irradiated with light include phenolic ester structures. Examples of the photo-reactive site which is decomposed when irradiated with light include dianhydrides containing a cyclobutane ring, such as 1,2,3,4-cyclobutanetetracarboxylic-1,2:3,4-dianhydride (CBDA). The photo-alignment film material is preferably a vertically alignable one that can be used in a vertical alignment mode. Examples of the photo-alignment film material include materials containing a photo-reactive site, such as polyamides (polyamic acids), polyimides, polysiloxane derivatives, methyl methacrylate, and polyvinyl alcohols.

Figures 21A, 21B:
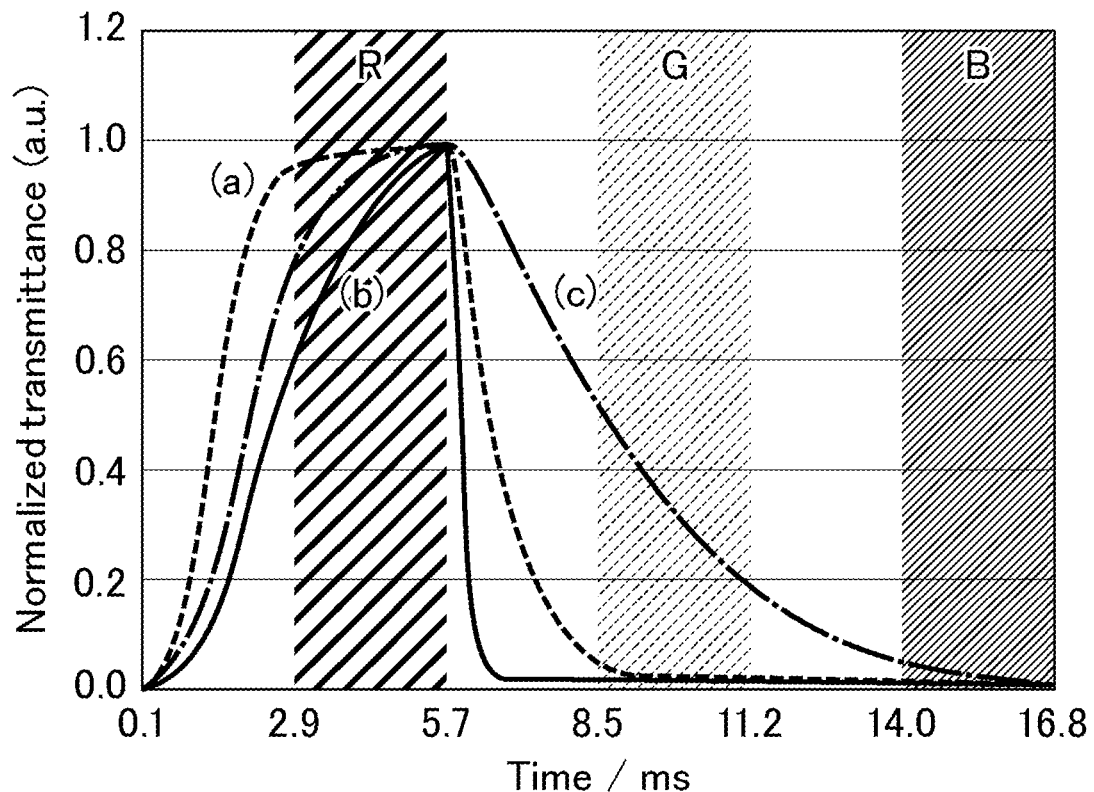
FIG. 21A shows response waveforms of the liquid crystal display device (a) of Embodiment 1, the liquid crystal display device (b) including a TN-mode liquid crystal display panel and providing color display using the FSC driving system, and the liquid crystal display device (c) including a 1D-VA-mode liquid crystal display panel and providing color display using the FSC driving system.
FIG. 21B is a view showing the color mixing ratios calculated from the response waveforms (b) and (c) shown in FIG. 21A.

FIG. 21A shows the response waveform (a) of the liquid crystal display device of the present embodiment. Here, the liquid crystal material of the liquid crystal layer in the liquid crystal display panel was a liquid crystal material (a) having the physical properties shown in Table 1. For comparison, the response waveform (b) of a device including a TN-mode liquid crystal display panel and the response waveform (c) of a device including a 1D-VA-mode liquid crystal display panel are shown together. The 1D-VA-mode liquid crystal layer was formed from a liquid crystal material (c3) having the physical properties shown in Table 1 and Table 2.

The response waveforms (a) to (c) in FIG. 21A are waveforms during red (R) solid-color display when LED light sources that respectively emit RGB lights were turned on using the FSC driving system in the order of R (BL1), G (BL2), and B (BL3). Usually for R solid-color display, light is transmitted through the liquid crystal layer according to turning on of the red light R (open), and light is blocked by the liquid crystal layer after the red light R is turned off (light-off) (closed). In the 1D-VA mode liquid crystal layer, however, the subsequent green light G is turned on before the liquid crystal layer is sufficiently closed, so that color mixing occurs. Similarly, color mixing occurs when the blue light B is turned on. FIG. 21B shows the color mixing ratios calculated from the response waveform (b) (TN mode) shown in FIG. 21A and the color mixing ratios calculated from the response waveform (c) (1D-VA mode) shown in FIG. 21A.

The present embodiment may employ the polymer sustained alignment (PSA) technique. The PSA technique seals a liquid crystal composition containing a photo-polymerizable monomer between the first substrate 100 and the second substrate 300 and then irradiates the liquid crystal layer 200 with light to polymerize the photo-polymerizable monomer, thereby forming a polymer on the surfaces of the first alignment film 21 and the second alignment film 22 and utilizing the polymer to fix the initial tilt (pre-tilt) of the liquid crystal molecules.

The liquid crystal display panel 1 of the present embodiment includes the first substrate 100 and the second substrate 300 bonded to each other with a sealant surrounding the liquid crystal layer 200, and the liquid crystal layer 200 is held in the predetermined region. The sealant can be, for example, an epoxy resin containing an inorganic or organic filler and a curing agent.

The liquid crystal display panel 1 may further include polarizing plates. In this case, the liquid crystal display panel 1 preferably includes, sequentially from the back surface side toward the viewing surface side, the first polarizing plate 11, the first substrate 100, the first alignment film 21, the liquid crystal layer 200 formed from a liquid crystal material containing the liquid crystal molecules 210, the second alignment film 22, the second substrate 300, and the second polarizing plate 12.

The polarization axis of the first polarizing plate 11 and the polarization axis of the second polarizing plate 12 may be perpendicular to each other (i.e., may be in crossed Nicols) or parallel to each other (i.e., may be in parallel Nicols). Yet, the polarization axes are preferably perpendicular to each other.

Examples of the first polarizing plate 11 and the second polarizing plate 12 include polarizers (absorptive polarizing plates) obtained by adsorbing an anisotropic material such as an iodine complex (or a dye) on a polyvinyl alcohol film and aligning the material. Typically, each surface of the polyvinyl alcohol film is laminated with a protective film such as a triacetyl cellulose film for practical use. The first polarizing plate 11 and the second polarizing plate 12 are in crossed Nicols where the polarization axes thereof are perpendicular to each other. An optical film such as a phase difference film may be disposed between the first polarizing plate 11 and the first substrate 100 or between the second polarizing plate 12 and the second substrate 300.

The liquid crystal display panel 1 has a structure including, as well as the components described above, components including external circuits such as a tape-carrier package (TCP) and a printed circuit board (PCB); optical films such as a viewing angle-increasing film and a luminance-increasing film; and a bezel (frame). Some components may be incorporated into another component. Components other than those described above are not limited and are not described here because such components can be those commonly used in the field of liquid crystal display panels.

The method of producing the liquid crystal display panel 1 is not limited, and may be a method commonly used in the field of liquid crystal display panels. For example, the alignment treatments for the first alignment film 21 and the second alignment film 22 are performed by a photo-alignment treatment irradiating the target with light (electromagnetic waves) such as ultraviolet light or visible light. The photo-alignment treatment can be performed with, for example, a device having a light source for irradiating the first alignment film 21 and the second alignment film 22 with light and a function to conduct continuous scanning exposure for the pixels. Specific modes of the scanning exposure include a mode of irradiating a substrate surface with light from a light source while moving the substrate; a mode of irradiating a substrate surface with light from a light source while moving the light source; and a mode of irradiating a substrate surface with light from a light source while moving the light source and the substrate.

The RP value of the liquid crystal display panel is preferably 3.66 or smaller. The RP value is represented by the following formula (1):

$$RP \text{ value} = (\gamma_1/K_{33}) \times \{(d_d)^2/(d_b)^2\} \quad (1)$$

wherein $\gamma_1$ represents the rotational viscosity coefficient (mPa·s) of the liquid crystal material; $K_{33}$ represents the bend elastic constant of the liquid crystal molecules; $d_d$ represents the thickness (μm) of the liquid crystal layer; and $d_b$ is 3 (μm). Such a liquid crystal display panel can further increase the fall-time response speed and further widen the color gamut while maintaining a high transmittance. The liquid crystal display panel also can further increase the rise-time response speed, and is thus expected to exhibit an even higher solid-color luminance. The RP value is more preferably 3.6 or smaller, still more preferably 3.55 or smaller, particularly preferably 3.5 or smaller, most preferably 3.46 or smaller.

Herein, the bend elastic constant $K_{33}$ can be measured by, for example, a measurement method using a magnetic field, a measurement method using an electric field, a measurement method following the "5.9 Method of measuring elastic constant of liquid crystal material" in JEITA ED-2521D, a method of measuring the elastic constant of a liquid crystal described in JP 2004-286485 A, or a method of calculating the elastic constant by preparing a parallel alignment cell and measuring the voltage dependency of electric capacitance (CRIG MAZE, Mol. Cryst. Liq. Cryst., Vol. 48, 273 (1978)). Particularly suitable in the present invention is a value (bend elastic constant $K_{33}$) obtained by "5.9 Method of measuring elastic constant of liquid crystal material" in JEITA ED-2521D.

When the RP value is 3.66, the thickness $d_d$ of the liquid crystal layer in the liquid crystal display panel 1 is preferably 2.51 or smaller, more preferably 2.44 or smaller.

Preferably, the fall-time response parameter of the liquid crystal display panel is 2.55 ms or shorter. This can still further widen the color gamut. The fall-time response parameter is more preferably 2.08 ms or shorter, still more preferably 0.5 ms or shorter.

Preferably, the rise-time response parameter of the liquid crystal display panel is 2.75 ms or shorter. This can still further increase the solid-color luminance. The rise-time response parameter is more preferably 2.08 ms or shorter, still more preferably 1.35 ms or shorter.

Herein, the fall-time response parameter (also referred to as a fall response time) is the time (ms) taken for optical changes in a shift from a white display state to a black display state, wherein the black display state corresponds to a state where the normalized luminance of the response waveform is 10% and the white display state corresponds to a state where the normalized luminance of the response waveform is 90% (the maximum integrated value is 100%). The rise-time response parameter (also referred to as a rise response time) is the time (ms) taken for optical changes in a shift from a black display state to a white display state, wherein the black display state corresponds to a state where the normalized luminance of the response waveform is 10% and the white display state corresponds to a state where the normalized luminance of the response waveform is 90% (the maximum integrated value is 100%). The unit "ms" (millisecond) may also be expressed as "msec".

High-speed response is known to be achievable typically by reducing the coefficient of viscosity η of the liquid crystal material, reducing the thickness $d_d$ of the liquid crystal layer, and increasing the voltage V applied in white display or increasing the anisotropy of dielectric constant Δε of the liquid crystal molecules. For response during halftone display (also referred to as intermediate grayscale display) of the liquid crystal display panel, the overdrive (OD) driving system which increases the voltage difference $(V-V_{th})$ is employed to adjust the increase in response speed.

Table 2 shows more detailed physical properties of the liquid crystal materials (a), (c1), and (c3) shown in Table 1. Table 2 also shows the physical properties of a liquid crystal material (c2) which differs from the liquid crystal materials (c1) and (c3) and constitutes a 1D-VA mode liquid crystal display panel.

TABLE 2

|  | (a) | (c1) | (c2) | (c3) |
|---|---|---|---|---|
| Transmittance (7 V) | 100% | 93% | 100% | 100% |
| Birefringence Δn | 0.1399 | 0.1246 | 0.1246 | 0.108 |
| Thickness of liquid crystal layer | 2.4 μm | 2.4 μm | 2.6 μm | 3.0 μm |
| RP value | 3.46 | 3.27 | 3.84 | 7.61 |
| Fall-time response speed | 2.39 msec | 2.25 msec | 2.64 msec | 5.82 msec |
| NTSC ratio | 92% | 92% | 89% | 59% |

Embodiment 2

Next, an embodiment is described in which the liquid crystal display device provides transparent display (i.e., see-through display) allowing the background to be seen through. Description of the same contents as in Embodiment 1 is omitted here. The liquid crystal display device of the present embodiment when serving as a see-through display can provide new display that a conventional display device cannot provide.

Figure 22:
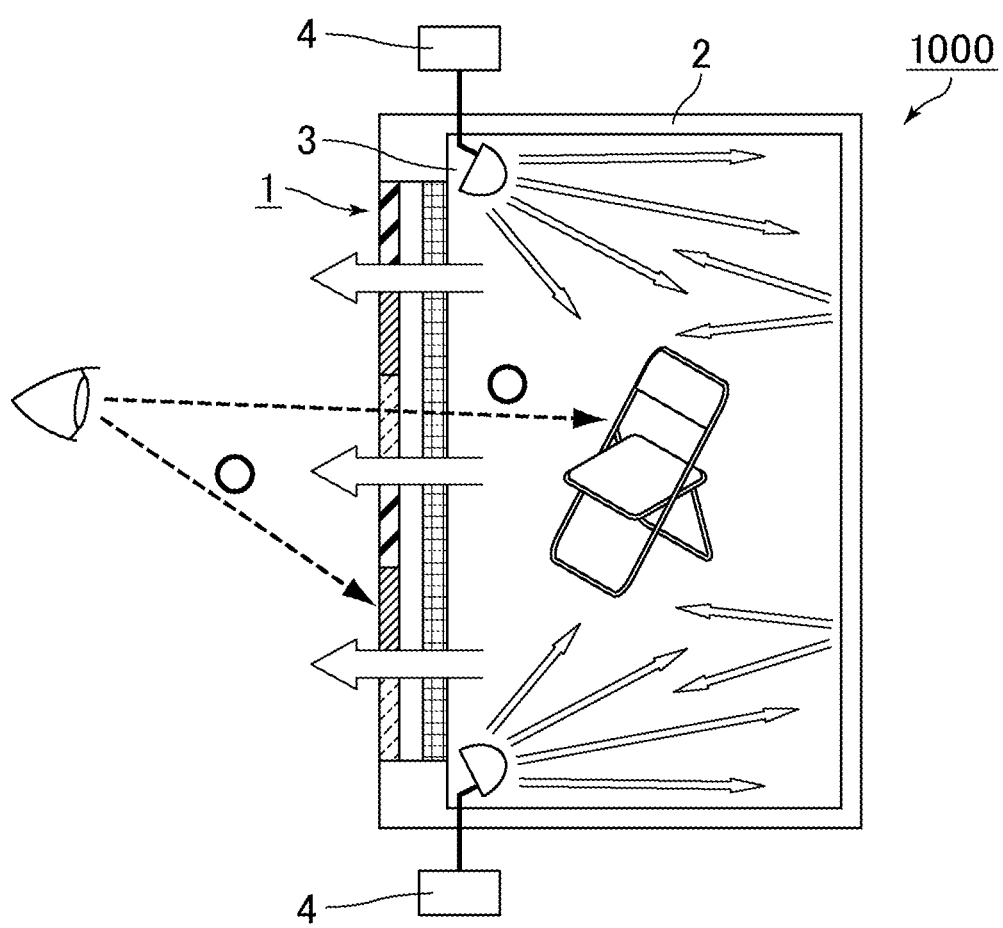
FIG. 22 is a schematic cross-sectional view of a see-through display including a liquid crystal display panel of Embodiment 2.

FIG. 22 is a schematic cross-sectional view of a liquid crystal display device (see-through display) of the present embodiment. A see-through display 1000 in FIG. 2 includes a box-type case 2, a liquid crystal display panel 1 on one side surface of the case 2, light sources 3 on an inner side surface of the case 2, and a controller 4. Although the controller 4 in this figure is outside the case 2, the controller 4 may be placed inside the case 2.

The liquid crystal display panel 1 of the present embodiment is a see-through panel. The lights from the light sources 3 are incident on the see-through panel (liquid crystal display panel) 1 and the alignment of the liquid crystal molecules 210 in the liquid crystal layer 200 is switched, so that the amount of light passing through the liquid crystal display panel 1 is controlled. The liquid crystal display panel 1 is configured to display an image on the panel surface in the screen display state while allowing the background to be seen through in the transparent display state. When the see-through panel is in the transparent display state, the viewer can see the background (here, the inside of the case 2) through the see-through panel. This configuration allows see-through display. The see-through panel can switch between the image display state and the transparent display state by pixel. Thus, the operation is also possible that allows the background to be seen through the panel only in part of the plane of the panel.

The liquid crystal display panel (see-through panel) 1 in the present embodiment is driven using the FSC system with the light sources 3 and the controller 4. The light sources 3 irradiate the liquid crystal display panel 1 with red light R, green light G, and blue light B by time-divisionally switching among the lights. In order to allow lights from the light sources 3 in amounts as large as possible to enter the liquid crystal display panel 1, the inner surface of the case 2 may be light diffusive. The inner surface of the case 2, when designed to be white, can reflect all color lights efficiently, thus increasing the amount of light travelling toward the liquid crystal display panel 1 for all of the red light R, the green light G, and the blue light B.

The see-through display can be used in the fields of smartglasses, vehicles, digital signage, building materials, smart home appliances, and amusement devices, for example. In the field of smartglasses, for example, the see-through display can be applied to a head mounted display to provide the mixed reality (MR) or virtual reality (VR), for example. In the field of vehicles, for example, the see-through display can be applied to a head-up display to enable display of information such as a map, speed, and traffic information and also to enable use of the display as a sun visor, a blind, or a shade. In the field of digital signage, for example, the see-through display can be applied to a vending machine, an information sign, and a platform door or gate to enable advertisement display that blends into the surroundings. In the field of building materials, for example, the see-through display can be applied to a showcase, a shop window, and a partition to display description and images, for example, on these sites. In the field of smart home appliances, the see-through display can be applied to a transparent television and a refrigerator to reduce a sense of oppression from the television and refrigerator by switching the mode to the transparent display state when they are not used. In the field of amusement devices, the see-through display can be applied to a gaming screen, a pachinko gaming device, and a slot machine to enhance the visual effects.

The liquid crystal display device (see-through display) of the present embodiment is in the normally black mode. In other words, the liquid crystal display panel (see-through panel) 1 is in the normally black mode. This configuration can increase the contrast ratio of the liquid crystal display panel 1. The normally black mode is a display mode that provides black display with no voltage applied and provides white display with voltage applied.

Modified Example 1

Figure 23:
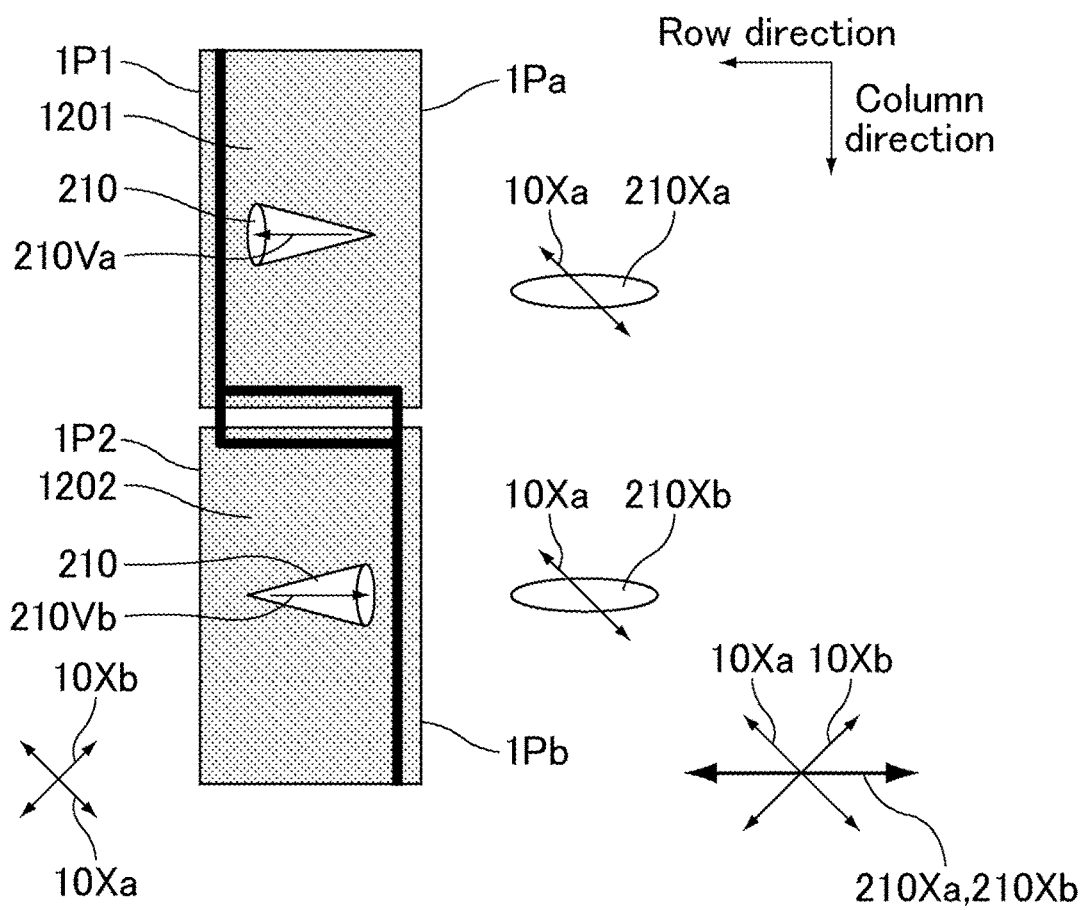
FIG. 23 is a schematic view showing the relationship between the liquid crystal alignment axes and the polarization axes of a liquid crystal display panel of Modified Example 1.

FIG. 23 is a schematic view showing the relationship between the liquid crystal alignment axes and the polarization axes of a liquid crystal display panel in a liquid crystal display device of Modified Example 1. In Embodiment 1, the case is described where the first alignment film 21 and the second alignment film 22 each have been subjected to alignment treatment such that in each pixel 1P overlapping a corresponding pixel electrode 120, the first domain 1Pa and the second domain 1Pb with different alignment vectors 210V (210Va, 210Vb) are arranged side by side in the column direction. The first alignment film 21 and the second alignment film 22, as shown in FIG. 23, may each be subjected to alignment treatment such that only the first domain 1Pa is set in one of a first pixel 1P1 and a second pixel 1P2 respectively overlapping pixel electrodes 1201 and 1202 adjacent to each other in the column direction (e.g., in the first pixel 1P1 in FIG. 23) and only the second domain 1Pb is set in the other of the first pixel 1P1 and the second pixel 1P2 (e.g., second pixel 1P2 in FIG. 23). This configuration can achieve the same effect as in Embodiment 1. Each pixel in Embodiment 1 is defined by multiple domains, while each pixel in the present modified example is defined by a single domain.

In the present modified example, a light-shielding member may be provided in the boundary between the first domain 1Pa and the second domain 1Pb, i.e., between the first pixel 1P1 and the second pixel 1P2. Since the liquid crystal alignment continuously varies in the boundary between the first domain 1Pa and the second domain 1Pb, the liquid crystal alignment axis 210Xa in the first domain 1Pa and the liquid crystal alignment axis 210Xb in the second domain 1Pb may not be parallel to each other to cause a dark line. Here, with the light shielding member in the boundary between the first domain 1Pa and the second domain 1Pb, the dark line portion can be shielded from light and blurriness can be further reduced.

Modified Example 2

In Embodiment 2, the case is described where the light sources 3 are on a side surface of the case 2. Yet, the light sources 3 may be at any position that does not veil the back surface side of the liquid crystal display 1 in the transparent display state. For example, the light sources 3 may be on the ceiling of the case 2.

Modified Example 3

In Embodiment 2, the case is described where the liquid crystal display panel 1 is on one side surface of the box-type case 2 and the light sources 3 are placed inside the case 2. Yet, the liquid crystal display panel 1 can be used as a see-through display without being set on the case 2 with the light sources 3 as long as there is light that enters the liquid crystal display panel 1 from the back surface side.

The embodiments of the present invention have been described above. Each and every matter described above is applicable to the general aspects of the present invention.

EXAMPLES

Hereinbelow, the present invention is described in more detail based on examples and comparative examples. The present invention is not limited to these examples.

Example 1-1

Figure 24:
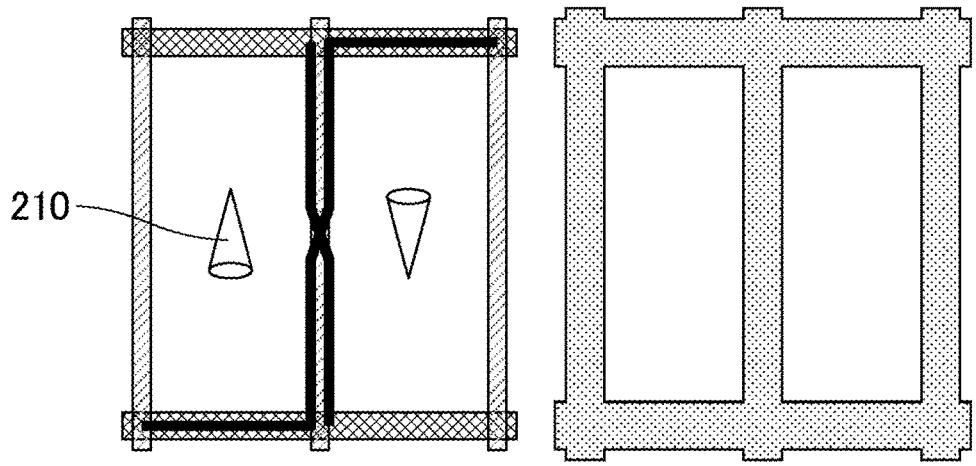
FIG. 24 is a schematic view of the alignment state of liquid crystal molecules in the liquid crystal display panel used in Example 1.

A liquid crystal display panel (2D-ECB•parallel alignment mode) having the structure shown in FIG. 18 and set in the alignment state shown in FIG. 24 was produced as a liquid crystal display panel in the liquid crystal display device of Embodiment 1. The liquid crystal layer was formed from the liquid crystal material (a) shown in Table 1 and Table 2. The pixel pitch was 120 μm×360 μm. The tilt angle (which means the pre-tilt angle of the liquid crystal molecules) was 88.6°. The pixel electrodes 120 were provided with no slit. Three such liquid crystal display panels were produced (referred to as No. 1, No. 2, and No. 3). The physical properties of these liquid crystal display panels were evaluated by the following evaluation methods. FIG. 25 shows the results. For the evaluations, light sources (backlight) and a controller were connected to each liquid crystal display panel to fabricate a liquid crystal display device that provides color display using the FSC system. In FIG. 25, "Average" indicates the average of evaluation results when the liquid crystal display panels No. 1 to No. 3 were used.

Comparative Example 1-1

A TN-mode liquid crystal display panel was produced and the same evaluation tests as in Example 1-1 were performed. Comparative Example 1-1 was different from Example 1-1 in luminance of the backlight (B/L) (white backlight disposed on the liquid crystal display panel). FIG. 25 shows the results.

(Evaluation Method)
(1) White Luminance and Black Luminance

The white luminance and the black luminance of each liquid crystal display panel were measured with a spectroradiometer (product name: SR-UL2, available from Topcon Technohouse Corporation).

(2) Transmittance $T_A$ (Front/Back Polarization Axes being Aligned)

The transmittance $T_A$ means the transmittance of the liquid crystal display panel in which the absorption axis of the first polarizing plate 11 and the absorption axis of the second polarizing plate 12 coincided with each other, and calculated from the following formula (2).

$$T_A(\%) = (L_{w1}/L_{w0}) \times 100 \tag{2}$$

In the formula, $L_{w1}$ represents the white luminance (unit: cd/cm$^2$) measured by the evaluation method (1) and $L_{w0}$ represents the B/L luminance during measurement (back surface liquid crystal white lighting) (unit: cd/cm$^2$).

The "B/L luminance (back surface liquid crystal white lighting) (unit: cd/cm$^2$)" can be measured in the state where the back surface liquid crystal (back cell; e.g., TFT color TN panel) is in the white display state and the backlight emits white light. Specifically, in the measurement system shown in FIG. 16, measurement can be performed by setting the light sources 430 as the white backlight and placing a back cell (e.g., TFT color TN panel) between the light sources 430 and the TFT panel 420 (front cell: TFT white/black panel).

(3) Transmittance $T_B$ (Transmittance of Liquid Crystal Display Panel Alone)

The transmittance $T_B$ means the transmittance of the front panel alone when the white backlight is used, and can be calculated from the following formula (3).

$$T_B(\%) = (L_{w2}/L_{w3}) \times 100 \tag{3}$$

In the formula, $L_{w2}$ represents the luminance (unit: cd/cm$^2$) of the front panel alone during voltage application (On) and $L_{w3}$ represents the luminance (unit: cd/cm$^2$) of the white backlight.

(4) Mode Efficiency M

The mode efficiency M means the mode efficiency of the front panel alone when the white backlight is used, and can be calculated from the following formula (4).

$$M(\%) = (L_{w4}/L_{w5}) \times 100 \tag{4}$$

In the formula, $L_{w4}$ represents the luminance (unit: cd/cm$^2$) during voltage application (On) with polarizing plates arranged in crossed Nicols on the surfaces of the front panel alone, and $L_{w5}$ represents the luminance (unit: cd/cm$^2$) during no voltage application (Off) with polarizing plates arranged in parallel Nicols on the surfaces of the front panel alone.

(5) Contrast Ratio C

The contrast ratio C can be calculated from the following formula (5).

$$C(\%) = (L_{w1}/L_B) \times 100 \tag{5}$$

In the formula, $L_{w1}$ represents the white luminance (unit: cd/cm$^2$) measured by the evaluation method (1) and $L_B$ represents the black luminance (unit: cd/cm$^2$) measured by the evaluation method (1).

(6) Chromaticity

The NTSC ratio was determined in accordance with the method of measuring NTSC described above (see FIG. 16).

In Example 1-1, alignment with no dark lines was achieved, and a high transmittance and a high mode efficiency were also achieved. In particular, the liquid crystal display panel alone successfully had a transmittance of 25% or higher and an NTSC ratio of 90% or higher. The transmittance and the NTSC ratio even exceed the values in the TN mode (Comparative Example 1-1). The contrast ratio was 10 times the value in the TN mode (Comparative Example 1-1) or more. Such a liquid crystal panel can be expected to provide better image expression when used in combination with a back surface liquid crystal (back cell).

Example 1-2

Figure 26A:
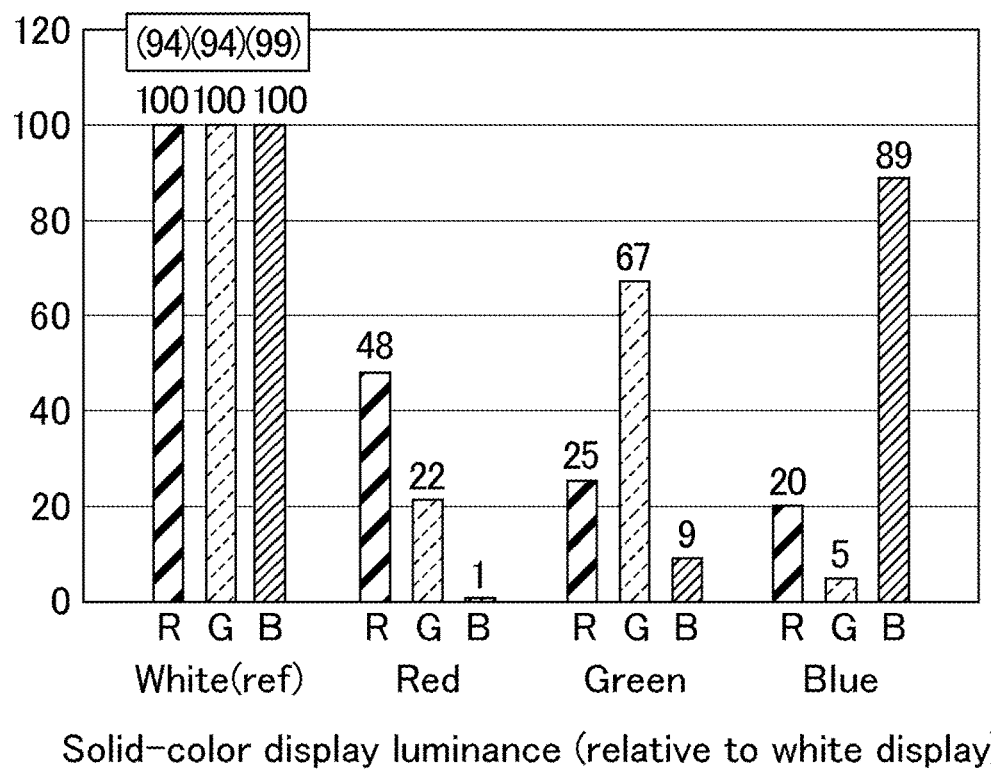
FIG. 26A is a graph showing the results of examining the luminance in solid-color display provided by a liquid crystal display device of Example 1-2.

The response characteristics of the liquid crystal display device produced in Example 1-1 were analyzed. FIG. 1 shows the response waveform as the waveform (a). In FIG. 1, the horizontal axis shows time (ms) and the vertical axis shows normalized luminance when On-Off-Off waveform signals were input (solid-color display). The lighting order of the light sources was red (R), blue (B), and green (G). Based on the response characteristics, the luminance (normalized luminance) in solid-color display was examined (see FIG. 26A and FIG. 26B). FIG. 26A is a graph of luminance in solid-color display evaluated relative to the luminance in white display (white luminance). With the white luminance set to 100%, the total luminance of each color in percentage over the solid-color display periods was 94% (=48%+25%+20%) for red (R), 94% (=22%+67%+5%) for green (G), and 99% (=1%+9%+89%) for blue (B). Each luminance value in parentheses was obtained by removing decimals from a measured value, while the total luminance was calculated using the measured values without the removal. The indicated total luminance may thus be different from the sum of the corresponding luminance values.

Figure 26B:
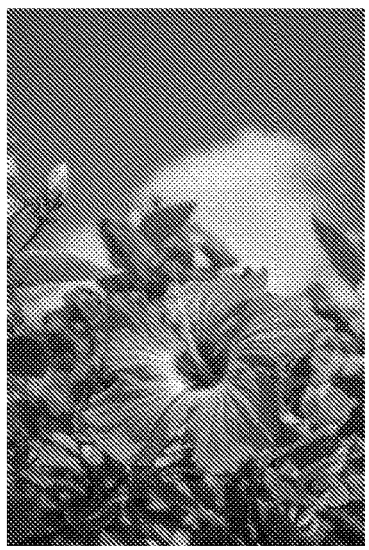
FIG. 26B is an image showing the results of examining the luminance in solid-color display provided by the liquid crystal display device of Example 1-2.

FIG. 26B shows a displayed image on this device. Since this device had a sufficiently high luminance in solid-color display as can be seen from FIG. 26A, the image in FIG. 26B shows the hibiscus flower and leaves, sky, and clouds in natural colors.

Comparative Example 1-2

Figure 2A:
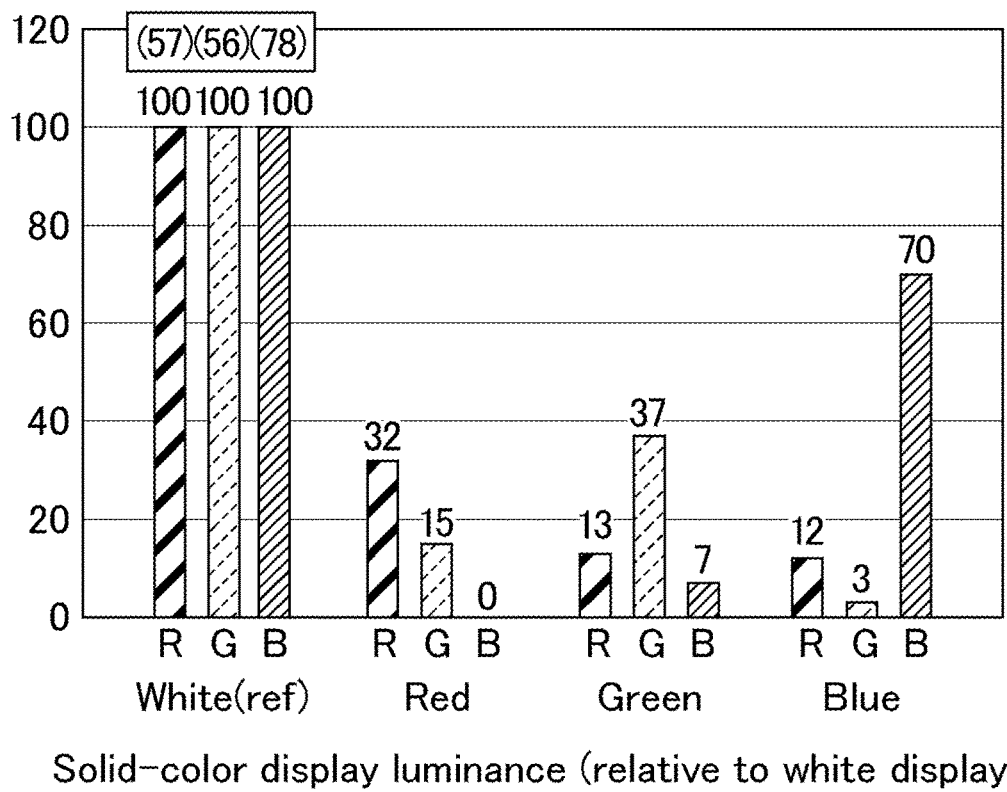
FIG. 2A shows the results of examining the luminance (normalized luminance) in solid-color display of the liquid crystal display device including a TN-mode liquid crystal display panel (Comparative Example 1).
Figure 2B:
FIG. 2B shows the results of examining the luminance (normalized luminance) in solid-color display of the liquid crystal display device including a TN-mode liquid crystal display panel (Comparative Example 1).

The response characteristics of the liquid crystal display device (TN mode) produced in Comparative Example 1-1 were analyzed and the luminance in solid-color display was examined. FIG. 1 shows the response waveform as the waveform (b), and FIG. 2A and FIG. 2B show the examination results of the luminance in solid-color display. Discussion of the results is as stated above.

Table 3 shows the results of determining the rise-time and fall-time response speeds (msec, i.e., ms) from the response waveforms in FIG. 1. Table 3 also shows the response speeds in the case of using a 1D-VA mode liquid crystal display panel as Reference Example 1. The 1D-VA mode liquid crystal display panel was formed from the liquid crystal material (c1) shown in Table 1 and Table 2. In each example, the thickness of the liquid crystal layer was 2.4 μm.

TABLE 3

|  | Example 1-2 | Reference Example 1 | Comparative Example 1-2 |
| --- | --- | --- | --- |
| Rise-time response/msec | 1.35 | 1.44 | 4.8 |
| Fall-time response/msec | 2.27 | 2.16 | 0.5 |

Typically, in color display provided using the FSC-driving system, the solid-color luminance as well as the color gamut is seemingly affected by slow response from the liquid crystal layer. Nevertheless, in Example 1-2, the rise-time response was faster than in Comparative Example 1-2 (TN mode) and Reference Example 1 (1D-VA mode) and the solid-color luminance was favorable. In addition, relative to the white luminance taken as 100%, each total luminance in percentage (ideally, 100%) of red, blue, or green solid-color display periods was 56% (for the green component) in Comparative Example 1-2 whereas it was 94% in Example 1-2. In other words, in Comparative Example 1-2 (TN mode), the lightness (brightness) varies depending on the colors of the image, with colors closer to the RGB primary colors displayed darker. This may result in unnatural display with unbalanced brightness. Such an event, however, does not occur in Example 1-2.

Example 1-3

Figure 27:
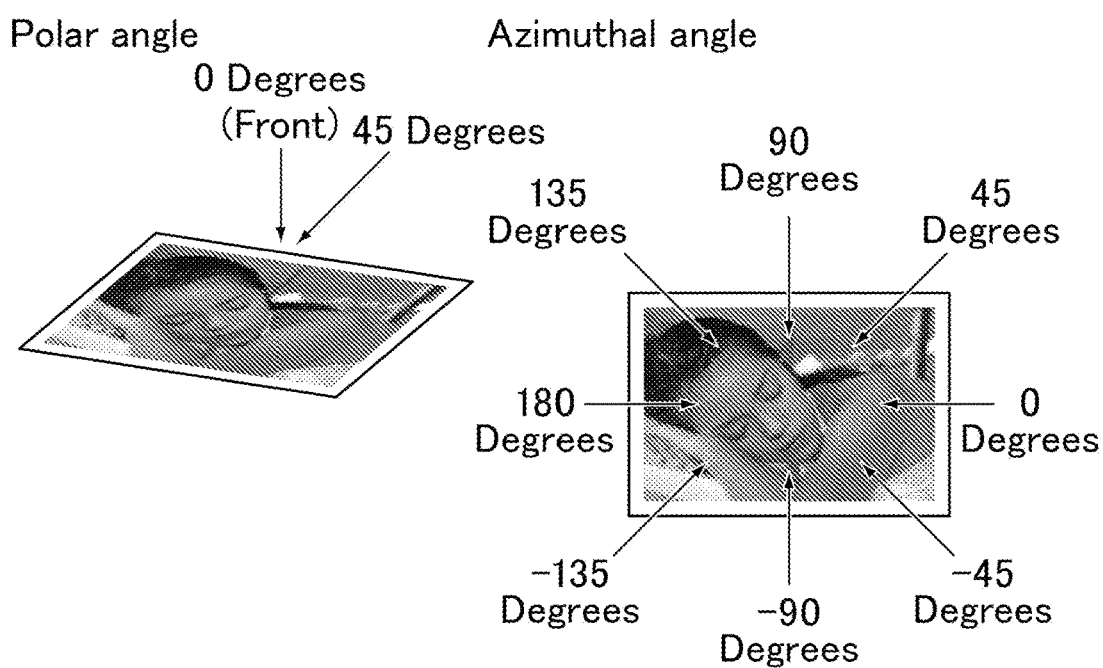
FIG. 27 includes views showing the measurement angle, polar angle, and azimuthal angle related to the evaluation test on the viewing angle characteristics in Example 1-3 and Comparative Example 1-3.
Figure 28A:
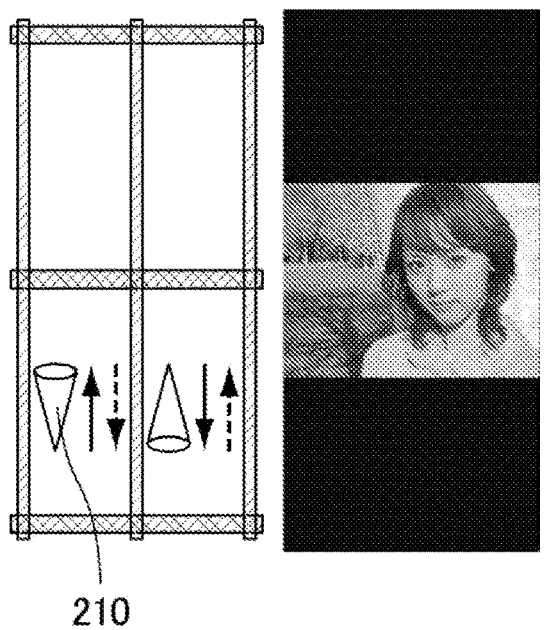
FIG. 28A includes views showing the orientation of the liquid crystal display panel in the evaluation test of the viewing angle characteristics in Example 1-3.

The viewing angle characteristics of the liquid crystal display device produced in Example 1-1 were evaluated. Specifically, a color raw image was displayed on this device using the FSC system, followed by capturing of the displayed image with a camera from the azimuths shown in FIG. 27 (captured from the azimuths at a polar angle of 45 degrees). In Example 1-3, the liquid crystal display panel was placed vertically as shown in FIG. 28A, and an image (2) in FIG. 29B and an image (3) in FIG. 29C among four images shown in FIG. 29A to FIG. 29D were displayed as color raw images. FIG. 30 shows the results.

The left part of FIG. 28A shows a conceptual alignment image of the liquid crystal molecules 210 when the liquid crystal display panel is placed vertically.

The "polar angle" herein means an angle formed by the direction in question (e.g., measurement direction) and the direction normal to the screen of the liquid crystal display panel. The "azimuth" herein means the direction in question (e.g., measurement direction) in a view projected onto the screen of the liquid crystal display panel and is expressed as an angle (azimuthal angle) formed with the reference azimuth. The reference azimuth (0°) is set to the right in the horizontal direction of the screen of the liquid crystal display panel. The azimuthal angle measures positive in the counterclockwise direction and measures negative in the clockwise direction. Both the counterclockwise and clockwise directions are rotational directions when the screen of the liquid crystal display panel is viewed from the viewing surface side (front). The angle is a value measured in a plan view of the liquid crystal display panel.

Comparative Example 1-3

Figure 3A:
FIG. 3A shows the results of evaluating the viewing angle characteristics of the liquid crystal display device including a TN-mode liquid crystal display panel (Comparative Example 1).
Figure 3B:
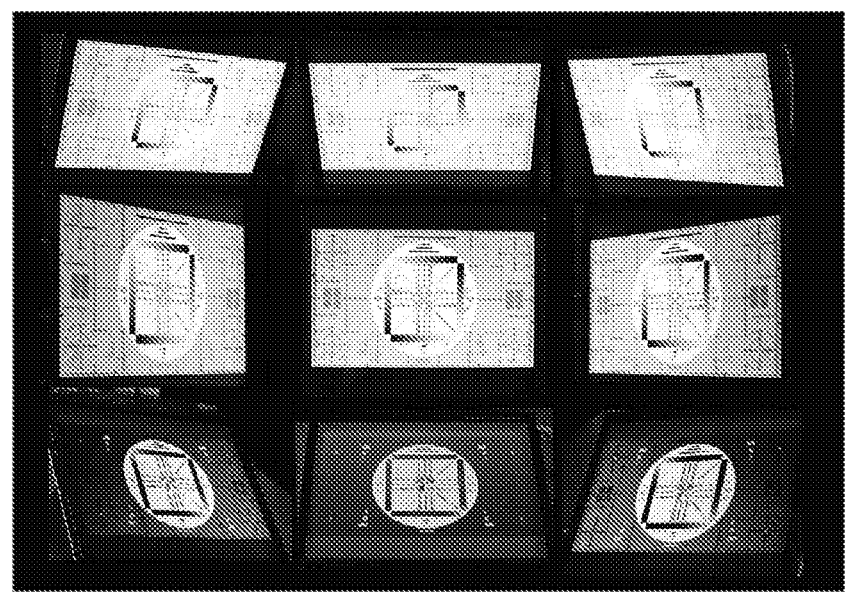
FIG. 3B shows the results of evaluating the viewing angle characteristics of the liquid crystal display device including a TN-mode liquid crystal display panel (Comparative Example 1).
Figure 4A:
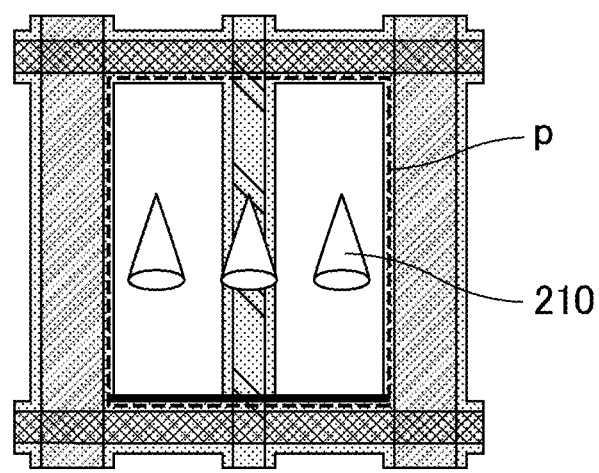
FIG. 4A is a schematic view of the alignment of liquid crystal molecules during light transmission in a portion having a median cell thickness of the liquid crystal layer in one pixel, in a liquid crystal display device (b) including a TN-mode liquid crystal display panel and providing color display using the FSC driving system and in a liquid crystal display device (c) including a 1D-VA-mode liquid crystal display panel and providing color display using the FSC driving system.
Figure 4B:
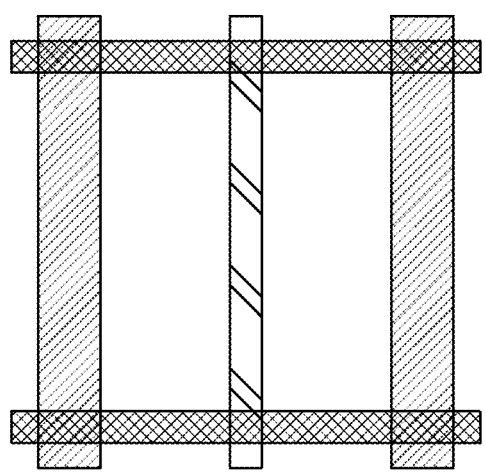
FIG. 4B is a schematic view showing the arrangement of conductive lines connected to a thin film transistor (TFT) in the pixel.
Figure 4C:
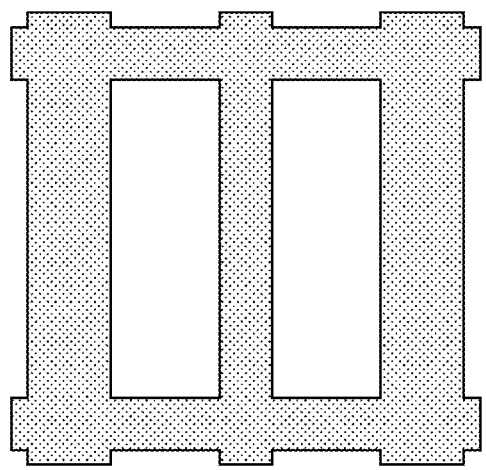
FIG. 4C is a schematic view showing the arrangement of the BM or light-shielding metal structure.
Figure 28B:
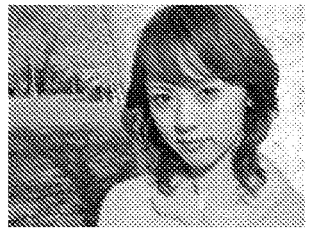
FIG. 28B is a view showing the orientation of the liquid crystal display panel in the evaluation test of the viewing angle characteristics in Comparative Example 1-3.

The viewing angle characteristics of the liquid crystal display device (TN mode) produced in Comparative Example 1-1 were evaluated as in Example 1-3. In Comparative Example 1-3, the liquid crystal display panel was placed horizontally as shown in FIG. 28B. FIG. 30 shows the results. FIG. 3A and FIG. 3B are excerpts from these results of Comparative Example 1-3 shown in FIG. 30.

In Example 1-3, a priority was placed on the left-right viewing angle characteristics during image capturing, which resulted in vertically and horizontally symmetric display. Blocked-up shadows and grayscale inverted areas were not observed. In contrast, in Comparative Example 1-3, as described above, vertically asymmetric display was provided, and blocked-up shadows and grayscale inverted areas were generated. These results confirmed that the viewing angle characteristics were significantly better in Example 1-3 than in Comparative Example 1-3.

Figure 31C:
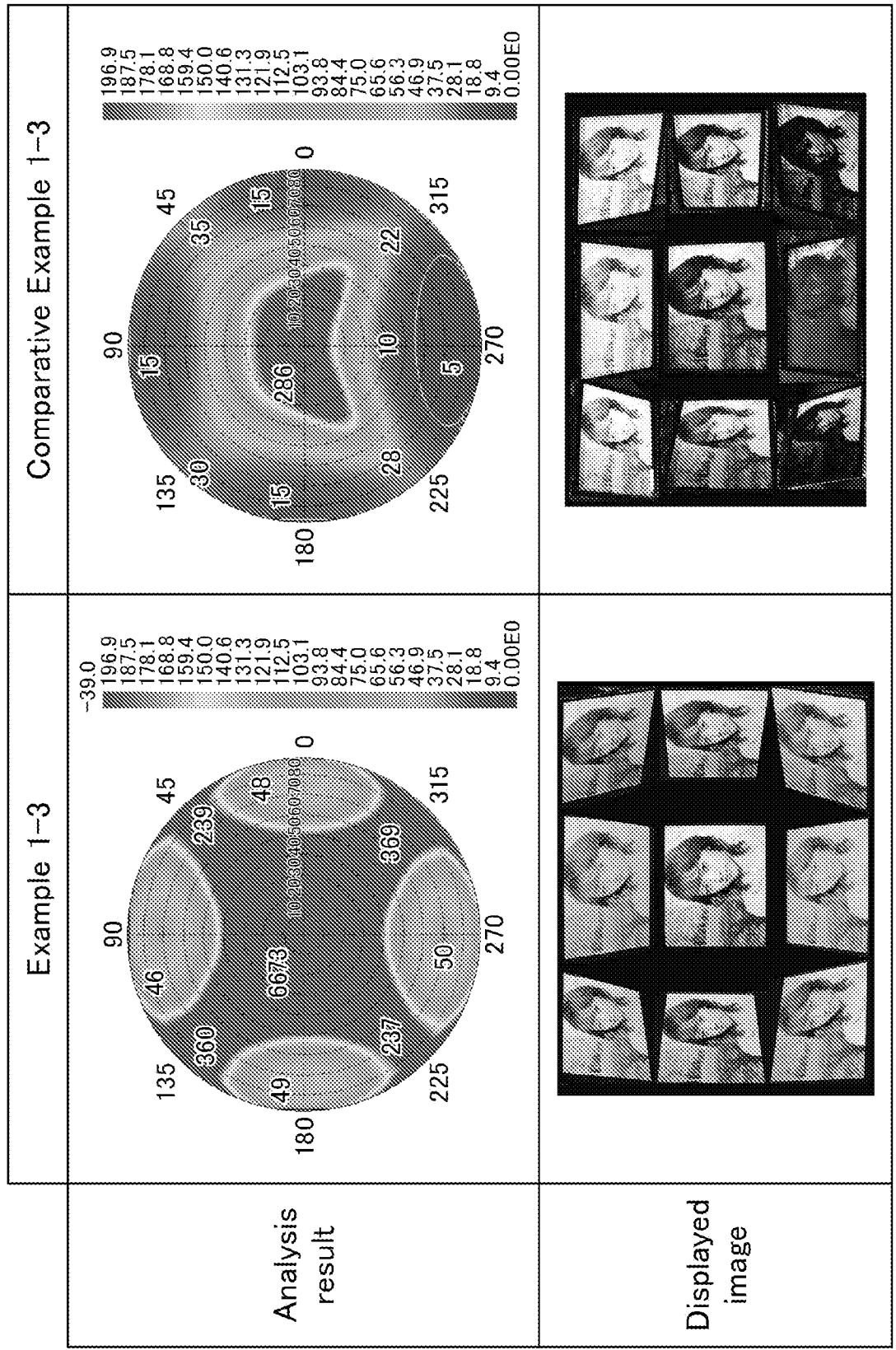
FIG. 31C shows the evaluation results of the viewing angle characteristics in Example 1-3 and Comparative Example 1-3.

The viewing angle characteristics in Example 1-3 and Comparative Example 1-3 were evaluated in more detail. FIG. 31A to FIG. 31F show the results. In FIG. 31B, the brightness and colors are different between Example 1-3 and Comparative Example 1-3 as different backlights (light sources) were used.

FIG. 31A and FIG. 31B show that in Example 1-3, the viewing angle characteristics were sufficient since the displayed images were symmetric in the left-right direction and no grayscale inverted areas (white inversion) were generated.

Figure 29A:
FIG. 29A shows a raw image (1) used in the evaluation test of the viewing angle characteristics in Example 1-3 and Comparative Example 1-3.
Figure 29B:
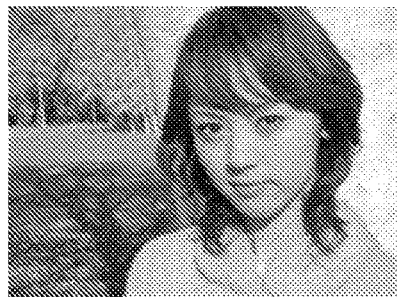
FIG. 29B shows a raw image (2) used in the evaluation test of the viewing angle characteristics in Example 1-3 and Comparative Example 1-3.
Figure 29C:
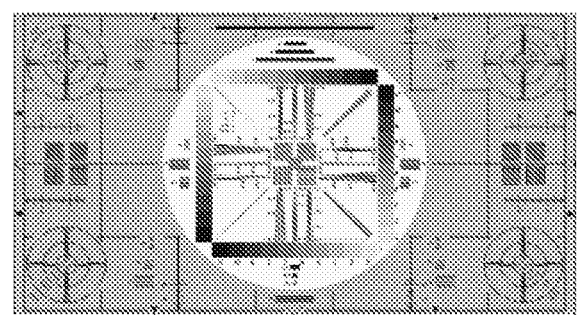
FIG. 29C shows a raw image (3) used in the evaluation test of the viewing angle characteristics in Example 1-3 and Comparative Example 1-3.
Figure 29D:
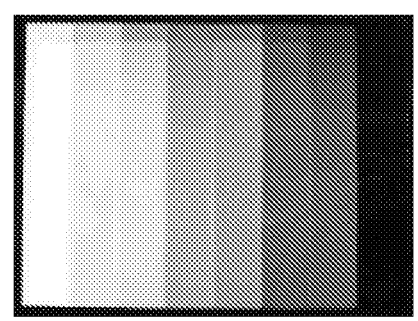
FIG. 29D shows a raw image (4) used in the evaluation test of the viewing angle characteristics in Example 1-3 and Comparative Example 1-3.

FIG. 31C shows the results of analyzing the contour plots of viewing angles based on the results of measurement with a varying grayscale value while the liquid crystal display panels (displaying as a raw image the image (2) shown in FIG. 29B) were entirely irradiated with light from a white backlight. White corresponds to a grayscale value of 255 (grayscale level of 255) and black corresponds to a grayscale value of 0 (grayscale level of 0). The surrounding portions show the contrast ratios at a polar angle of 88 degrees. This figure shows that in Example 1-3, the balance of viewing angles from all directions was favorable and the viewing angle in terms of the contrast ratio was wider than that in Comparative Example 1-3.

Figure 31D:
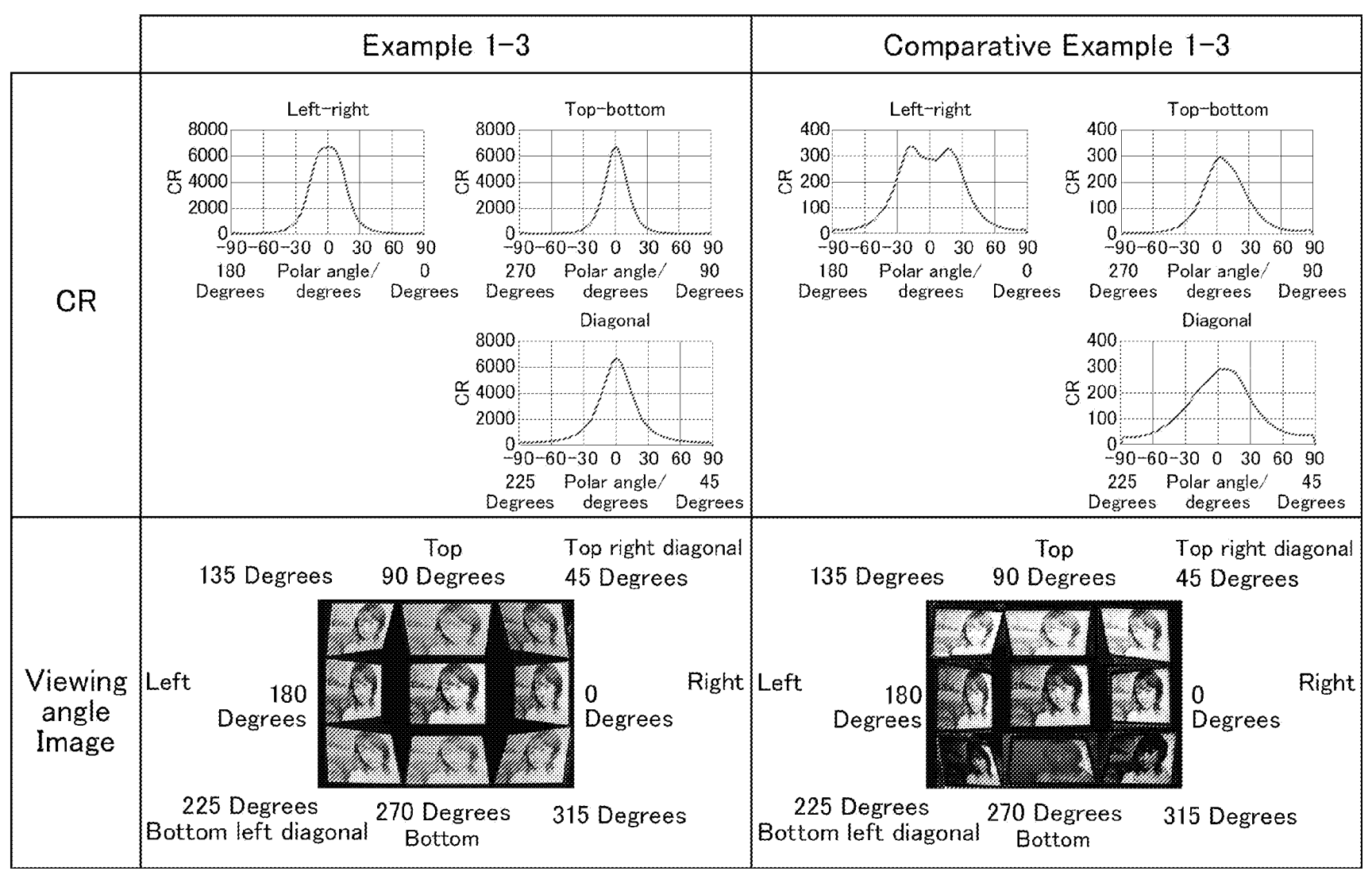

FIG. 31D shows the results of analyzing the contrast ratios based on the results of measurement with a varying grayscale value while the liquid crystal display panels (displaying as a raw image the image (2) shown in FIG. 29B) were entirely irradiated with light from a white backlight. White corresponds to a grayscale value of 255 (grayscale level of 255) and black corresponds to a grayscale value of 0 (grayscale level of 0). The polar angles at which the contrast ratio was 10 or higher were calculated, given that the contrast ratio at polar angles of ±90 degrees was 0 (zero). The horizontal axis of each graph shows polar angle (degrees), and the vertical axis shows contrast ratio. In Example 1-3, the viewing angle with a contrast ratio of 10 or higher was 179.7 degrees in the left-right direction, 179.7 degrees in the top-bottom direction, and 179.9 degrees in a diagonal direction. In Comparative Example 1-3, the viewing angle with a contrast ratio of 10 or higher was 178.1 degrees in the left-right direction, 144.1 degrees in the top-bottom direction (top: 89.2 degrees, bottom: 54.9 degrees), and 179.0 degrees in a diagonal direction. This figure shows that the contrast ratio was higher and the viewing angle especially in the top-bottom direction was wider in Example 1-3 than in Comparative Example 1-3. Also, in Comparative Example 1-3, the viewing angle characteristics in the top-bottom direction were especially asymmetric.

Figure 31E:
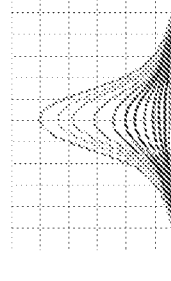
FIG. 31E shows the evaluation results of the viewing angle characteristics in Example 1-3 and Comparative Example 1-3.

FIG. 31E shows the results of analyzing changes in luminance at different grayscale values based on the results of measurement with a varying grayscale value while the liquid crystal display panels (displaying as a raw image the image (2) shown in FIG. 29B) were entirely irradiated with light from a white backlight. The horizontal axis of each graph shows polar angle (degrees) and the vertical axis shows normalized luminance. This figure shows that the balance of viewing angles at all azimuths was favorable in Example 1-3, whereas in Comparative Example 1-3, the viewing angle characteristics in the top-bottom direction were asymmetric.

FIG. 31F shows the results of analyzing the γ curves during gray display based on the displayed images shown in FIG. 31A (the case where the raw image was the image (2) shown in FIG. 29B). The front image was gamma-encoded with γ=2.2 and then displayed using the FSC system. In Example 1-3, the liquid crystal display panel was placed vertically as shown in FIG. 28A. The horizontal axis of each graph shows grayscale value (levels 0 to 255) and the vertical axis shows transmittance. This figure shows that the changes in γ curves in the left-right direction in Example 1-3 and Comparative Example 1-3 were substantially equivalent to each other, but the changes in γ curves in the bottom direction were better in Example 1-3 than in Comparative Example 1-3.

Table 4 summarizes comparison between Example 1 (Examples 1-1 to 1-3) and Comparative Example 1 (Comparative Examples 1-1 to 1-3).

TABLE 4

| | Example 1 | Relative to Comparative Example 1 | Comparative Example 1 |
|---|---|---|---|
| Transmittance | 25.1% | 1.01 times | 24.9% |
| Mode efficiency | 97.1% | 1.04 times | 93.5% |
| Color gamut | 93.5% | 1.00 times | 93.1% |
| Contrast ratio | 16207 | 10.94 times | 1482 |
| Solid-color luminance | 94% | 1.68 times | 56% |
| Viewing angle characteristics | Top-bottom, left-right: symmetric Black inversion: not observed | Significantly better | Top-bottom: asymmetric Black inversion: observed |

Comparative Example 2

Figures 32A, 32B:
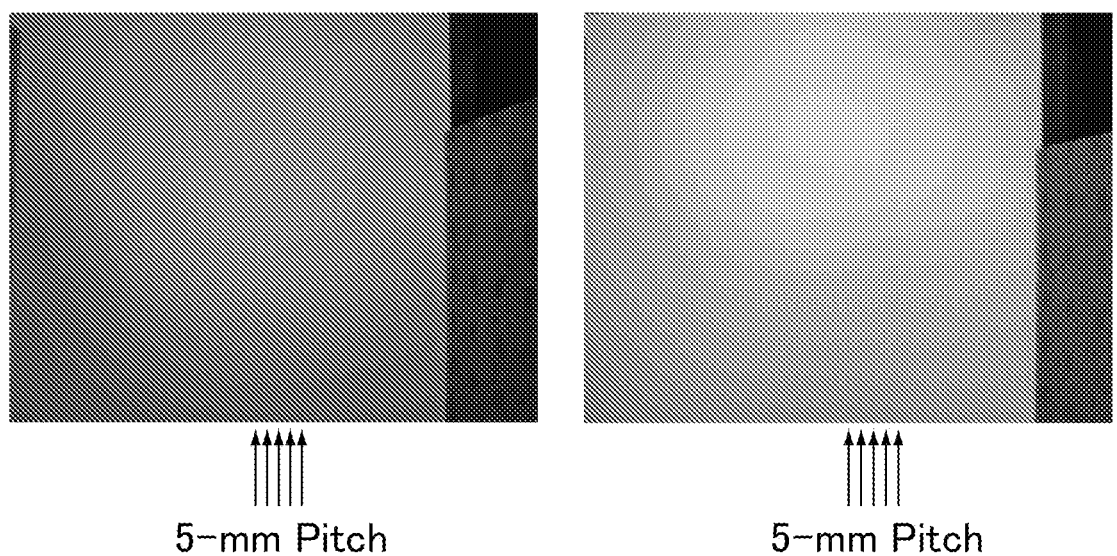
FIG. 32A shows the results of determining generation of vertical streaks in solid-color display in Comparative Example 2.
FIG. 32B shows the results of determining generation of vertical streaks in solid-color display in Comparative Example 2.
Figure 32C:
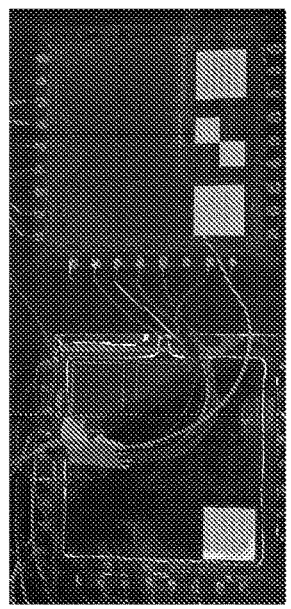
FIG. 32C shows the results of determining generation of vertical streaks in solid-color display in Comparative Example 2.

A liquid crystal display device was produced using a 1D-VA-mode liquid crystal display panel (TFT panel), and generation of vertical streaks in solid-color display was determined. FIG. 32A to FIG. 32C show the results.

FIG. 32A shows red display to the left and green display to the right, both when the black voltage was set to 0.5 V. This figure shows vertical streaks at 5 mm intervals (pitch). FIG. 32B shows whether the generation of the vertical streaks depends on the magnitude of black voltage. The symbol "x" indicates generation of vertical streaks and the symbol "0" indicates no generation of vertical streaks. With a normal tilt (when the pre-tilt angle of the liquid crystal molecules is 88.5 degrees or greater), both cases of strong rubbing and weak rubbing were examined. The evaluations on the cases with a smaller tilt (when the pre-tilt angle of the liquid crystal molecules was from 86 degrees to 87 degrees) are estimations. FIG. 32C shows generation of vertical streaks in the test cell.

Examples 2-1, 2-2, 2-3

A liquid crystal display panel (2D-ECB•parallel alignment mode) having the structure shown in FIG. 18 and set in the alignment state shown in FIG. 24 was produced as a liquid crystal display panel in the liquid crystal display device of Embodiment 1. The pixel pitch was 120 μm×360 μm. The tilt angle was 88.5 degrees (the thickness of the liquid crystal layer was 2.4 μm) in Examples 2-1 and 2-3 and 87 degrees (the thickness of the liquid crystal layer was 2.4 μm) in Example 2-2. The liquid crystal display panel of Example 2-1 and the liquid crystal display panel of Example 2-3 are the same as each other in liquid crystal optical conditions (tilt, retardation), with the only difference in panel prototype production date. The pixel electrodes 120 were provided with no slit. Light sources and a controller were connected to the liquid crystal display panel produced as above to fabricate a liquid crystal display device that provides color display using the FSC system. The physical properties of the device were measured. Table 5 shows the results.

Figure 33:
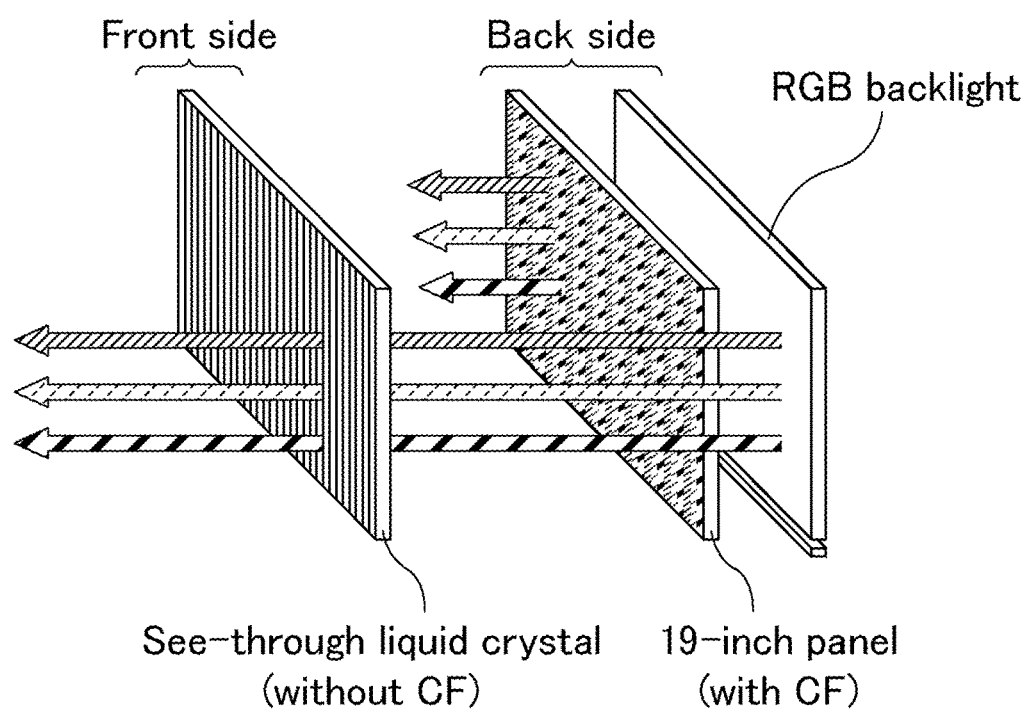
FIG. 33 is a schematic view showing the configuration of each of the liquid crystal display devices used in physical property measurement in Examples 2-1, 2-2, and 2-3.

The measurement was performed using the structure shown in FIG. 33. An RGB backlight and a 19-inch panel (with color filters) were set from the back side (back surface side). A see-through panel (with no color filters) as the liquid crystal display panel in the present example was set on the front side (viewing surface side). The reference voltage was voltage in "the settings for normal PI (2.4 μm) with gamma 2.2" (using PI with a tilt angle of 88.5 degrees and the grayscale luminance set with γ=2.2). The measurement was performed in a thermostat chamber in a 25° C. atmosphere.

Figure 34:
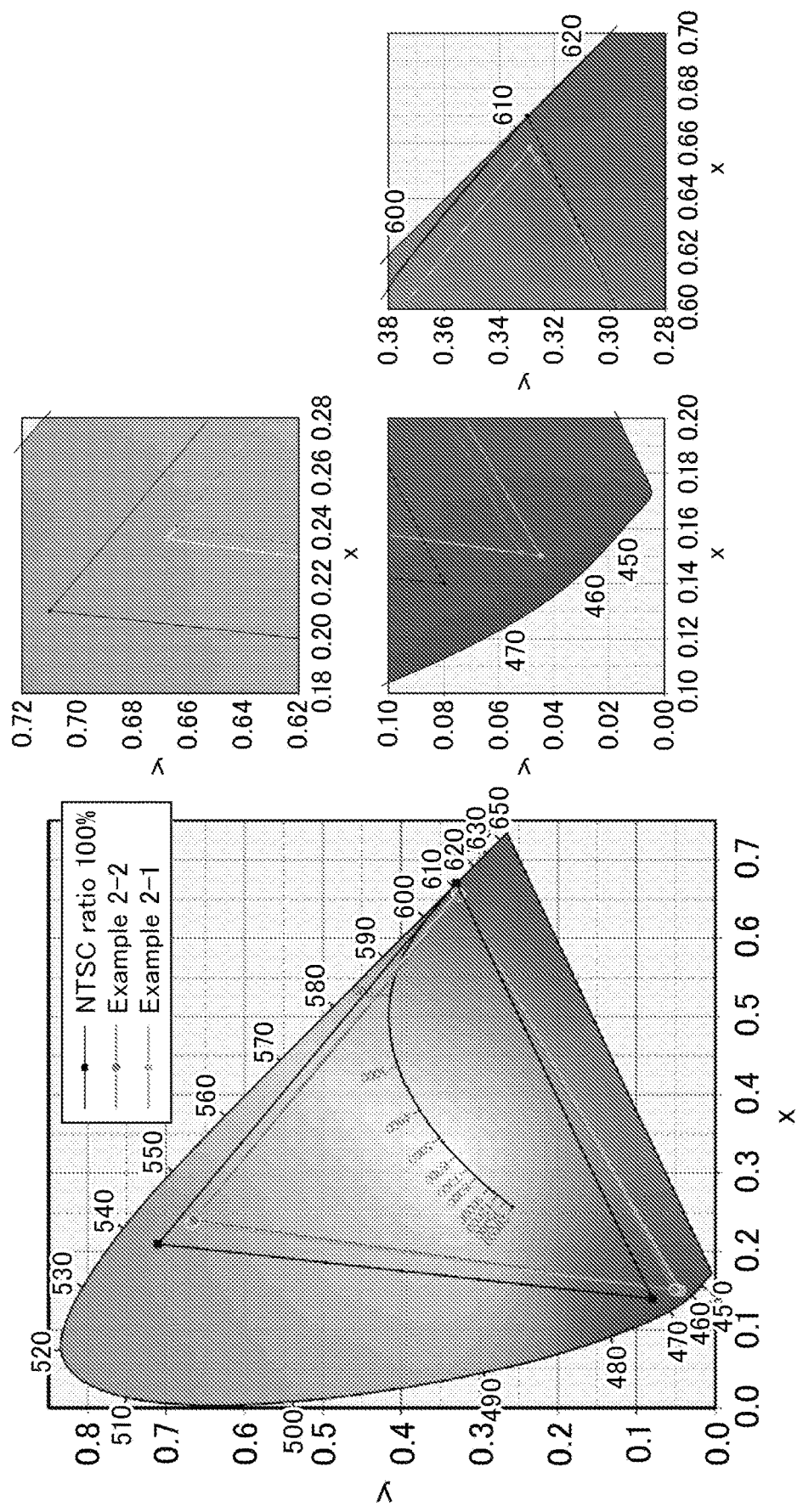
FIG. 34 shows the NTSC ratios determined in Examples 2-1, 2-2, and 2-3.

In Table 5, B/L indicates the luminance of the RGB backlight through the panel including color filters in the structure shown in FIG. 33. The white luminance, the black luminance, the transmittance (front/back polarization axes being aligned), the CR ratio (contrast ratio), and the NTSC ratio were evaluated as in Example 1-1. For the NTSC ratio, the xy area ratio was calculated based on the results in FIG. 34. The response speed (response time) was evaluated as follows. In Table 5, the values of Examples 2-1 and 2-2 each are the average value of three tests, and the values of Example 2-3 each are the value in a single test.

Response Time (Average for all Grayscale Values)

Figure 35:
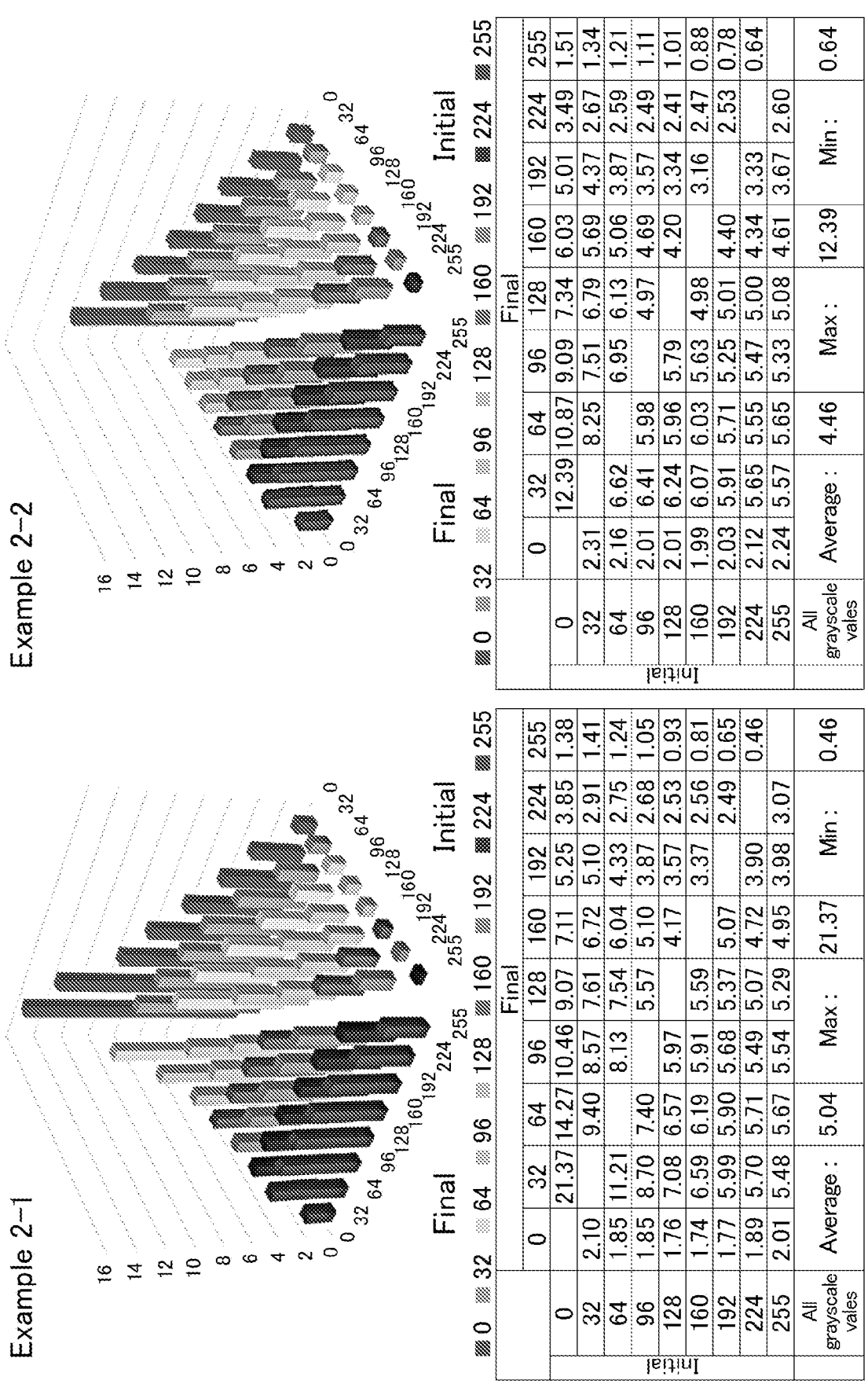
FIG. 35 shows the response time measurement results in Examples 2-1 and 2-2.

The response time taken for the same test cell as for the measurement method in FIG. 17A (method of determining the NTSC ratio) was measured. Specifically, the initial grayscale value was set at every 32 grayscale values in the range of 0 to 255, and the final grayscale value was set at every 32 grayscale values in the range of 0 to 255, so that the response times in transition between any two grayscale values were measured using a matrix. FIG. 35 and Table 5 show the results. The "Average for all grayscale values" in Table 5 means the average of the response times in the (9×9) matrix in FIG. 35.

TABLE 5

| | B/L (cd/m²) | White luminance (cd/m²) | Black luminance (cd/m²) | CR ratio | Transmittance (%) *Front/back polarization axes being aligned | Response time (ms) *Average for all grayscale values | NTSC ratio (%) *xy area ratio |
|---|---|---|---|---|---|---|---|
| Example 2-1 | 536.6 | 253.1 | 0.015 | 16873 | 47.2 | 5.04 | 92.4 |
| Example 2-2 | | 270.7 | 0.077 | 3516 | 50.4 | 4.46 | 89.6 |
| Example 2-3 | 536.6 | 253.4 | 0.013 | 19492 | 47.2 | 5.01 | 92.0 |

Table 5 shows that favorable results were obtained in all of Examples 2-1 to 2-3. The results in Example 2-2 were especially favorable as the white luminance was 1.07 times, the black luminance was 5.13 times, and the response time was shortened to 0.88 times the respective values in Example 2-1. Although the NTSC ratio seems lower than that in Example 2-1, the color gamut including intermediate grayscale values can be evaluated as improved, for the response time (average for all grayscale values) being shortened.

The response times in Examples 2-1 and 2-2 were further analyzed. Table 6 shows the results. In Table 6, the rise response time (ms) indicates the time taken for transition from the white display state (grayscale value of 0) to the black display state (grayscale value of 255), and the fall response time (ms) indicates the time taken for transition from the black display state (grayscale value of 255) to the white display state (grayscale value of 0).

TABLE 6

| | Response time (ms) | |
|---|---|---|
| | Rise response time | Fall response time |
| Example 2-1 | 1.38 | 2.01 |
| Example 2-2 | 1.51 | 2.24 |

The modes in the present invention described above may be combined as appropriate without departing from the gist of the present invention.

REFERENCE SIGNS LIST

1: liquid crystal display panel
1P, 1P1, 1P2: pixel
1Pa, 1Pb: domain
2: case
3: light source
4: controller
5: rotor
6: sample
7: thermostatic chamber or thermostatic bath
10Xa, 10Xb: polarization axis
11: first polarizing plate
12: second polarizing plate
21: first alignment film
22: second alignment film
100: first substrate
110, 310: insulating substrate
120, 1201, 1202: pixel electrode
200: liquid crystal layer
210: liquid crystal molecule
210S: initial point (liquid crystal director tail)
210T: terminal point (liquid crystal director head)
210V, 210Va, 210Vb: alignment vector
210X, 210Xa, 210Xb: liquid crystal alignment axis
300: second substrate
320: common electrode
1000: see-through display
400: spectroradiometer
410: polarizing plate
420: TFT panel
430: light sources using FSC driving system
440: test cell

What is claimed is:
1. A liquid crystal display device comprising:
a liquid crystal display panel with an electrically controlled birefringence (ECB) mode in a normally black mode;
a light source configured to irradiate the ECB mode liquid crystal display panel with red (R) light, green (G) light, and blue (B) light; and
a controller configured to drive the light source to time-divisionally irradiate the ECB mode liquid crystal display panel, the liquid crystal display device being configured to switch between an image display state, by using a field sequential driving system where each frame period includes subframe periods, and a transparent display state, allowing a background to be seen through,
the ECB mode liquid crystal display panel comprising, sequentially in the following order:
a first polarizing plate;
a first substrate including pixel electrodes arranged in a row direction and a column direction in a matrix pattern;
a first alignment film;
a liquid crystal layer formed from a liquid crystal material containing liquid crystal molecules;
a second alignment film;
a second substrate including a common electrode; and
a second polarizing plate, wherein:
the liquid crystal layer, during no voltage application, includes a first domain and a second domain with different alignment vectors from each other, wherein an alignment vector is defined to start at an initial point corresponding to first substrate side long axis ends of liquid crystal molecules and to end at a terminal point corresponding to second substrate side long axis ends of the liquid crystal molecules,
in a plan view of the first domain and the second domain, the alignment vector of the first domain and the alignment vector of the second domain are parallel to each other,
a liquid crystal alignment axis in the first domain and a liquid crystal alignment axis in the second domain to cross a polarization axis of the first polarizing plate at a same azimuthal angle and to cross a polarization axis of the second polarizing plate at a same azimuthal angle,
the liquid crystal alignment axis in the first domain and the liquid crystal alignment axis in the second domain are parallel to the row direction, and
the first domain and the second domain are arranged side by side in the column direction.

2. The liquid crystal display device according to claim 1, wherein a birefringence (Δn) of the liquid crystal material is 0.124 or higher and 0.18 or lower.

3. The liquid crystal display device according to claim 1, wherein a rotational viscosity coefficient ($\gamma_1$) of the liquid crystal material is less than 100 mPa·s.

4. The liquid crystal display device according to claim 1, wherein a value of the ECB mode liquid crystal display panel is 3.66 or less, the value represented by the following formula (1):

$$\text{value} = (\gamma_1/K_{33}) \times \{(d_d)_2/(d_b)^2\} \quad (1)$$

wherein $\gamma_1$ represents a rotational viscosity coefficient (mPa·s) of the liquid crystal material; $K_{33}$ represents a bend elastic constant of the liquid crystal molecules; $d_d$ represents a thickness, in μm, of the liquid crystal layer; and $d_b$ is 3 μm.

5. The liquid crystal display device according to claim 1, wherein the liquid crystal material comprises an alkenyl group-containing compound.

6. The liquid crystal display device according to claim 1, wherein the liquid crystal material comprises a phenyl group-containing compound.

7. The liquid crystal display device according to claim 2, wherein a pre-tilt angle of the liquid crystal molecules is 85° or greater and 89° or smaller.

8. The liquid crystal display device according to claim 1, wherein a fall-time response parameter of the ECB mode liquid crystal display panel is 2.55 ms or shorter.

9. The liquid crystal display device according to claim 1, wherein a rise-time response parameter of the ECB mode liquid crystal display panel is 2.75 ms or shorter.

10. The liquid crystal display device according to claim 1, wherein a frequency of each of the subframe periods is 180 Hz or higher.

11. The liquid crystal display device according to claim 7, wherein the controller is further configured to turn off the light source within 1.20 to 2.45 ms from a fall-time starting point on an optical response waveform obtained at a top edge of the ECB mode liquid crystal display panel in the each frame period.

12. The liquid crystal display device according to claim 1, wherein in at least one of the subframe periods, the ECB mode liquid crystal display panel is scanned, at 480 to 720 Hz, twice or more.

13. The liquid crystal display device according to claim 1, wherein an NTSC ratio is 90% or higher.

14. The liquid crystal display device according to claim 7, wherein a thickness of the liquid crystal layer is 1.65 μm to 2.5 μm.

15. The liquid crystal display device according to claim 1, wherein each of the subframe periods includes an R display period emitting the red (R) light, a B display period emitting the blue (B) light, and a G display period emitting the green (G) light in this order.

16. The liquid crystal display device according to claim 7, wherein the retardation introduced by the liquid crystal layer is from 330 to 340 nm.

* * * * *